(12) United States Patent
Sabe et al.

(10) Patent No.: US 7,844,108 B2
(45) Date of Patent: Nov. 30, 2010

(54) INFORMATION PROCESSING APPARATUS AND METHOD, RECORDING MEDIUM AND PROGRAM

(75) Inventors: Kohtaro Sabe, Tokyo (JP); Kenichi Hidai, Tokyo (JP); Kei Koya, Kanagawa (JP)

(73) Assignee: Sony Corporation, Tokyo (JP)

( * ) Notice: Subject to any disclaimer, the term of this patent is extended or adjusted under 35 U.S.C. 154(b) by 931 days.

(21) Appl. No.: 11/717,019

(22) Filed: Mar. 13, 2007

(65) Prior Publication Data

US 2007/0217688 A1  Sep. 20, 2007

(30) Foreign Application Priority Data

Mar. 17, 2006  (JP)  ............................ P2006-075517

(51) Int. Cl.
*G06K 9/62* (2006.01)
*G06K 9/00* (2006.01)
*G06K 9/68* (2006.01)
*G06K 9/70* (2006.01)

(52) U.S. Cl. ....................... 382/159; 382/118; 382/227; 700/47; 706/16

(58) Field of Classification Search ................. 382/118, 382/159, 224–228; 700/47, 48; 706/16–25
See application file for complete search history.

(56) References Cited

U.S. PATENT DOCUMENTS

| | | | |
|---|---|---|---|
| 6,345,110 B1 * | 2/2002 | Niyogi et al. ............... | 382/118 |
| 6,996,171 B1 * | 2/2006 | Walker et al. .......... | 375/240.09 |
| 7,016,881 B2 * | 3/2006 | Li et al. .......................... | 706/12 |
| 7,024,033 B2 * | 4/2006 | Li et al. ....................... | 382/159 |
| 7,050,607 B2 * | 5/2006 | Li et al. ....................... | 382/118 |
| 7,099,505 B2 * | 8/2006 | Li et al. ....................... | 382/159 |
| 7,203,669 B2 * | 4/2007 | Lienhart et al. ............... | 706/48 |
| 7,379,568 B2 * | 5/2008 | Movellan et al. ............ | 382/118 |
| 7,587,069 B2 * | 9/2009 | Movellan et al. ............ | 382/118 |
| 7,624,076 B2 * | 11/2009 | Movellan et al. .............. | 706/12 |
| 7,689,033 B2 * | 3/2010 | Xiao et al. ................... | 382/159 |
| 2002/0191818 A1 * | 12/2002 | Matsuo et al. ............... | 382/118 |
| 2003/0108244 A1 * | 6/2003 | Li et al. ....................... | 382/227 |
| 2003/0110147 A1 * | 6/2003 | Li et al. .......................... | 706/1 |
| 2004/0186816 A1 * | 9/2004 | Lienhart et al. ............... | 706/20 |
| 2005/0102246 A1 * | 5/2005 | Movellan et al. .............. | 706/12 |
| 2005/0144149 A1 * | 6/2005 | Li et al. .......................... | 706/12 |
| 2005/0213810 A1 * | 9/2005 | Sabe et al. ................... | 382/159 |
| 2006/0062451 A1 * | 3/2006 | Li et al. ....................... | 382/159 |
| 2006/0120572 A1 * | 6/2006 | Li et al. ....................... | 382/118 |

(Continued)

FOREIGN PATENT DOCUMENTS

JP  2000-123186  4/2000

(Continued)

*Primary Examiner*—Aaron W Carter
(74) *Attorney, Agent, or Firm*—Finnegan, Henderson, Farabow, Garrett & Dunner, L.L.P.

(57) ABSTRACT

An information processing apparatus includes a higher node having a plurality of weak discriminators that have learned a learning sample of a first label and a learning sample of a second label that has a predetermined coordinate relationship with the learning sample of the first label, a first lower node having a plurality of weak discriminators that have learned the learning sample of the first label based on the discrimination result of the higher node and a second lower node that has no weak discriminator.

10 Claims, 37 Drawing Sheets

U.S. PATENT DOCUMENTS

| | | | |
|---|---|---|---|
| 2006/0294068 A1* | 12/2006 | Li et al. | 707/3 |
| 2007/0019943 A1* | 1/2007 | Sueyoshi et al. | 396/287 |
| 2007/0053563 A1* | 3/2007 | Tu et al. | 382/128 |
| 2007/0086660 A1* | 4/2007 | Ai et al. | 382/226 |
| 2007/0154095 A1* | 7/2007 | Cao et al. | 382/190 |
| 2007/0154096 A1* | 7/2007 | Cao et al. | 382/190 |
| 2007/0217688 A1* | 9/2007 | Sabe et al. | 382/226 |
| 2008/0063263 A1* | 3/2008 | Zhang et al. | 382/159 |
| 2008/0235165 A1* | 9/2008 | Movellan et al. | 706/12 |
| 2008/0247598 A1* | 10/2008 | Movellan et al. | 382/100 |

FOREIGN PATENT DOCUMENTS

| | | |
|---|---|---|
| JP | 2004-133637 | 4/2004 |
| JP | 2005-044330 | 2/2005 |
| JP | 2005-284487 | 10/2005 |
| JP | 2006-072770 | 3/2006 |

* cited by examiner

FIG. 21

DATA STRUCTURE

NODE ID

PARENT NODE ID

CHILD NODE ID (MULTIPLE)

LABEL

THE NUMBER OF WEAK DISCRIMINATORS

---

(A) PAIR OF POSITIONS OF TWO PIXELS (B) THRESHOLD VALUE OF WEAK DISCRIMINATOR (C) WEIGHT FOR WEIGHTED MAJORITY DECISION (RELIABILITY OF WEAK DISCRIMINATOR)

(D) ABORT THRESHOLD VALUE

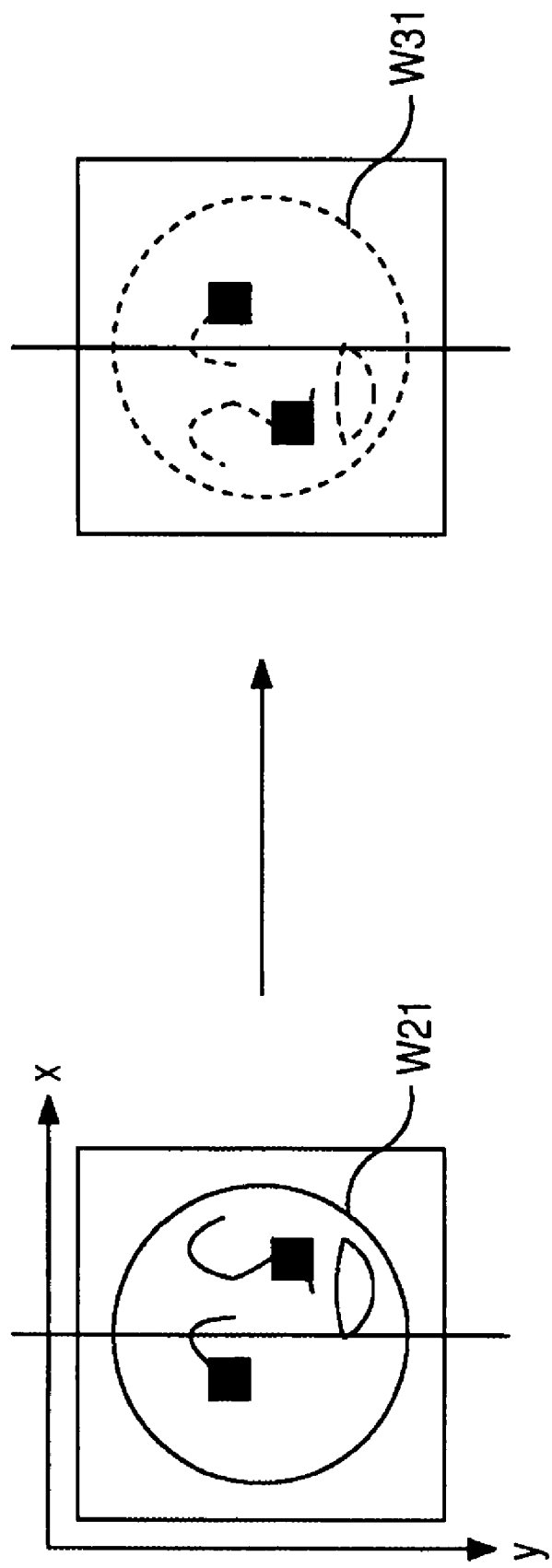

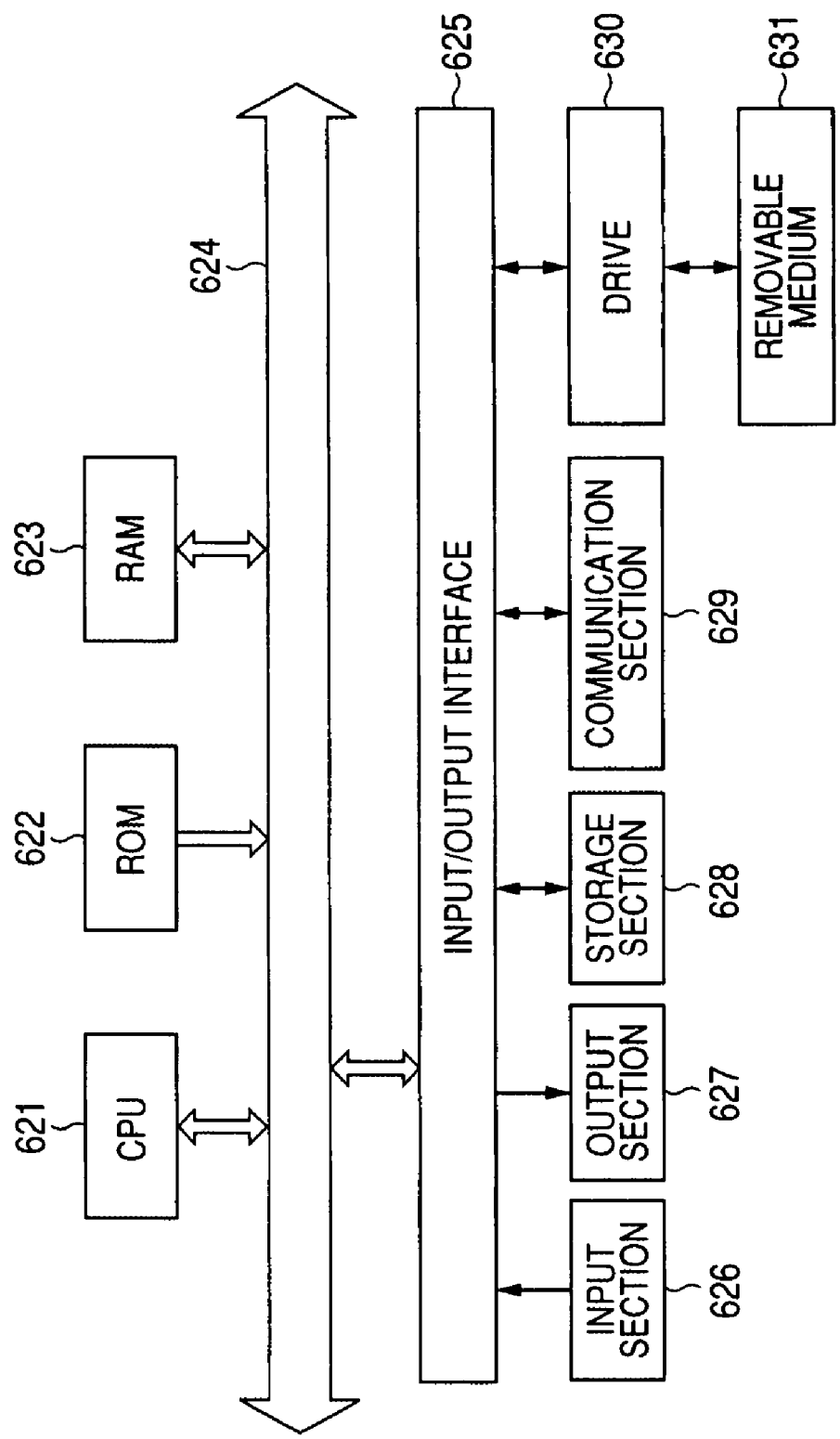

INFORMATION PROCESSING APPARATUS AND METHOD, RECORDING MEDIUM AND PROGRAM

CROSS REFERENCES TO RELATED APPLICATIONS

The present invention contains subject matter related to Japanese Patent Application JP 2006-075517 filed in the Japanese Patent Office on Mar. 17, 2006, the entire contents of which being incorporated herein by reference.

BACKGROUND OF THE INVENTION

1. Field of the Invention

The present invention relates to an information processing apparatus and method, a recording medium and a program, and particularly to an information processing apparatus and method, a recording medium and a program capable of quickly detecting an object of interest, such as a face image, with a small amount of computation.

2. Description of the Related Art

There have been proposed numerous face detection apparatuses of related art that do not use any motion in a complex image scene but use only a grayscale pattern of an image signal.

FIG. 1 shows an exemplary configuration of a face detection apparatus 1 of related art (see JP-A-2005-284487). The face detection apparatus 1 outputs the position and size of a face indicative of the area of the face in a given image (input image).

An image output section 2 of the face detection apparatus 1 supplies a grayscale image (brightness image) as the input image inputted to the face detection apparatus 1 to a scaling section 3.

The scaling section 3 enlarges or reduces the input image supplied from the image output section 2 to a specified scale and outputs the resultant scaled image to a scanner 4.

Specifically, the input image 10A shown in FIG. 2 is first outputted to the scanner 4 as it is. The input image 10A undergoes processes performed in the scanner 4 and a discriminator 5, which will be described later, and then an input image 10B is generated by reducing the size of the input image 10A. The input image 10B undergoes the processes performed in the scanner 4 and the discriminator 5, and then an input image 10C obtained by further reducing the size of the input image 10B is outputted. Similarly, further reduced images, such as 10D and 10E, are sequentially generated, and this process is terminated when the image size of the reduced image becomes smaller than the size of a window that the scanner 4 moves in the scan operation. Upon the termination of this process, the image output section 2 outputs the next input image to the scaling section 3.

The scanner 4 uses the window of a predetermined size to sequentially scan the scaled input image supplied from the scaling section 3 in the direction, for example, from the upper left to the lower right, and outputs the image in the window as a window image.

Specifically, as shown in FIG. 3, the window 11 having the same size as the window size that the subsequent discriminator 5 accepts is sequentially applied to the whole part (screen) of the given image, such as the image 10A, and the image in the window 11 at each position (hereinafter referred to as a cutout image or a window image) is outputted to the discriminator 5.

The window 11 is moved in the scan operation on a pixel basis as shown in FIG. 4. That is, after the cutout image in the window 11 at a predetermined position is outputted from the scanner 4, in the next scan, the window 11 moves rightward by one pixel and the cutout image in the window 11 at that position is supplied to the discriminator 5.

Although the window size is fixed, the scaling section 3 sequentially reduces the input image, so that the image size of the input image is converted into various scales as described above, allowing detection of an object of an arbitrary size.

That is, a face of any size in the input image is sequentially reduced and the image size eventually becomes substantially the same as the window size. As a result, it can be detected whether or not the image in the window 11 is a human face image.

The discriminator 5 refers to the learning result from a group learner 6 that performs group learning on a plurality of weak discriminators that form the discriminator 5 so as to discriminate whether each window image successively moved by the scanner 4 in the scan operation is a face image (object of interest) or an image other than a face image (object of no interest).

As shown in FIG. 5, the discriminator 5 includes a plurality of weak discriminators $21_i$ (i=1, 2, 3, . . . , K) obtained by ensemble learning and an adder 22 that multiplies the outputs (discrimination results) from the weak discriminators by respective corresponding weights $\alpha_i$ (i=1, 2, 3, . . . , K) to determine a weighted majority decision F(x).

Each of the weak discriminators $21_1$ to $21_K$ discriminates whether or not the image in the window 11 is a human face image based on two pixels at arbitrary positions among the pixels in the window 11. The reference character K corresponds to the number of combinations of two pixels extractable from the image in the window 11.

Specifically, difference in brightness between the two pixels (hereinafter referred to as an inter-pixel difference feature) is used as the amount of feature for the purpose of discrimination. The amount of feature of the window image is compared with the amount of feature learned by using learning samples (threshold value) formed of a plurality of grayscale images that have been labeled in advance as the object of interest or an object of no interest, so as to successively output an estimated value f(x) for estimating whether or not the window image is the object of interest in a deterministic or probabilistic manner.

For the weak discriminator that outputs a binary value, as in AdaBoost, for example, a threshold value is used to binarize the inter-pixel difference feature so as to discriminate between the object of interest and an object of no interest. Alternatively, as in Real-AdaBoost, for example, the inter-pixel difference feature may be used to output a continuous value indicative of the likelihood of being the object of interest in a probabilistic manner.

What the weak discriminators $21_i$ need, such as two pixels and the amount of feature (threshold value) for the purpose of discrimination, is learned by the group learner 6 in the learning process according to a predetermined algorithm.

The plurality of the weak discriminators are successively generated by the group learner 6 that uses the above learning samples to perform group learning according to an algorithm, which will be described later. The plurality of the weak discriminators calculate the above estimated values, for example, in the order the weak discriminators are generated.

The adder 22 multiplies the estimated value of each weak discriminator $21_i$ by the weight, which is reliability for each weak discriminator $21_i$, sums the weighted values and outputs the summed value (the value of the weighted majority decision).

The weight (reliability) for the weighted majority decision is learned by the group learner 6 in the learning process in which the weak discriminators are generated.

In the discriminator 5, as described above, each weak discriminator $21_i$ successively outputs the estimated value f(x) indicative of whether or not the input window image is a face, and the adder 22 calculates and outputs the weighted majority decision F(x). According to the value of the weighted majority decision F(x), judgment means (not shown) makes final judgment of whether or not the window image is the object of interest.

During the weighted majority decision process, the discriminator 5 does not wait for the calculation results from all weak discriminators but terminates the calculation even in the course thereof when it is judged by the calculated value at that point that the window image is not the object of interest.

Specifically, whenever the plurality of weak discriminators generated in advance in the learning process output estimated values, the estimated values are multiplied by the weights for respective weak discriminators obtained in the learning process and the weighted values are summed to update the value of the weighted majority decision. Whenever the value of the weighted majority decision (evaluation value) is updated, an abort threshold value is used to control whether or not to abort the calculation of estimated values. The abort threshold value (reference value) is learned by the group learner 6 in the learning process.

The discriminator 5 has the weak discriminators that use the significantly simple amount of feature, that is, the difference in brightness between two pixels (inter-pixel difference feature), to discriminate between the object of interest and an object of no interest, so that the speed of detecting the object of interest can be increased. On the other hand, the abort process is used to proceed to the discrimination process for the next window image in the course of the calculation without waiting for the calculation results from all weak discriminators, so that the amount of computation in the detection process can be significantly reduced. These effects allow even faster processing.

Furthermore, in the discriminator 5, a plurality of the weak discriminators form a node and a plurality of the nodes are disposed in a tree structure.

FIG. 6 shows an example of the tree structure formed when all the following images are learned as learning samples; an image labeled as a frontward face (an image with a yaw angle ranging from −15 degrees to +15 degrees) (hereinafter referred to as the label W11 image), an image labeled as a leftward face (an image with a yaw angle ranging from +15 degrees to +65 degrees) (hereinafter referred to as the label W21 image), an image labeled as a rightward face (an image with a yaw angle ranging from −65 degrees to −15 degrees) (hereinafter referred to as the label W31 image), an image labeled as a face rotated in the rolling direction from the front position by +20 degrees (hereinafter referred to as the label W12 image), an image labeled as the leftward face rotated in the rolling direction by +20 degrees (hereinafter referred to as the label W22 image), an image labeled as the rightward face rotated in the rolling direction by +20 degrees (hereinafter referred to as the label W32 image), an image labeled as a face rotated in the rolling direction from the front position by −20 degrees (hereinafter referred to as the label W13 image), an image labeled as the leftward face rotated in the rolling direction by −20 degrees (hereinafter referred to as the label W23 image) and an image labeled as the rightward face rotated in the rolling direction by −20 degrees (hereinafter referred to as the label W33 image).

As shown in FIG. 7A, the yaw angle is the angle centered on the axis 202 that is perpendicular to the axis 201 parallel to the line connecting the human eyes and passing substantially the center of the human head and that vertically passes substantially the center of the human head. The yaw angle is defined to be negative in the right direction, while positive in the left direction.

The rolling angle represents the angle that rotates around the axis 203 perpendicular to the axes 201 and 202, and is defined to be zero degree when the axis 201 is horizontal.

There is another angle called a pitch angle, which represents the attitude. The pitch angle is the upward and downward angle centered on the axis 201, and is defined to be positive in the upward direction, while negative in the downward direction.

When the tree structure shown in FIG. 6 is not used, for example, a group of weak discriminators 231 shown in FIG. 8 may be required in order to identify one label. The group of weak discriminators 231 has K weak discriminators, that is, weak discriminators $21\text{-}1_1$ to $21\text{-}1_K$. These K weak discriminators learn a learning sample of one label.

Therefore, to learn learning samples of, for example, the nine labels, that is, the labels W11 to W13, the labels W21 to W23 and the labels W31 to W33, it is necessary to prepare a group of weak discriminators 231-1 for learning the leaning sample of the label W11 as well as groups of weak discriminators 231-2 to 231-9 for learning the learning samples of respective labels, that is, the label W12, the label W13, the labels W21 to W23 and the labels W31 to W33, as shown in FIG. 9. Each of these groups of weak discriminators 231-2 to 231-9 also has K weak discriminators.

In the tree structure shown in FIG. 6, the number of weak discriminators in a learning path from the most upstream node to the most downstream node is also K at the maximum. However, as described above, when the value of the weighted majority decision; which is the value obtained by weighting the value resulting from the process performed in each weak discriminator in the discrimination (identification) process and summing the weighted values, is smaller than the abort threshold value, the discrimination (identification) process is aborted at that point. Therefore, the number of weak discriminators can be reduced.

FIG. 10 diagrammatically shows the above explanation. That is, in this embodiment, although a node 221 is basically formed of weak discriminators $21_1$ to $21_{100}$, each weak discriminator $21_i$ has an abort capability based on the abort threshold value, as shown in FIG. 11. In the figures, reference character Y indicates that the subsequent stage takes over the output, while reference character N indicates that the process is aborted there.

Thus, the discriminator 5 functions as judgment means for not only calculating the weighted majority decision as an evaluation value for judging whether or not the window image is the object of interest but also judging whether or not the window image is the object of interest based on the evaluation value.

The group learner 6 uses group learning to learn in advance weak discriminators, weights to be multiplied to the outputs (estimated values) of the weak discriminators and the like.

As group learning, any specific approaches can be applied as far as they can determine the result of a plurality of weak discriminators in a majority decision process. For example, group learning using boosting, such as AdaBoost in which data are weighted to make a weighted majority decision, can be applied.

SUMMARY OF THE INVENTION

However, in the face detection apparatus 1 of related art, as shown in FIG. 6, it is necessary to learn a learning sample for each view (nine types of images), and as the learning result, store pairs of positions of two pixels (K pairs), threshold values for the weak discriminators (K values), weights for the weighted majority decision (reliability of the weak discriminator) (K weights) and abort threshold values (K values) for each view, resulting in a large amount of dictionary data.

To commercialize the face detection apparatus 1 as a built-in LSI, it is necessary to reduce the gate scale and the manufacturing cost. However, when the face detection apparatus 1 is implemented as hardware, the dictionary data will be stored in a ROM, which may require a circuit larger than a computation circuit (larger number of gates).

In view of the above circumstances, it is desirable to reduce the amount of the dictionary data necessary for detecting an object of interest in group learning.

An information processing apparatus according to an embodiment of the invention includes a higher node having a plurality of weak discriminators that have learned a learning sample of a first label and a learning sample of a second label that has a predetermined coordinate relationship with the learning sample of the first label, a first lower node having a plurality of weak discriminators that have learned the learning sample of the first label based on the discrimination result of the higher node and a second lower node that has no weak discriminator. The first lower node performs an identification process on an input signal in order to recognize an image of the first label based on the discrimination result of the higher node, and the second lower node performs an identification process on the input signal in order to identify an image of the second label based on the discrimination result of the higher node by utilizing the weak discriminators in the first lower node according to the coordinate relationship.

The weak discriminators in the higher node and the first lower node perform the identification process based on how much the difference between the values of two pixels in the image data of the learning sample differs from a threshold value, and the second lower node can perform the identification process based on how much the difference between the values of two pixels on the image according to the input signal at the positions obtained by performing coordinate conversion on the positions of the two pixels used in the identification process on the first node based on the coordinate relationship differs from the threshold value used in the identification process on the first node.

The learning sample of the second label corresponds to the image obtained by rotating the learning sample of the first label by a predetermined angle in the rolling direction or flipping the learning sample of the first label in the horizontal direction, and the second lower node can perform the identification process based on how much the difference between the values of two pixels on the image according to the input signal at the positions obtained by rotating the positions of the two pixels used in the identification process on the first node by the predetermined angle in the rolling direction or flipping the positions of the two pixels in the horizontal direction differs from the threshold value used in the identification process on the first node.

There is further provided output means that acquires a signal that undergoes the identification process and outputs it to the higher node, the first lower node or the second lower node, and the output means can output an image signal of an image larger than the learning sample to the second lower node when the second lower node performs the identification process based on how much the difference between the values of two pixels on the image according to the input signal at the positions obtained by rotating the positions of the two pixels used in the identification process on the first node by the predetermined angle in the rolling direction differs from the threshold value used in the identification process on the first node.

The weak discriminators that form the higher node and the first lower node can be adapted to rotate the learning sample by the predetermined angle in the rolling direction with its center aligned with the center of the image according to the image signal outputted from the output means and not to perform the learning on the areas that go off the image according to the image signal.

The higher node and the first and second lower nodes can include abort means for weighting each discrimination result with reliability, accumulating the weighted discrimination results and aborting the identification process based on the accumulated sum.

The abort means can judge whether or not to abort the identification process whenever the discrimination result is weighted and accumulated or whenever a predetermined number of discrimination results are weighted and accumulated.

An information processing method according to another embodiment of the invention is an information processing method for an information processing apparatus including a higher node having a plurality of weak discriminators that have learned a learning sample of a first label and a learning sample of a second label that has a predetermined coordinate relationship with the learning sample of the first label, a first lower node having a plurality of weak discriminators that have learned the learning sample of the first label based on the discrimination result of the higher node, and a second lower node that has no weak discriminator. The information processing method includes the steps of using the first lower node to perform an identification process on an input signal in order to recognize an image of the first label based on the discrimination result of the higher node, and using the second lower node to perform an identification process on the input signal in order to identify an image of the second label based on the discrimination result of the higher node by utilizing the weak discriminators in the first lower node according to the coordinate relationship.

A program according to another embodiment of the invention is a program for an information processing apparatus including a higher node having a plurality of weak discriminators that have learned a learning sample of a first label and a learning sample of a second label that has a predetermined coordinate relationship with the learning sample of the first label, a first lower node having a plurality of weak discriminators that have learned the learning sample of the first label based on the discrimination result of the higher node, and a second lower node that has no weak discriminator. The program includes the steps of using the first lower node to perform an identification process on an input signal in order to recognize an image of the first label based on the discrimination result of the higher node, and using the second lower node to perform an identification process on the input signal in order to identify an image of the second label based on the discrimination result of the higher node by utilizing the weak discriminators in the first lower node according to the coordinate relationship.

In the information processing apparatus, the information processing method and the program according to an embodiment of the invention, based on the discrimination result of a higher node having a plurality of weak discriminators that have learned a learning sample of a first label and a learning sample of a second label that has a predetermined coordinate relationship with the learning sample of the first label, a first lower node having a plurality of weak discriminators that have learned the learning sample of the first label is used to perform an identification process on an input signal in order to recognize an image of the first label based on the discrimination result of the higher node, and a second lower node that has no weak discriminator is used to perform an identification process on the input signal in order to identify an image of the second label based on the discrimination result of the higher node by utilizing the weak discriminators in the first lower node, according to the coordinate relationship.

According to the embodiments of the invention, the dictionary data necessary for the face image discrimination process can be reduced.

BRIEF DESCRIPTION OF THE DRAWINGS

FIG. 21 is a view for explaining the data structure of a node;

FIG. 38 is another view showing the relationship between the positions of a pair of two pixels obtained as a learning result and the positions of the pixels used when the amount of feature is calculated at an unlearned node;

FIG. 40 is a block diagram showing an exemplary computer configuration.

DESCRIPTION OF THE PREFERRED EMBODIMENTS

Before the best mode for carrying out the invention is described below, how the disclosed invention corresponds to the embodiments is, for example, explained as follows: Even if there is an embodiment described herein but not described as corresponding to the invention, it does not mean that the embodiment does not correspond to the invention. Conversely, even if an embodiment is described herein as corresponding to the invention, it does not mean that the embodiment exclusively corresponds to the invention.

Furthermore, it does not mean that the following description includes all invention described herein. In other words, the following description does not exclude the existence of the invention that is described herein but is not claimed in this application, that is, the invention that may be applied as a divisional application or the invention that may revealed and be supplemented as an amendment in the future.

Figure 36:
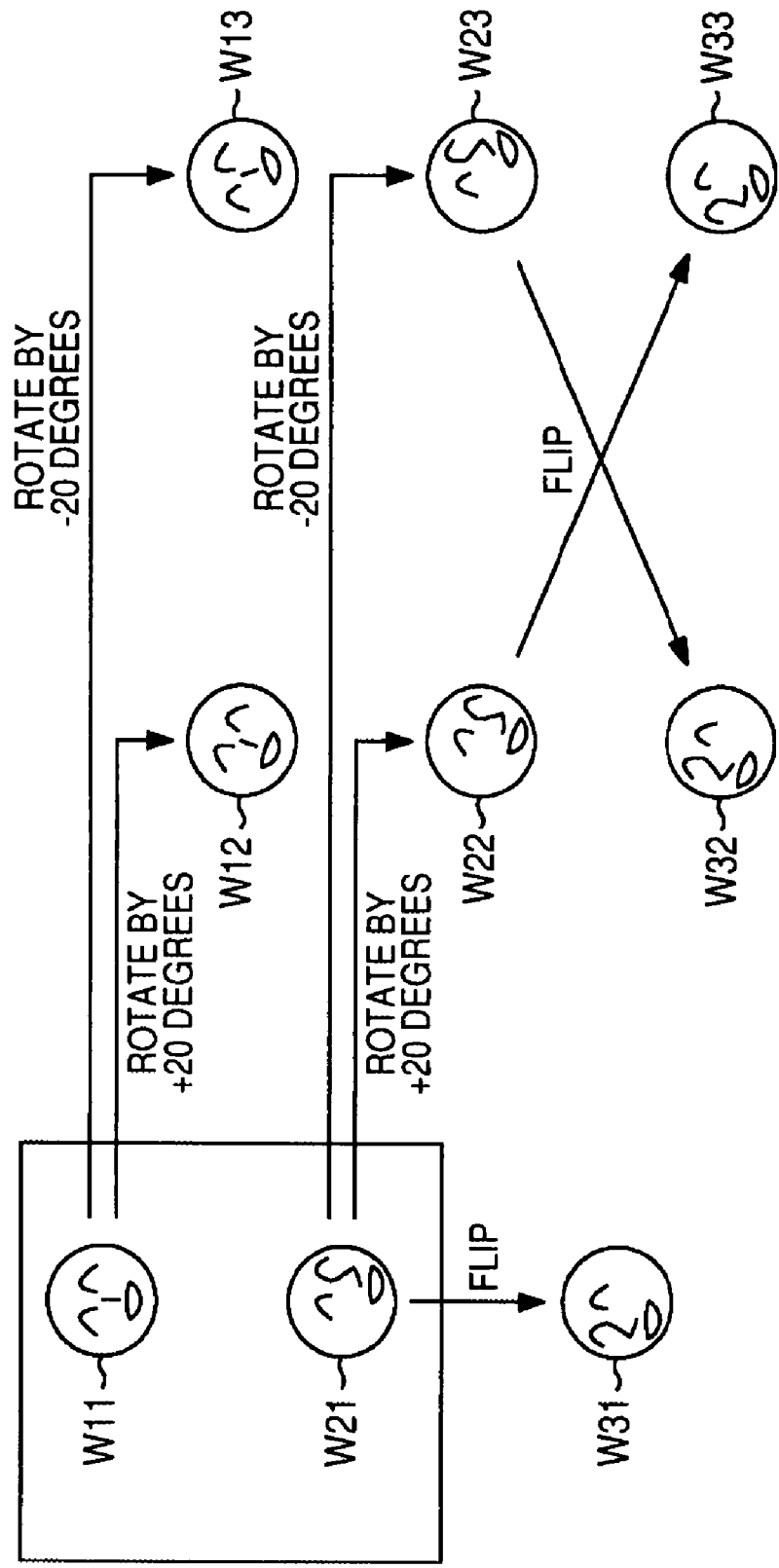
FIG. 36 is a view for explaining the coordinate relationship between the image of the label associated with a learned node and the image of the label associated with an unlearned node.

The information processing apparatus according to an embodiment of the invention includes a higher node (for example, the learned node 81-1-1 in FIG. 32) having a plurality of weak discriminators that have learned a learning sample of a first label (for example, the image of the label W11 in FIG. 36) and a learning sample of a second label that has a predetermined coordinate relationship with the learning sample of the first label (for example, the image of the label W12 that can be obtained by rotating the image of the label W11 in FIG. 36 by +20 degrees in the rolling direction), a first lower node (for example, the learned node 81-1-1-1 in FIG. 32) having a plurality of weak discriminators that have learned the learning sample of the first label based on the discrimination result of the higher node, and a second lower node (for example, the unlearned node 81-1-1-2 in FIG. 32) that has no weak discriminator.

The first lower node performs an identification process on an input signal in order to recognize an image of the first label based on the discrimination result of the higher node, and the second lower node performs an identification process on the input signal in order to identify an image of the second label based on the discrimination result of the higher node by utilizing the weak discriminators in the first lower node according to the coordinate relationship.

The weak discriminators in the higher node and the first lower node perform the identification process based on how much the difference between the values of two pixels in the image data of the learning sample differs from a threshold value, and the second lower node can perform the identification process based on how much the difference between the values of two pixels on the image according to the input signal at the positions obtained by performing coordinate conversion on the positions of the two pixels used in the identification process on the first node based on the coordinate relationship (for example, FIG. 37 or 38) differs from the threshold value used in the identification process on the first node.

The learning sample of the second label corresponds to the image obtained by rotating the learning sample of the first label by a predetermined angle in the rolling direction or flipping the learning sample of the first label in the horizontal direction, and the second lower node can perform the identification process based on how much the difference between the values of two pixels on the image according to the input signal at the positions obtained by rotating the positions of the two pixels used in the identification process on the first node by the predetermined angle in the rolling direction or flipping the positions of the two pixels in the horizontal direction (for example, FIG. 37 or 38) differs from the threshold value used in the identification process on the first node.

There is further provided output means (for example, the scanner 54 in FIG. 12) that acquires a signal that undergoes the identification process and outputs it to the higher node, the first lower node or the second lower node, and the output means can output an image signal of an image larger than the learning sample (for example, FIG. 39B) to the second lower node when the second lower node performs the identification process based on how much the difference between the values of two pixels on the image according to the input signal at the positions obtained by rotating the positions of the two pixels used in the identification process on the first node by the predetermined angle in the rolling direction differs from the threshold value used in the identification process on the first node.

Figure 39A:
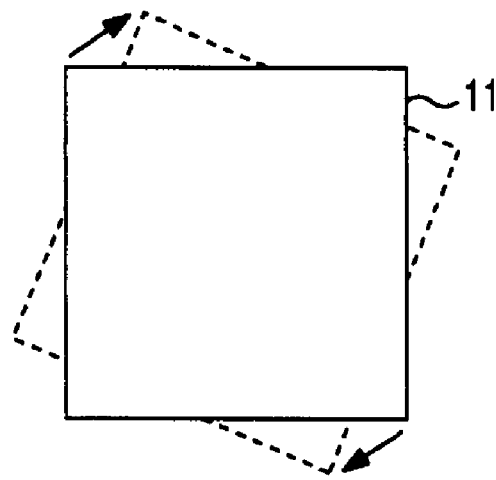
FIGS. 39A and 39B show another exemplary window image.
Figure 39B:
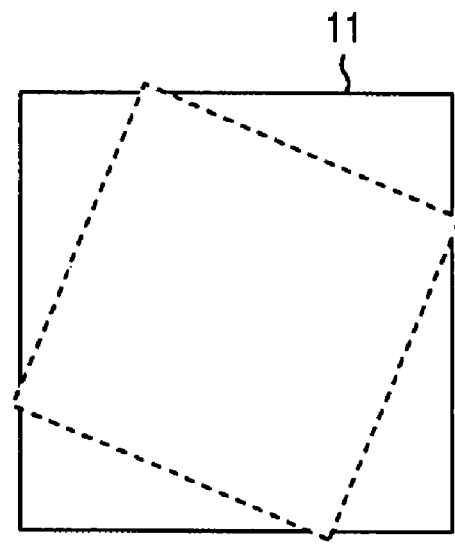

The weak discriminators that form the higher node and the first lower node can be adapted to rotate the learning sample by the predetermined angle in the rolling direction with its center aligned with the center of the image according to the image signal outputted from the output means and not to perform the learning on the areas that go off the image according to the image signal (the pixels at the four corners in FIG. 39B).

Figure 29:
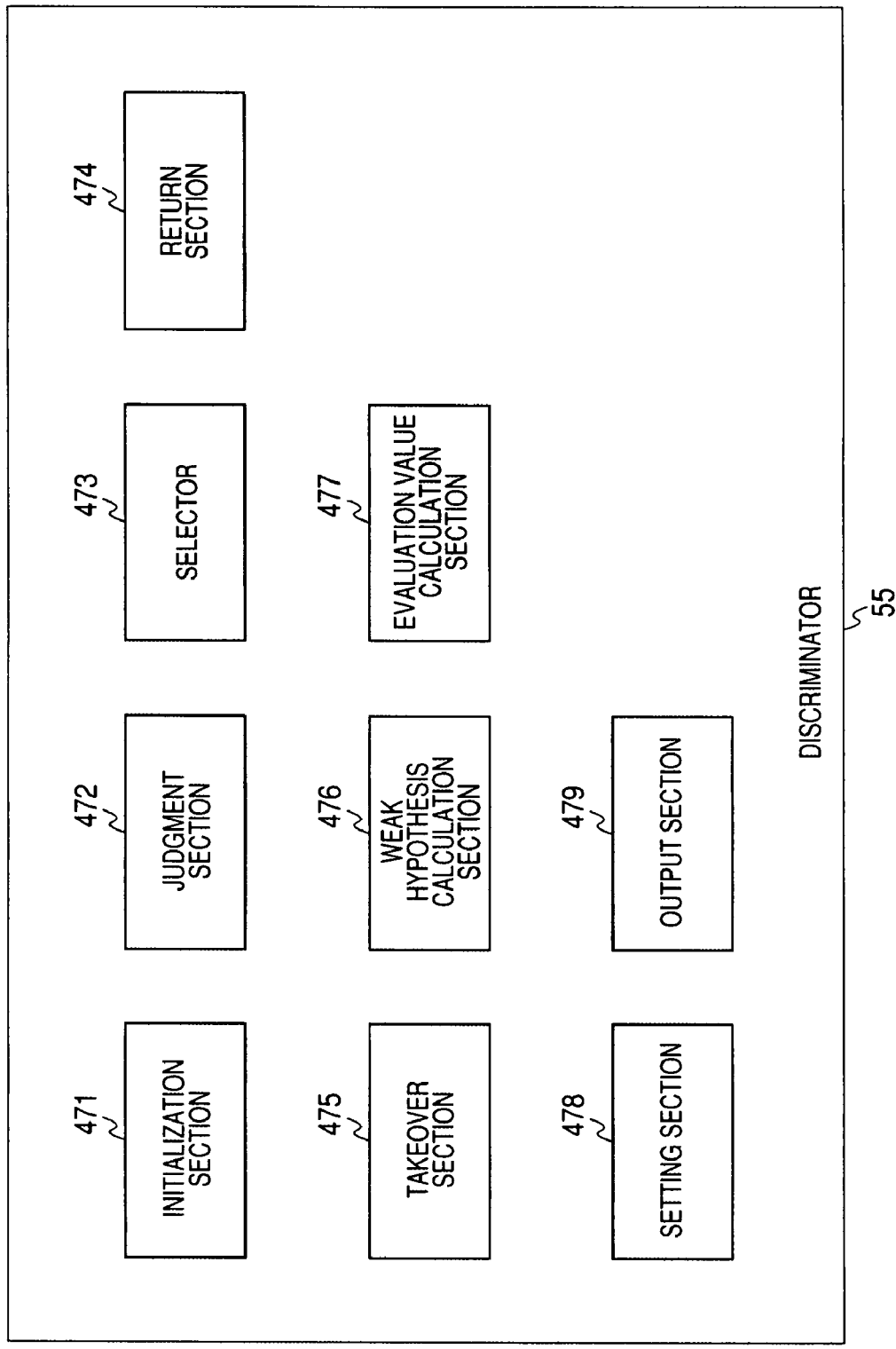
FIG. 29 is a block diagram showing an exemplary functional configuration of a discriminator.
Figure 34:
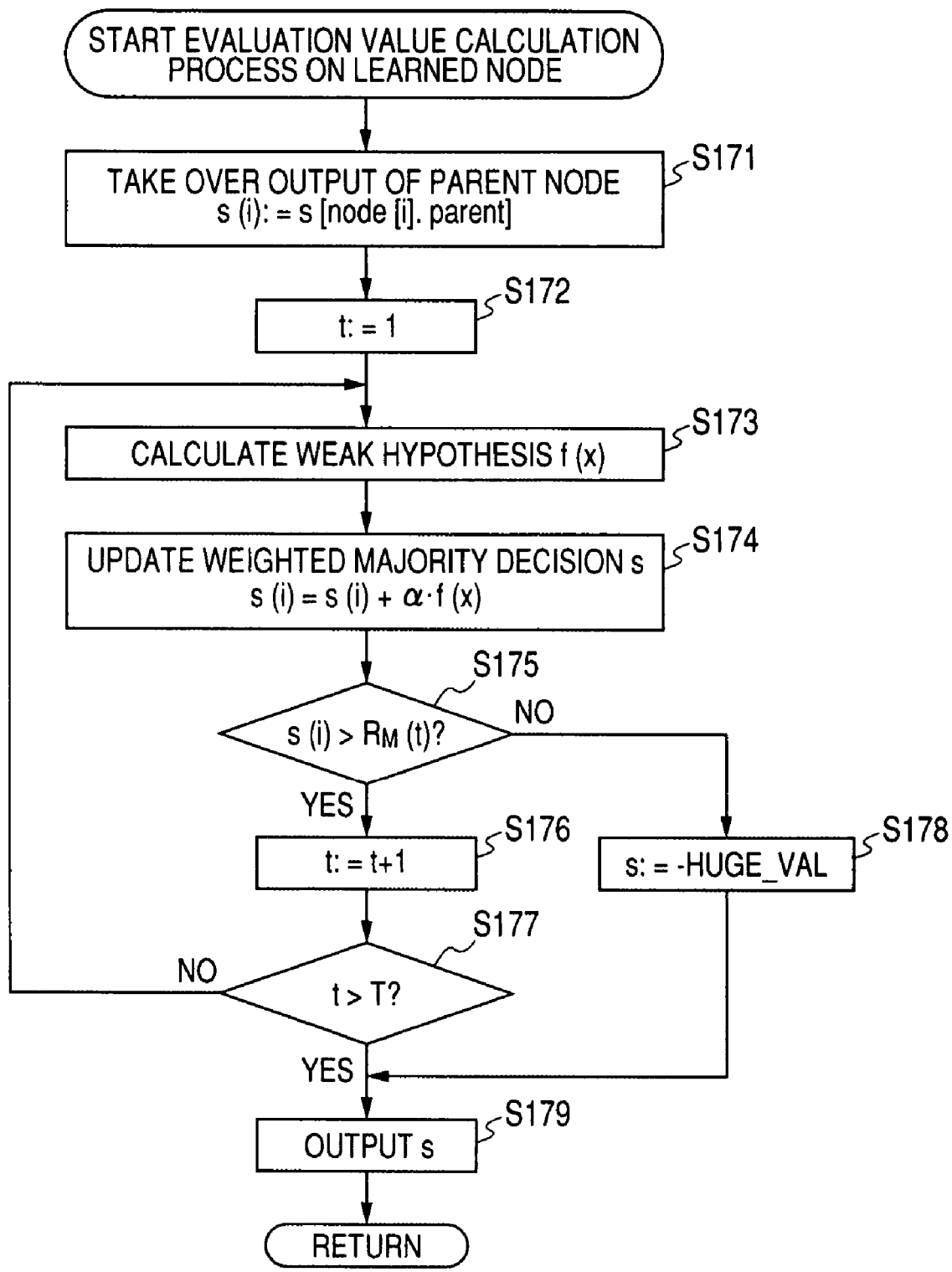
FIG. 34 is a flowchart for explaining the evaluation value calculation process to be performed on a learned node at the step S162 in FIG. 33.

The higher node and the first and second lower nodes can include abort means for weighting each discrimination result with reliability, accumulating the weighted discrimination results and aborting the identification process based on the accumulated sum (for example, the judgment section 472 in FIG. 29 that performs the process at the step S175 in FIG. 34).

The abort means can judge whether or not to abort the identification process whenever the discrimination result is weighted and accumulated or whenever a predetermined number of discrimination results are weighted and accumulated.

The information processing method or program according to another embodiment of the invention is an information processing method or program for an information processing apparatus including a higher node (for example, the learned node 81-1-1 in FIG. 32) having a plurality of weak discriminators that have learned a learning sample of a first label (for example, the image of the label W11 in FIG. 36) and a learning sample of a second label that has a predetermined coordinate relationship with the learning sample of the first label (for example, the image of the label W12 that can be obtained by rotating the image of the label W11 in FIG. 36 by +20 degrees in the rolling direction), a first lower node (for example, the learned node 81-1-1-1 in FIG. 32) having a plurality of weak discriminators that have learned the learning sample of the first label based on the discrimination result of the higher node, and a second lower node (for example, the unlearned node 81-1-1-2 in FIG. 32) that has no weak discriminator.

Figure 33:
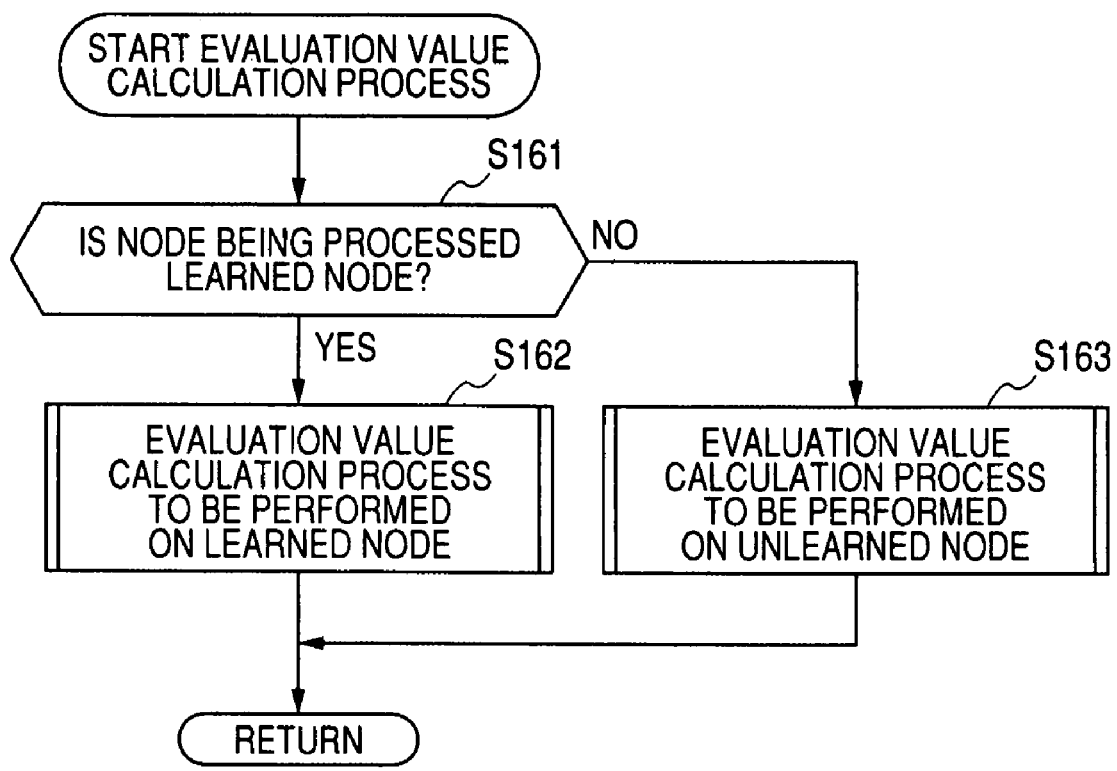
FIG. 33 is a flowchart for explaining the evaluation value calculation process at the step S132 in FIG. 31.

The information processing method or program includes the steps of using the first lower node to perform an identification process on an input signal in order to recognize an image of the first label based on the discrimination result of the higher node (for example, the step S121 in FIG. 33), and using the second lower node to perform an identification process on the input signal in order to identify an image of the second label based on the discrimination result of the higher node by utilizing the weak discriminators in the first lower node according to the coordinate relationship (for example, the step S163 in FIG. 33).

A specific embodiment to which the invention is applied will be described below in detail with reference to the drawings.

In this embodiment of the invention, an information processing apparatus that uses ensemble learning (group learning) to detect an object of interest from an image is applied to an object detection apparatus.

A learning machine obtained by group learning includes a large number of weak hypotheses and a combiner that combines these weak hypotheses.

Boosting is an example of the combiner that integrates outputs of weak hypotheses weighted by fixed weights independent of an input.

In the boosting, the distribution that learning samples follow is manipulated such that the learning result of a previously generated weak hypothesis is used to increase the weight for a learning sample (exercise) that has generated an error, and a new weak hypothesis is learned based on the manipulated distribution. In this way, the weight for a learning sample that causes a large number of incorrect answers and is therefore hard to be discriminated as an object of interest is increased relative to others, so that weak discriminators, each providing a correct answer to the learning sample having a large weight, that is, hard to be discriminated, are successively selected. In this case, weak hypotheses are successively generated in the learning process, and a newly generated weak hypothesis depends on the previously generated weak hypotheses.

To detect an object of interest, the discrimination results of a large number of weak hypotheses successively generated in the learning process as described above are used. For example, in AdaBoost, all discrimination results (1 for the object of interest and −1 for an object of no interest) of weak hypotheses generated in the learning process (hereinafter referred to as weak discriminators) are supplied to the combiner, which weights each discrimination result with reliability calculated in the learning process performed on each corresponding weak discriminator, sums the weighted values, outputs the result of the weighted majority decision, and evaluates the output value of the combiner, so as to select whether or not the input image is the object of interest.

The weak discriminator uses the amount of certain feature to judge whether the input image is the object of interest or an object of no interest. The weak discriminator may output whether the input image is the object of interest or not in a deterministic manner, or may output the likelihood of being the object of interest in the form of probability density or the like in a probabilistic manner.

This embodiment uses a group learner using weak discriminators, each using the amount of a significantly simple feature, that is, the difference in brightness between two pixels (inter-pixel difference feature), to discriminate between the object of interest and an object of no interest. The group learner is designed to learn only a learning sample of a predetermined view among the views to be judged and be able to use the learning result to judge other views.

That is, although the invention is particularly relates to a discrimination process, the following sections will be provided for understanding, as in JP-A-2005-284487:

(1) Object Detection Apparatus (2) Group Learner (2-1-1) Weak Discriminator that Outputs a Binary Value (2-1-2) Weak Discriminator that Outputs a Continuous Value (2-2) Abort Threshold Value (3) Weak Discriminator Assembly Structure (4) Learning Method (4-1) Generation of Discriminator (4-2) Generation of Weak Discriminator After the above sections are described in a way basically similar to JP-A-2005-284487, the portion particularly related to the invention will be described in the following section:

(5) Object Detection Method (1) Configuration of Object Detection Apparatus

Figure 12:
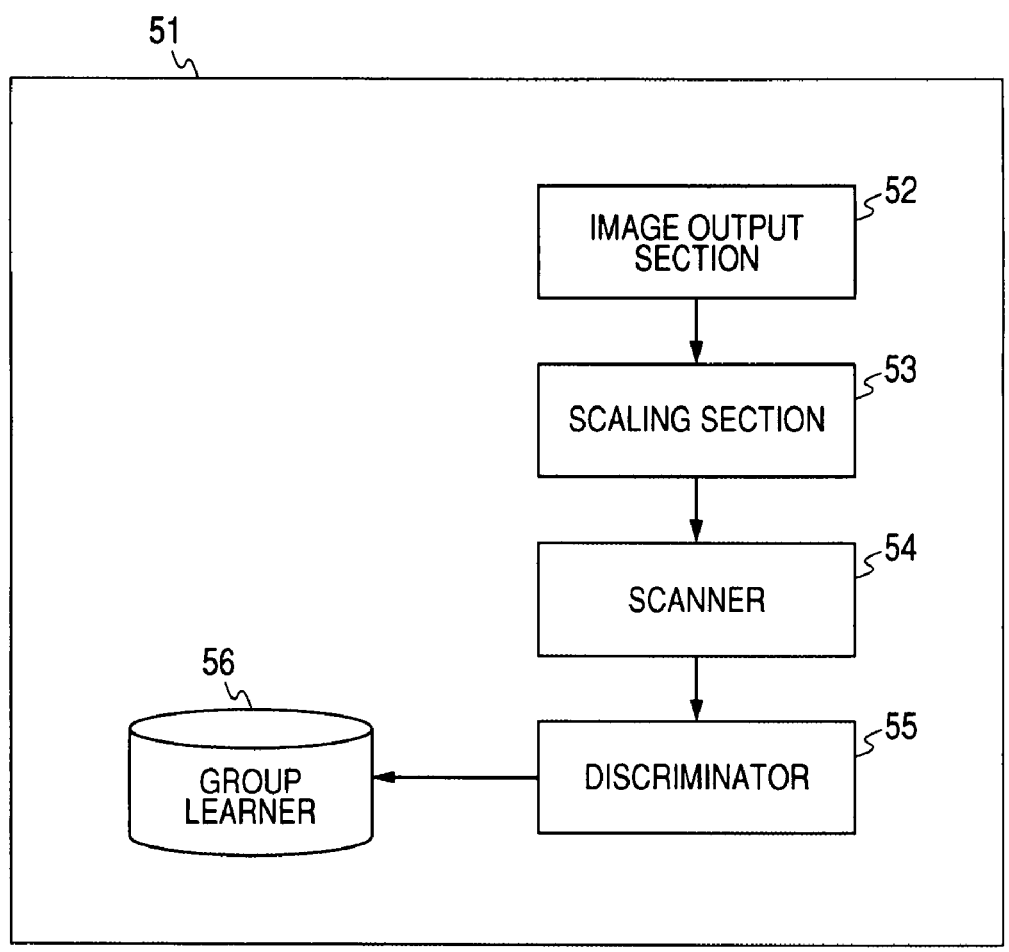
FIG. 12 is a functional block diagram showing processing functions of the object detection apparatus to which the invention is applied.

FIG. 12 shows an exemplary configuration of the object detection apparatus 51 to which the invention is applied. The object detection apparatus 51 detects an object of interest from a given image (input image).

Figure 1:
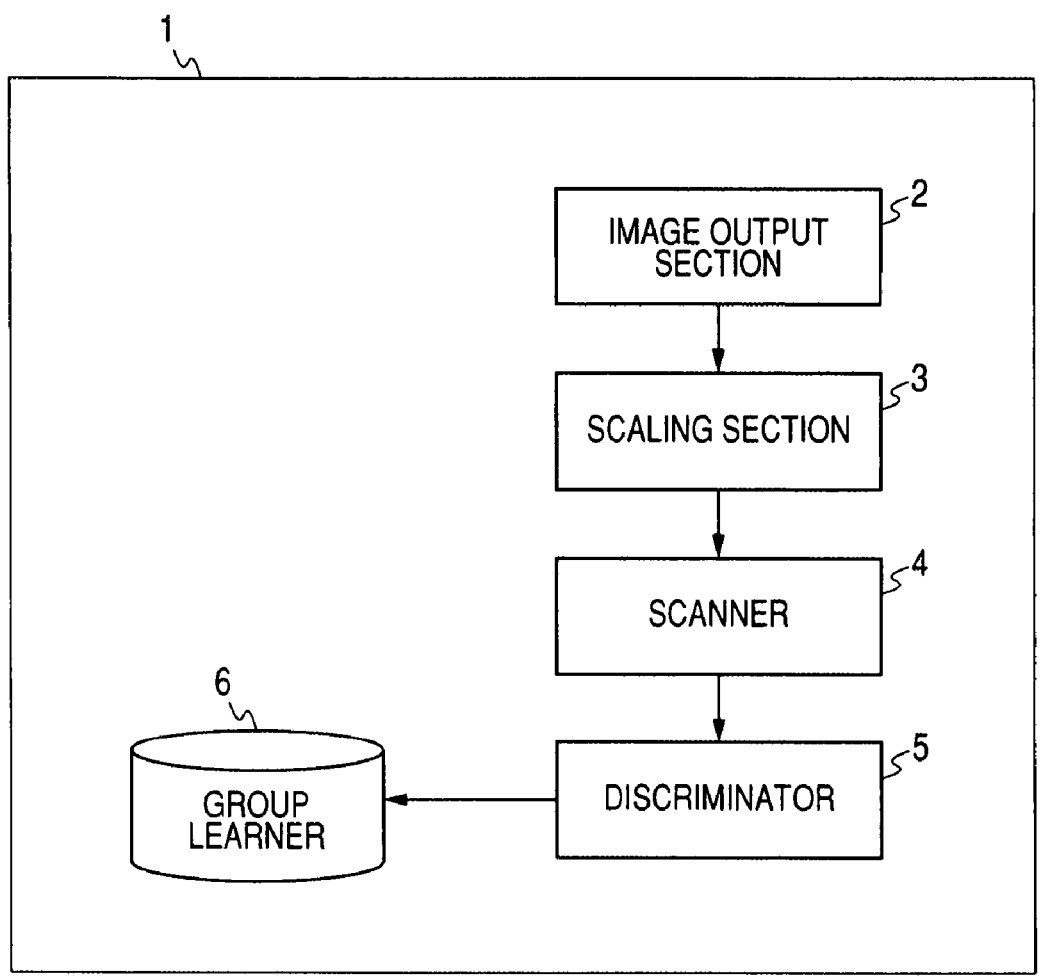
FIG. 1 is a functional block diagram showing processing functions of an object detection apparatus of related art.

An image output section 52 outputs a grayscale image (brightness image) as the input image inputted to the object detection apparatus 51, as in the image output section 2 in FIG. 1.

A scaling section 53 enlarges or reduces, that is, scales, the input image, as in the scaling section 3 in FIG. 1.

A scanner 54 uses a window of a predetermined size to sequentially scan the scaled input image in the direction, for example, from the upper left to the lower right and outputs the image in the window as the window image, as in the scanner 4 in FIG. 1.

A discriminator 55 is formed of tree-structured nodes having a plurality of weak discriminators and the like, and discriminates whether each window image sequentially moved by the scanner 54 in the scan operation is the object of interest or an object of no interest.

That is, the scaling section 53 outputs scaled images obtained by enlarging or reducing the input image to all specified scales.

The scanner 54 uses the window having a size of the object of interest to be detected to sequentially scan each scaled image so as to cut out window images, and the discriminator 55 discriminates whether or not each window image is a face.

The discriminator 55 refers to the learning result of a group learner 56 that performs group learning on a plurality of weak discriminators that form the discriminator 55 so as to discriminate whether the current window image is the object of interest, such as a face image, or an object of no interest (an image other than a face image).

The object detection apparatus 51 outputs multiple pieces of area information when a plurality of objects of interest are detected from the input image. Furthermore, when some of the areas of the plurality pieces of area information overlap with each other, the object detection apparatus 51 can also select the area evaluated as most likely being the object of interest using a method that will be described later.

The image (grayscale image) outputted from the image output section 52 is first inputted into the scaling section 53. The scaling section 53 uses bilinear interpolation to reduce the size of the image. In this embodiment, the scaling section 53 does not initially generate a plurality of reduced images but repeats the operation of outputting a necessary image to the scanner 54 and generating the next further reduced image after the necessary image is processed.

Figure 2:
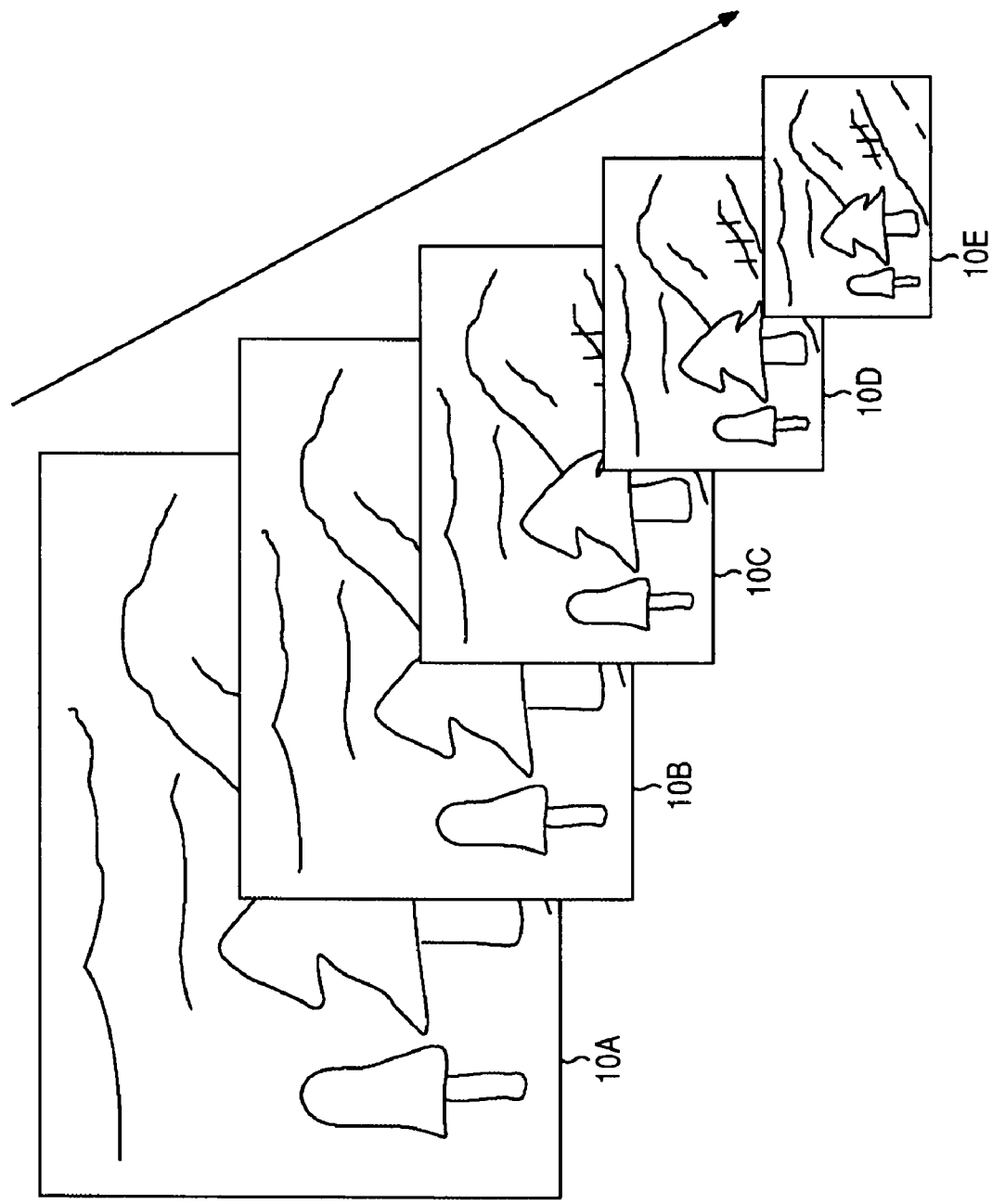
FIG. 2 is a view for explaining scale conversion.

That is, as in the case shown in FIG. 2, the scaling section 53 first outputs the input image 10A to the scanner 54 as it is. Then, the scaling section 53 waits for completion of the processes on the input image 10A performed in the scanner 54 and the discriminator 55, and then generates the input image 10B obtained by reducing the size of the input image 10A. Furthermore, the scaling section 53 waits for completion of the processes on the input image 10B performed in the scanner 54 and the discriminator 55, and then outputs the input image 10C obtained by further reducing the size of the input image 10B to the scanner 54. In this way, the scaling section 53 sequentially generates further reduced images, such as 10D and 10E, and terminates this process when the image size of the reduced image becomes smaller than the size of the window that the scanner 54 moves in the scan operation. Upon the termination of this process, the image output section 52 outputs the next input image to the scaling section 53.

Figure 3:
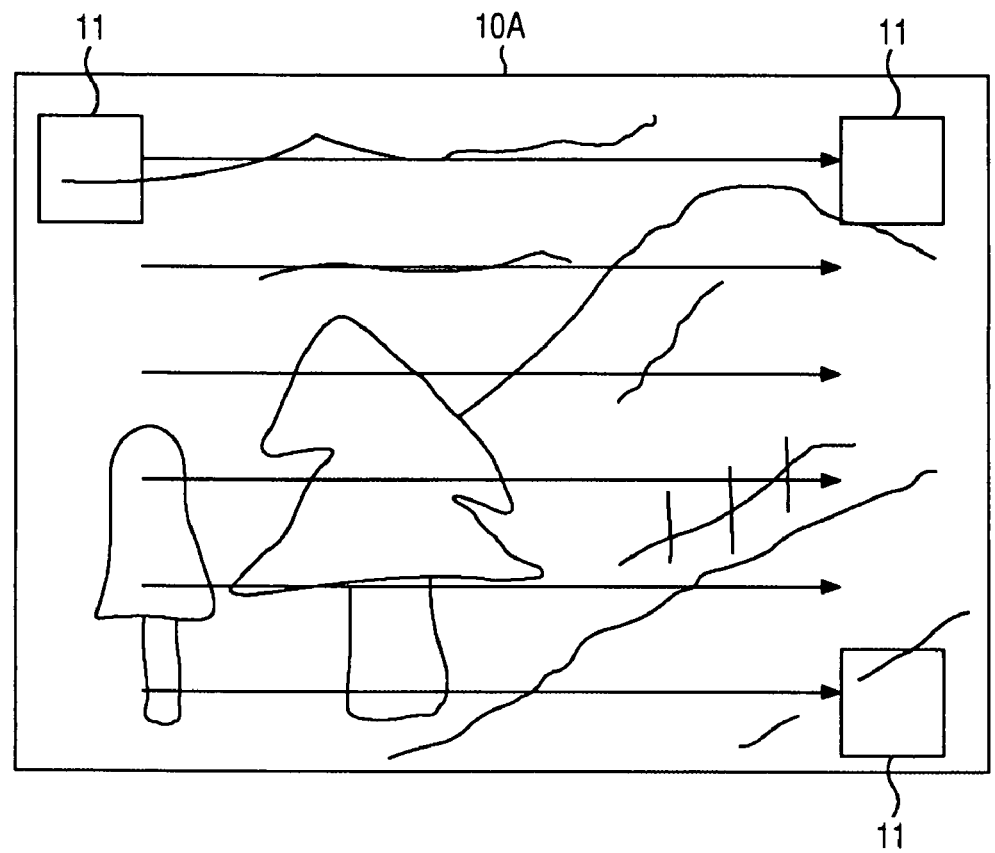
FIG. 3 is a view for explaining how to move a search window in the scan operation.

In the scanner 54, as in the case shown in FIG. 3, the window 11 having the same size as the window size that the subsequent discriminator 55 accepts is sequentially applied to the whole part (screen) of the given image, such as the image 10A, and the image in the window 11 at each position (hereinafter referred to as a cutout image or a window image) is outputted to the discriminator 55.

Figure 4:
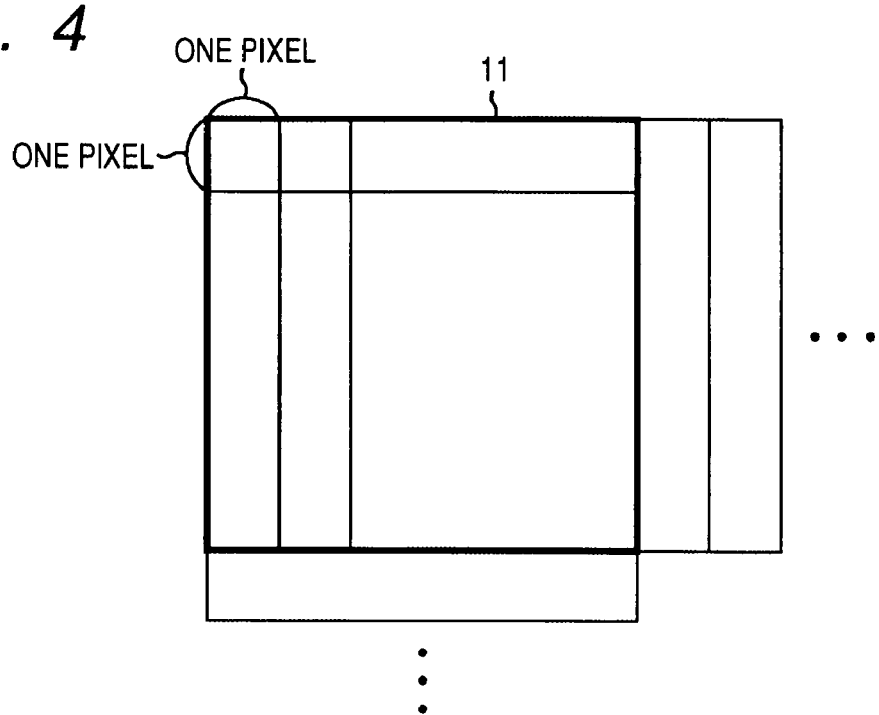
FIG. 4 is a view for explaining the movement of the search window.
Figure 5:
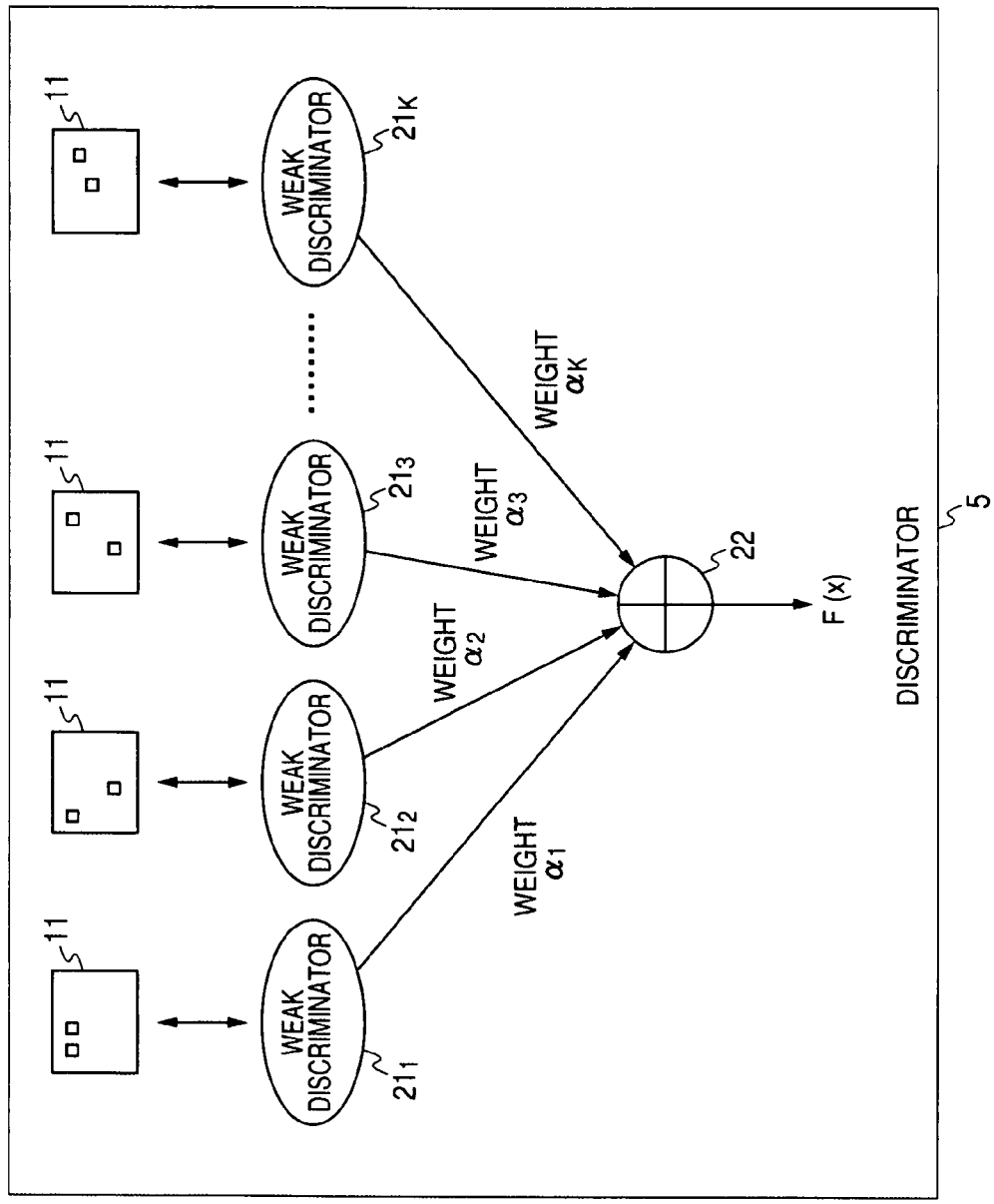
FIG. 5 shows the configuration of a discriminator.

The window 11 is moved in the scan operation on a pixel basis, as in the case shown in FIG. 4. That is, after the cutout image in the window 11 at a predetermined position is outputted from the scanner 54, in the next scan, the window 11 moves rightward by one pixel and the cutout image in the window 11 at that position is supplied to the discriminator 55.

Although the window size is fixed, the scaling section 53 sequentially reduces the input image, so that the image size of the input image is converted into various scales as described above, allowing detection of an object of an arbitrary size.

That is, a face of any size in the input image is sequentially reduced and the image size eventually becomes substantially the same as the window size. As a result, it can be detected whether or not the image in the window 11 is a human face image.

The discriminator 55 judges whether or not the cutout image provided from the preceding stage is the object of interest, such as a face.

Figure 13:
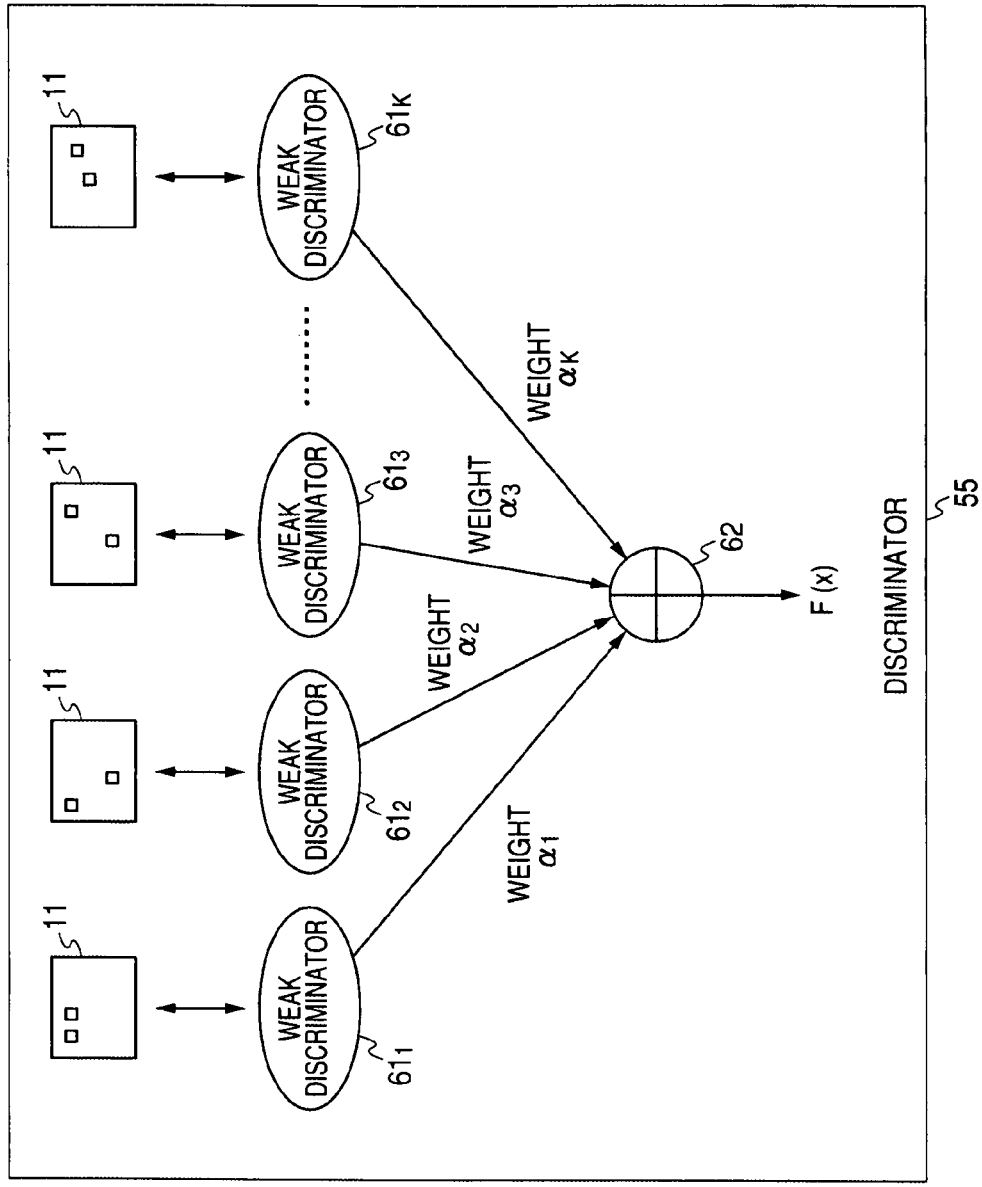
FIG. 13 shows the configuration of a discriminator.

As shown in FIG. 13, the discriminator 55 includes a plurality of weak discriminators $61_i$ (i=1, 2, 3, ..., K) obtained by ensemble learning and an adder 62 that multiplies the outputs (discrimination results) from the weak discriminators by respective corresponding weights $\alpha_i$ (i=1, 2, 3, ..., K) to determine the weighted majority decision F(x).

Each of the weak discriminators $61_1$ to $61_K$ discriminates whether or not the image in the window 11 is a human face image based on two pixels at arbitrary positions among the pixels in the window 11. The reference character K corresponds to the number of combinations of two pixels extractable from the image in the window 11.

In the discriminator 55, each weak discriminator $61_i$ successively outputs the estimated value f(x) indicative of whether or not the input window image is the object of interest, and the adder 62 calculates and outputs the weighted majority decision F(x). According to the value of the weighted majority decision F(x), a judgment unit (not shown) makes final judgment of whether or not the window image is the object of interest.

The group learner 56 uses group learning to learn in advance the weak discriminators $61_i$ and weights to be multiplied to the outputs (estimated values) of the weak discriminators using a method that will be described later.

As group learning, any specific approaches can be applied as far as they can determine the result of a plurality of weak discriminators in a majority decision process. For example, group learning using boosting, such as AdaBoost in which data are weighted to make a weighted majority decision, can be applied.

Each of the weak discriminators $61_i$ that form the discriminator 55 uses difference in brightness between two pixels (inter-pixel difference feature) as the amount of feature for the purpose of discrimination. Then, each of the weak discriminators $61_i$ compares the amount of feature of the window image with the amount of feature learned by using learning samples formed of a plurality of grayscale images that have been labeled in advance as the object of interest or an object of no interest, so as to output an estimated value for estimating whether or not the window image is the object of interest in a deterministic or probabilistic manner.

The adder 62 multiplies the estimated value of each weak discriminator $61_i$ by the weight, which is reliability for each weak discriminator $61_i$, sums the weighted values and outputs the summed value (the value of the weighted majority decision) In AdaBoost, the plurality of the weak discriminators $61_i$ sequentially calculate estimated values, according to which the value of the weighted majority decision is successively updated.

The plurality of the weak discriminators are successively generated by the group learner 56 that uses the above learning samples to perform group learning according to an algorithm, which will be described later. The plurality of the weak discriminators calculate the above estimated values, for example, in the order the weak discriminators are generated.

The weight (reliability) for the weighted majority decision is learned in the learning process in which the weak discriminators are generated, which will be described later.

The weak discriminator $61_i$, for example, as in AdaBoost where the weak discriminator outputs a binary value, uses a threshold value to binarize the inter-pixel difference feature so as to discriminate between the object of interest and the object of no interest. A plurality of threshold values may be used for the purpose of discrimination. Alternatively, as in Real-AdaBoost, for example, the weak discriminator may use the inter-pixel difference feature to output a continuous value indicative of the likelihood of being the object of interest in a probabilistic manner. What these weak discriminators $61_i$ need, such as the amount of feature for the purpose of discrimination, is also learned in the learning process according to the algorithm.

Furthermore in this embodiment, during the weighted majority decision process, without waiting for the calculation results from all weak discriminators but the calculation is aborted even in the course thereof when it is judged by the calculated value at that point that the window image is not the object of interest. Therefore, the abort threshold value (reference value) is learned in the learning process. This abort process allows significant reduction in the amount of computation in the detection process. In this way, it is possible to proceed to the discrimination process for the next window image in the course of the calculation without waiting for the calculation results from all weak discriminators, allowing faster processing.

Thus, the discriminator 55 functions as a judgment unit for not only calculating the weighted majority decision as an evaluation value for judging whether or not the window image is the object of interest but also judging whether or not the window image is the object of interest based on the evaluation value.

Furthermore, whenever the plurality of weak discriminators generated in advance in the learning process output estimated values, the discriminator 55 multiplies the estimated values by weights for respective weak discriminators obtained in the learning process and sums the weighted values to update the value of the weighted majority decision. Whenever the value of the weighted majority decision (evaluation value) is updated, the abort threshold value is used to control whether or not to abort the calculation of the estimated values.

The discriminator 55 is generated by using learning samples to perform group learning according to a predetermined algorithm in the group learner 56. In the following description, a group learning method in the group learner 56 will be first described, and then a method for using the discriminator 55 obtained by the group learning to discriminate the object of interest from the input image.

(2) Group Learner

The group learner 56 that uses the boosting algorithm to perform group learning combines a plurality of weak discriminators as described above to perform learning such that a strong discrimination result is ultimately obtained.

Although the each individual weak discriminator has quite a simple configuration and poor ability to discriminate between a face and a non-face by itself, for example, hundreds to thousands of weak discriminators can be combined to provide high discrimination ability.

The group learner 56 uses, for example, thousands of sample images called learning samples, each including an object of interest and an object of no interest, for example, a face image and a non-face image, which are provided (labeled) with respective correct answers in advance. The group learner 56 then selects (learns) one hypothesis from a large number of learning models (a combination of hypotheses) according to a predetermined learning algorithm so as to generate weak discriminators and determines how to combine the weak discriminators.

Although the weak discriminator itself has poor discrimination performance, appropriately selecting and combining weak discriminators can ultimately provide a discriminator having high discrimination ability. Therefore, the group learner 56 learns how to combine weak discriminators, that is, how to select weak discriminators. The group learner 56 also learns weights used for performing the weighted majority decision on the outputs of the weak discriminators and the like.

A description will now be made of a learning method for the group learner 56 for obtaining a discriminator having a large number of appropriate weak discriminators combined according to the learning algorithm. Before the description of the learning method for the group learner 56, a description will be made of, among the learning data to be learned in the group learning process, the inter-pixel difference feature for forming the weak discriminator and the abort threshold value (reference value) for aborting detection in the course of the discrimination process (detection process).

(2-1) Configuration of the Weak Discriminator (Inter-Pixel Difference Feature)

The discriminator 55 in this embodiment includes a plurality of weak discriminators. Each weak discriminator has quite a simple configuration in which difference in brightness between two pixels (inter-pixel difference feature) selected from all pixels in an input image is used to discriminate between a face and a non-face. This increases the speed of calculation of the discrimination result of the weak discriminator in the discrimination process.

The image to be inputted to the weak discriminator is a learning sample in the learning process, while the input image is a window image cut out from the scaled image in the discrimination (identification) process.

Figure 14:
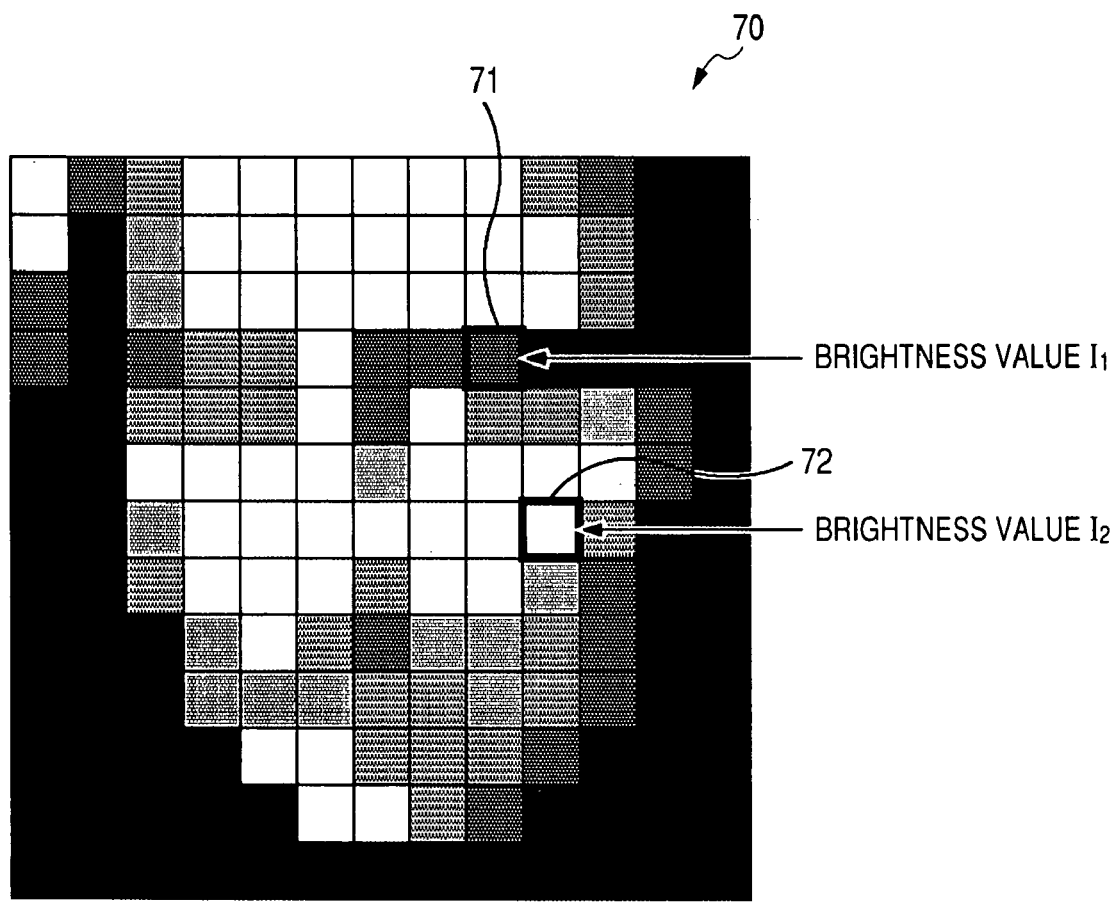
FIG. 14 is a view for explaining the inter-pixel difference feature.

FIG. 14 is a diagrammatic view showing an image for explaining the inter-pixel difference feature. In the image 70, difference in brightness between two arbitrary pixels, for example, the difference between the brightness value $I_1$ of the pixel 71 and the brightness value $I_2$ of the pixel 72, that is, the value d obtained from the following equation (1) is defined as the inter-pixel difference feature in this embodiment.

$$d = I_1 - I_2 \quad (1)$$

The ability of the weak discriminator depends on which inter-pixel difference feature d is used for face detection. Therefore, a pair of pixel positions used for the weak discriminator needs to be selected from the combinations of arbitrary two pixels (also called a filter or a weak hypothesis) in the sample image or the window image.

For example, in AdaBoost, the weak discriminator may be required to provide a deterministic output of +1 (the object of interest) or −1 (an object of no interest). Then, in AdaBoost, the weak discriminator can be generated by using one or more threshold values to binarize (+1 or −1) the inter-pixel difference feature d at arbitrary pixel positions.

In a boosting algorithm, such as Real-AdaBoost and Gentle Boost in which a continuous value (real number) indicative of the probability distribution of the learning sample instead of such a binary output is outputted in a probabilistic manner, the weak discriminator outputs likelihood (probability) indicating that the input image is the object of interest. The output of the weak discriminator may thus be deterministic or probabilistic. Firstly, the weak discriminator that outputs such binary values will be described.

(2-1-1) Weak Discriminator that Outputs a Binary Output

The weak discriminator that produces a deterministic output makes two-class discrimination between the object of interest and an object of no interest according to the value of inter-pixel difference feature d. Letting $I_1$ and $I_2$ be the brightness value of two pixels in a target image area and $Th_1$ be the threshold value for discriminating between the object of interest and an object of no interest according to the inter-pixel difference feature d, whether or not the following equation (2) is satisfied determines which class the learning sample belongs to:

$$I_1 - I_2 > Th_1 \quad (2).$$

To form the weak discriminator at this point, it is necessary to determine the positions of the two pixels and the threshold value. A method for determining these values will be described later. The threshold value-based judgment using the equation (2) shows the simplest case. In the threshold value-based judgment, two threshold values expressed by the following equation (3) or (4) may be used:

$$Th_{11} > I_1 - I_2 > Th_{12} \quad (3)$$

$$I_1 - I_2 < Th_{21} \text{ or } Th_{22} > I_1 - I_2 \quad (4).$$

Figure 15A:
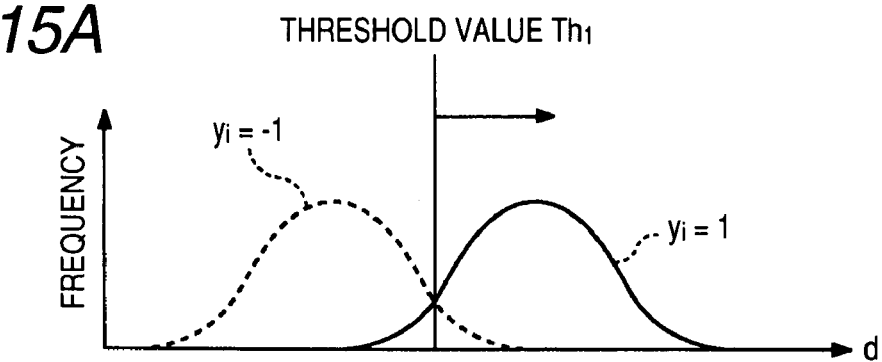
FIGS. 15A to 15C are views for explaining the relationship between the inter-pixel difference feature and the threshold value.
Figure 15B:
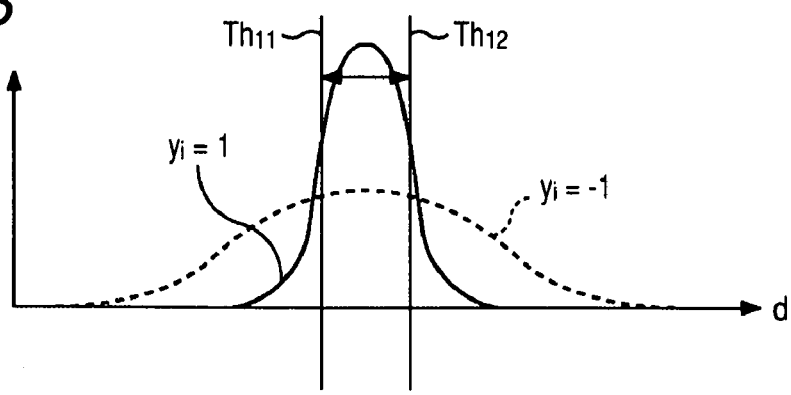
Figure 15C:
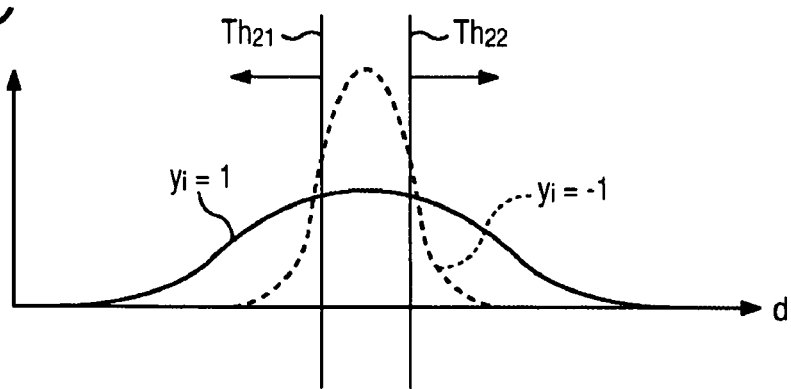

FIGS. 15A to 15C, where the vertical axis represents data frequency and the horizontal axis represents the inter-pixel difference feature d, are diagrammatic views showing three discrimination methods expressed by the above equations (2) to (4) and drawn in accordance with respective characteristic examples of data frequency distribution. In FIGS. 15A to 15C, $y_i$ represents the output of the weak discriminator. Specifically, the broken lines represent the distribution of the learning samples judged to be $y_i = -1$ (an object of no interest), and the solid lines represent the distribution of the learning samples judged to be $y_i = 1$ (the object of interest). The histograms shown in FIGS. 15A to 15C are obtained by plotting the frequency having the same inter-pixel difference feature d for a large number of learning samples including a face image and a non-face image.

Figure 16:
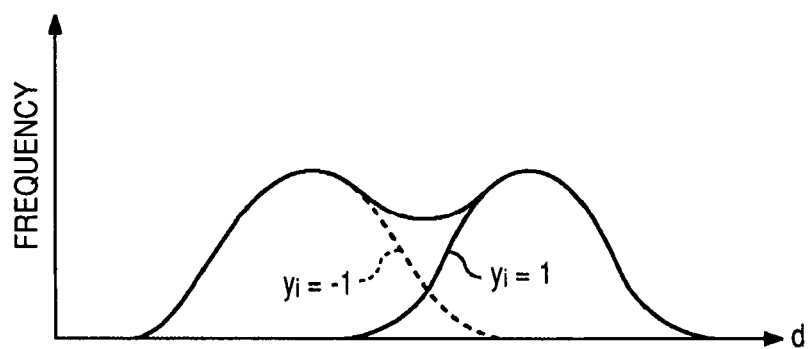
FIG. 16 is a view for explaining frequency distribution.

The solid line and the broken line represent the frequency judged to be $y_i = 1$ and $y_i = -1$ independent of each other. Therefore, for example, FIG. 16 shows the distribution obtained by summing the distribution graphs for the inter-pixel difference feature d shown in FIG. 15A.

As shown in FIG. 15A, when the broken-line indicative of an object of no interest and the solid-line indicative of the object of interest similarly distribute in the form of a normal curve and the peak positions of the distribution curves are shifted from each other in the horizontal direction, the threshold value $Th_1$ is set at the intersection of the distribution curves and the equation (2) can be used to discriminate between the object of interest and an object of no interest.

In AdaBoost, for example, letting f(x) be the output (discrimination result) of the weak discriminator, the output f(x) is 1 (the object of interest) or −1 (an object of no interest). FIG. 15A shows an example where the learning sample is judged to be the object of interest when the inter-pixel difference feature d is larger than the threshold value $Th_1$ and hence the output of the weak discriminator f(x) becomes 1.

When the peak positions of the two histograms are at substantially the same position and the width of the distribution of one histogram differs from that of the other histogram, values in the vicinity of the upper and lower limits of the inter-pixel difference feature d of the histogram having a narrower distribution width can be used as the threshold values to discriminate between the object of interest and an object of no interest based on the above equation (3) or (4).

FIG. 15B shows an example where the histogram having a narrower distribution width is judged to be the object of interest and hence the output of the weak discriminator f(x) becomes 1, while FIG. 15C shows an example where the histogram obtained by subtracting the histogram having the narrower distribution width from the histogram having the wider distribution width is judged to be the object of interest and hence the output of the weak discriminator f(x) becomes 1.

While the weak discriminator is formed by determining an inter-pixel difference feature d and a threshold value therefor, it is necessary to select an inter-pixel difference feature d that minimizes the error rate or maximized the discrimination rate of the judgment.

For example, the threshold value is determined by selecting the positions of two pixels, determining a histogram for learning samples labeled to be correct, such as any one of those shown in FIGS. 15A to 15C, and searching for a threshold value that provides the highest correct answer rate, in other words, the lowest incorrect answer rate (error rate).

The positions of the two pixels along with the threshold value may be selected, for example, to provide the lowest error rate. However, in AdaBoost, a weight (data weight) that reflects the difficulty level of discrimination is applied to each learning sample, and the learning process is performed such that an appropriately selected inter-pixel difference feature d (the feature value defined by the brightness values of two pixels at appropriately selected positions) provides the lowest weighted error rate, which will be described later.

(2-1-2) Weak Discriminator that Outputs a Continuous Value

An example of the weak discriminator that produces a probabilistic output is a weak discriminator that outputs a continuous value in Real-AdaBoost, Gentle Boost and the like, as described above. Unlike the above-mentioned case where a predetermined fixed value (threshold value) is used to solve a discrimination problem and the binary output (f(x)=1 or −1) is outputted, the weak discriminator in this case outputs the likelihood indicating that the input image is the object of interest, for example, as a probability density function.

Such a probabilistic output indicative of the likelihood (probability) of being the object of interest can be a function f(x) expressed by the following equation (5):

$$f(x) = P_p(x) - P_n(x) \qquad (5).$$

where $P_p(x)$ is a probability density function indicating that the learning sample is the object of interest and $P_n(x)$ is a probability density function indicating that the learning sample is the object of no interest when the inter-pixel difference feature d is inputted.

Figure 17A:
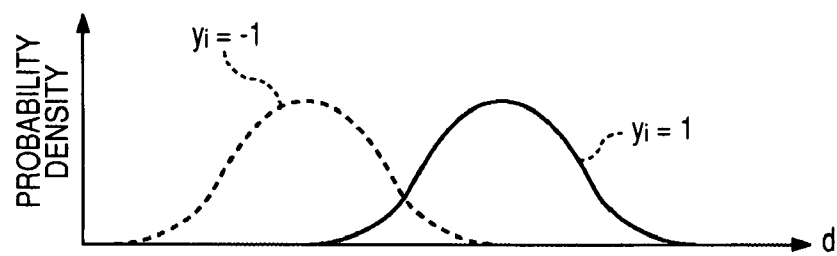
FIGS. 17A and 17B are views for explaining the inter-pixel difference feature based on the probability density.
Figure 17B:
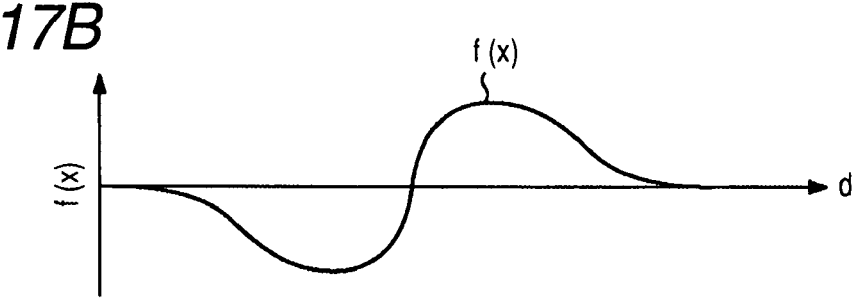

FIG. 17A, where the vertical axis represents the probability density and the horizontal axis represents the inter-pixel difference feature d, shows a characteristic example of data frequency distribution. FIG. 17B, where the vertical axis represents the value of the function f(x) and the horizontal axis represents the inter-pixel difference feature d, shows the function f(x) for the data distribution shown in FIG. 17A. In FIG. 17A, the broken line represents the probability density indicative of being an object of no interest, while the solid line represents the probability density indicative of being the object of interest. FIG. 17B shows the function f(x) obtained from the above equation (5). In the learning process or the discrimination process, the weak discriminator outputs the function f(x) corresponding to the inter-pixel difference feature d expressed by the above equation (1) and obtained from the inputted learning sample or window image. The function f(x) indicates the likelihood of being the object of interest, and can have continuous values, for example, ranging from −1 to 1, where −1 represents an object of no interest and 1 represents the object of interest. For example, by storing a table formed of the values of inter-pixel difference feature d and corresponding values of f(x), a value of f(x) can be read out from the table and outputted according to the input. Therefore, although the amount of storage may be slightly larger than the fixed threshold value $Th_1$ or the fixed threshold values $Th_{11}$ and $Th_{12}$ or $Th_{21}$ and $Th_{22}$, discrimination performance will be improved.

By using the plurality of estimation methods (discrimination methods) in combination in the ensemble learning, it can be expected that the discrimination performance is improved. Alternatively, only any one of the discrimination methods can be used to enhance execution speed performance.

Although the threshold value-based judgment expressed by the simplest equation (2) of the above discrimination methods and performed on the inter-pixel difference feature d provides significantly satisfactory discrimination result, which discrimination method will allow the weak discriminator to effectively function varies depending on the problem to be solved. Therefore, a method for setting the threshold value may be selected as appropriate. In some problems, difference in brightness among three or more pixels, instead of difference in brightness between two pixels, may be used as the amount of feature.

(2-2) Abort Threshold Value

The abort threshold value will be described below.

In general, as described above, in the boosting-based group learner, the outputs of all weak discriminators that form the discriminator 55 undergo the weighted majority decision to discriminate whether or not the window image is the object of interest.

The weighted majority decision is calculated by successively summing the discrimination results (estimated values) of the weak discriminators. For example, letting $t\ (=1, \ldots, K)$ be the number of weak discriminators, $\alpha_t$ be the majority decision weight (reliability) corresponding to each of the weak discriminators, and $f_t(x)$ be the output of each of the weak discriminators, the value of the weighted majority decision F(x) in AdaBoost can be determined by the following equation (6):

$$F(x) = \sum_t \alpha_t f_t(x). \qquad (6)$$

Figure 18:
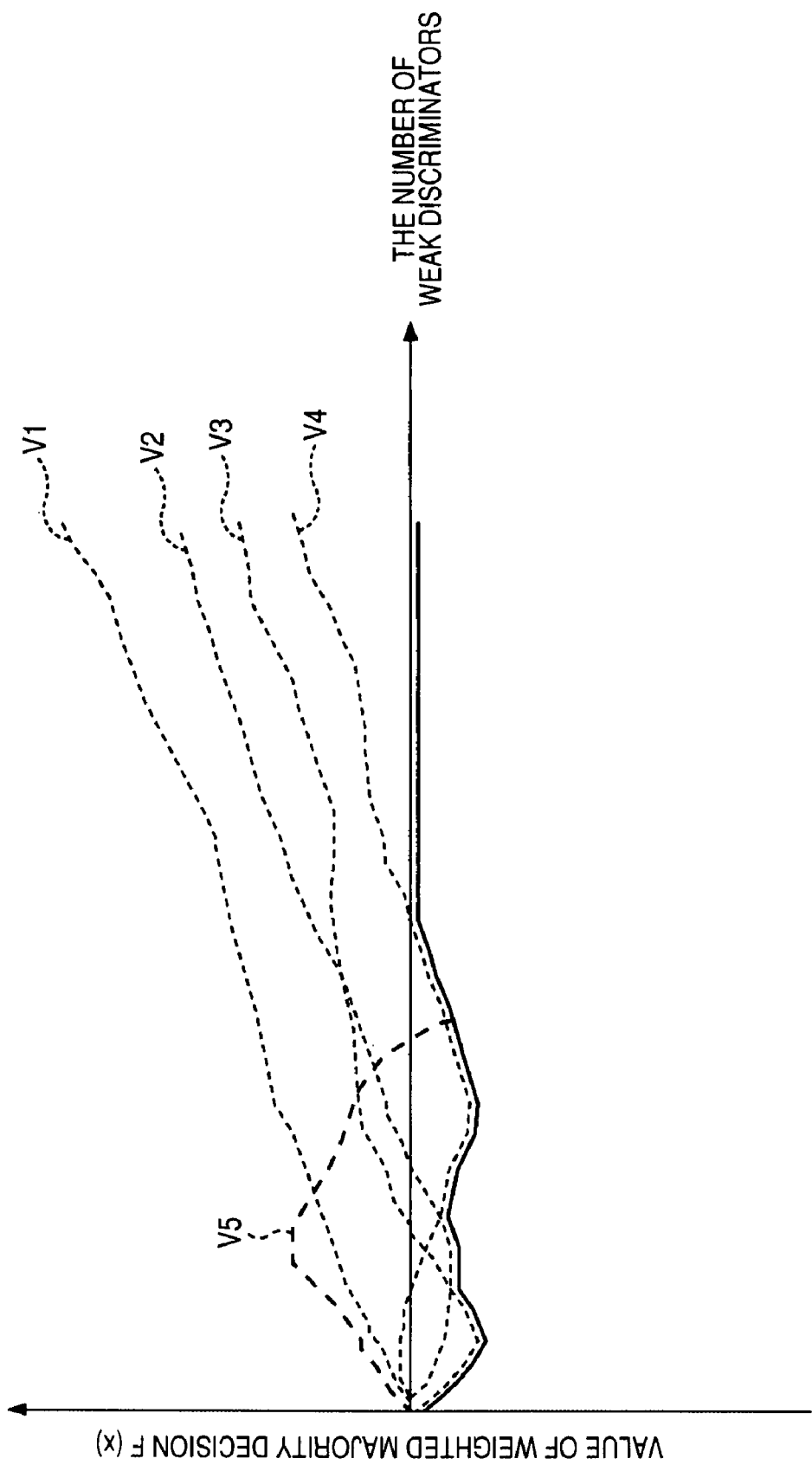
FIG. 18 shows the change in the value of the weighted majority decision F(x)

FIG. 18 show graphs illustrating the change in the value of the weighted majority decision F(x) according to whether or not the input image is the object of interest. In FIG. 18, the horizontal axis represents the number of weak discriminators and the vertical axis represents the value of the weighted majority decision F(x) expressed by the above equation (6), In FIG. 18, the data V1 to V4 indicated by the broken lines are obtained by inputting an image (learning sample) labeled as the object of interest, using the weak discriminators to successively calculate the estimated value f(x), and successively determining the value of the weighted majority decision F(x). As shown by the data V1 to V4, when the input image is the object of interest and a certain number of weak discriminators perform discrimination on these data, the value of the weighted majority decision F(x) becomes positive.

This embodiment introduces an approach different from the typical boosting algorithm. That is, in the process of successively summing the discrimination results of the weak discriminators, even before the results of all weak discriminators are obtained, the discrimination process for a window image that is discriminated apparently not to be the object of interest will be aborted. The abort threshold value (reference value) that determines whether or not to abort the discrimination process is learned during the learning process.

By using the abort threshold value, the computation of the estimated values f(x) of the weak discriminators can be aborted in the course of the computation when it can be reliably estimated that the window image is an object of no interest without using the output results of all weak discriminators. This allows significant reduction in the amount of computation and time necessary for the process, compared to the case where all weak discriminators are used to make a weighted majority decision.

The abort threshold value can be the minimum value of the possible weighted majority decision values obtained from the discrimination results of the learning samples representing the object to be detected among the labeled learning samples.

In the discrimination process, the discrimination result of the weak discriminator for the window image is successively weighted and outputted, that is, the value of the weighted majority decision is successively updated. The updated value is compared with the abort threshold value whenever the update is carried out, that is, whenever one weak discriminator outputs the discrimination result. When the updated value of the weighted majority decision is smaller than the abort threshold value, the window-image is judged not to be the object of interest and the calculation can be aborted. In this way, unnecessary computation is eliminated and the speed of the discrimination process can be increased.

That is, the abort threshold value $R_M$ for the output $f_M(x)$ of the M-th weak discriminator is set to the minimum value of the weighted majority decision F(x) obtained when, among the learning samples $x_i$ (i=1 to N), the learning sample $x_j$ (j=1 to J) that is the object of interest (positive sample) is used. The abort threshold value $R_M$ is defined as follows:

$$R_M = \min\left(\sum_{t=1}^{M} \alpha_t f_t(x_1), \sum_{t=1}^{M} \alpha_t f_t(x_2), \dots, \sum_{t=1}^{M} \alpha_t f_t(x_J), 0\right). \quad (7)$$

As expressed by the equation (7), when the minimum value of the weighted majority decision F(x) for the learning samples $x_1$ to $x_J$, each of which is the object of interest, is greater than zero, the abort threshold value $R_M$ is set to zero. The abort threshold value is manipulated not to exceed zero when using AdaBoost in which the threshold value zero is used for the purpose of discrimination, and this may be different depending on the approach of the group learning.

In AdaBoost, the abort threshold value $R_M$ is, as shown by the solid line in FIG. 18, set to the minimum value of the possible values of the weighted majority decision F(x) in all data V1 to V4 obtained when the object of interest is inputted as the input image. When the minimum value of the weighted majority decision F(x) in all data V1 to V4 exceed zero, the abort threshold value $R_M$ is set to zero.

In this embodiment, for example, by learning the abort threshold values $R_M$ ($R_1$ to $R_K$) whenever a weak discriminator is generated, in the discrimination process, which will be described later, where a plurality of weak discriminators successively output estimated values and the value of the weighted majority decision is successively updated, as indicated by data V5, when the updated value becomes lower than the abort threshold value $R_M$, the discrimination process to be performed by the subsequent weak discriminator will be terminated. That is, by learning the abort threshold values $R_M$, whenever the weak discriminator calculates the estimated value, it is possible to determine whether or not to perform the calculation for the next weak discriminator. The input image can be judged not to be the object of interest without waiting for the discrimination results of all weak discriminators when the input image is judged apparently not to be the object of interest, so that the computation can be aborted in the course thereof, resulting in faster detection process.

(3) Weak Discriminator Assembly Structure

The weak discriminator assembly structure in this embodiment will be described below. In this embodiment, a plurality of learning samples are used for learning. Each of the learning samples is formed of 24 by 24 pixels. Each of the learning samples is a human face image and includes various variations, such as illumination conditions and races.

In this embodiment, labeling is performed based on the attitude of the human face (head).

Figure 19:
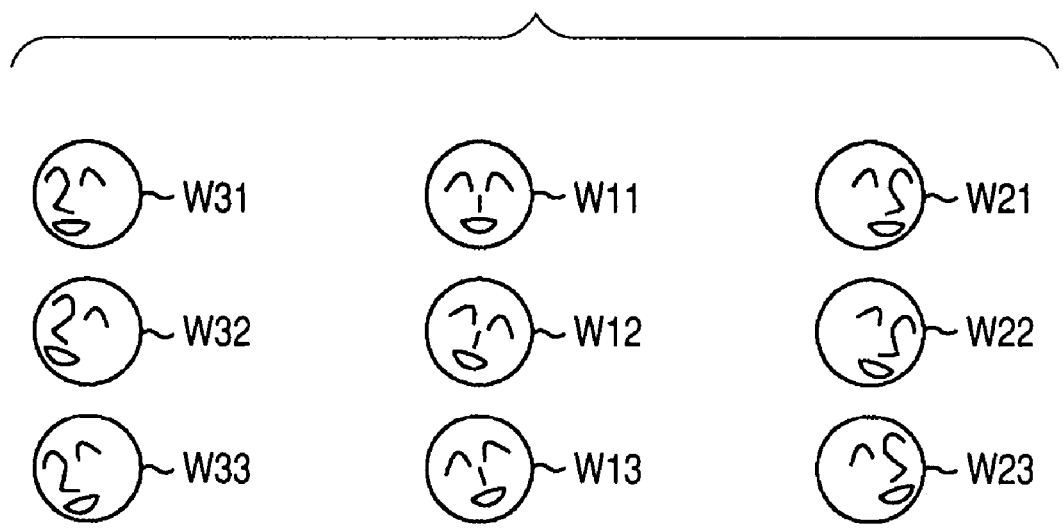
FIG. 19 shows an example of classification of learning samples.

As shown in FIG. 19, this embodiment uses learning samples that are classified (labeled) into nine groups (labels) formed of an image labeled as a frontward face (an image with a yaw angle ranging from −15 degrees to +15 degrees) (hereinafter referred to as the label W11 image), an image labeled as a leftward face (an image with a yaw angle ranging from +15 degrees to +65 degrees) (hereinafter referred to as the label W21 image), an image labeled as a rightward face (an image with a yaw angle ranging from −65 degrees to −15 degrees) (hereinafter referred to as the label W31 image), an image labeled as the frontward face rotated in the rolling direction by +20 degrees (hereinafter referred to as the label W12 image), an image labeled as the leftward face rotated in the rolling direction by +20 degrees (hereinafter referred to as the label W22 image), an image labeled as the rightward face rotated in the rolling direction by +20 degrees (hereinafter referred to as the label W32 image), an image labeled as the frontward face rotated in the rolling direction by −20 degrees (hereinafter referred to as the label W13 image), an image labeled as the leftward face rotated in the rolling direction by −20 degrees (hereinafter referred to as the label W23 image) and an image labeled as the rightward face rotated in the rolling direction by −20 degrees (hereinafter referred to as the label W33 image).

Figure 7A:
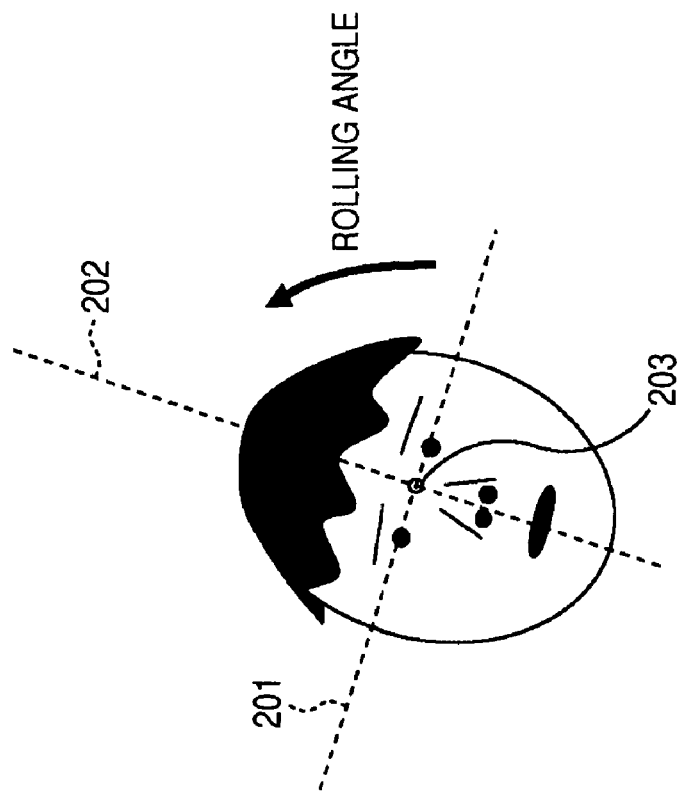
FIGS. 7A and 7B are views for explaining the face attitude angles.
Figure 7B:
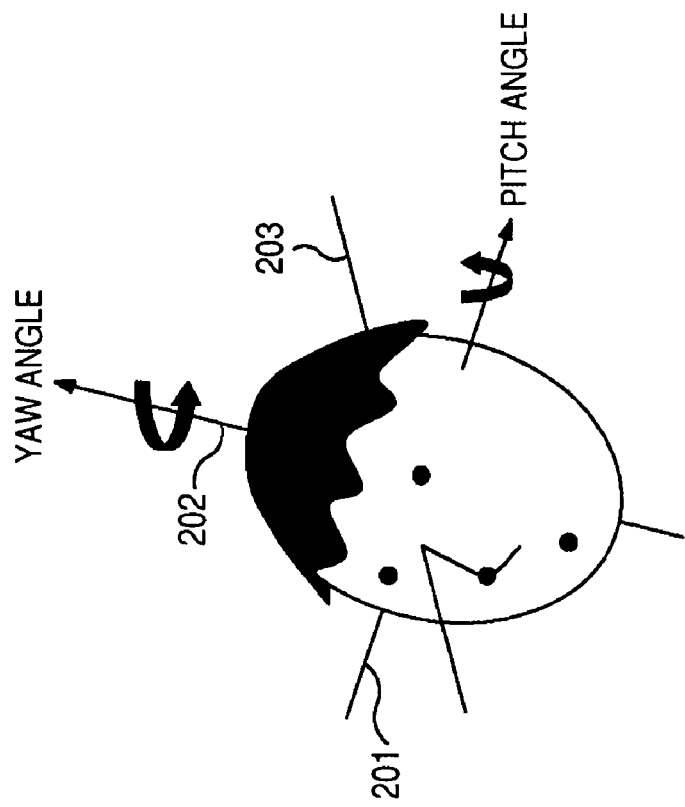
Figure 8:
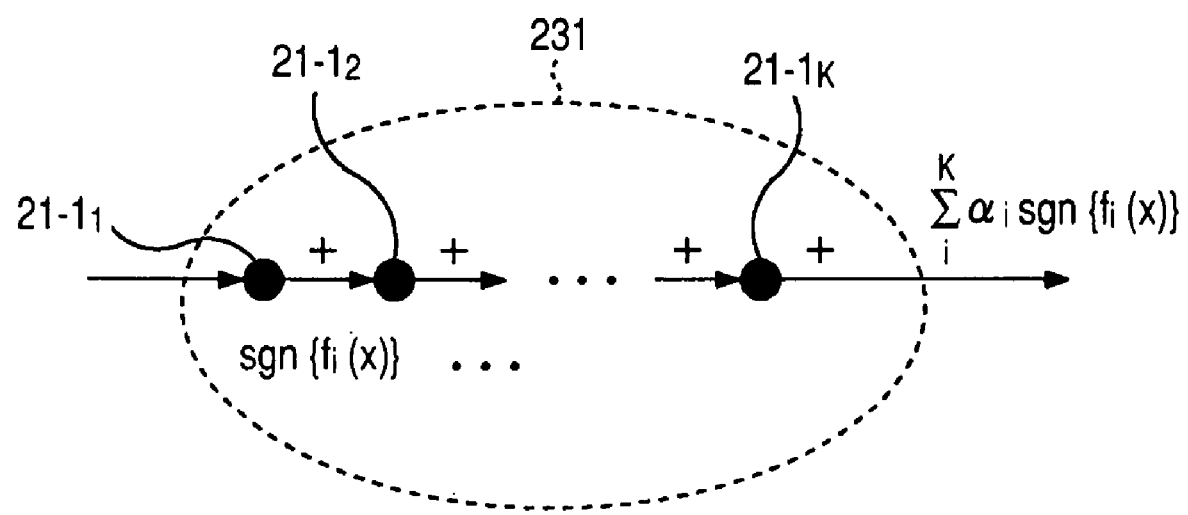
FIG. 8 is a view for explaining the configuration of an identifier in typical AdaBoost.
Figure 9:
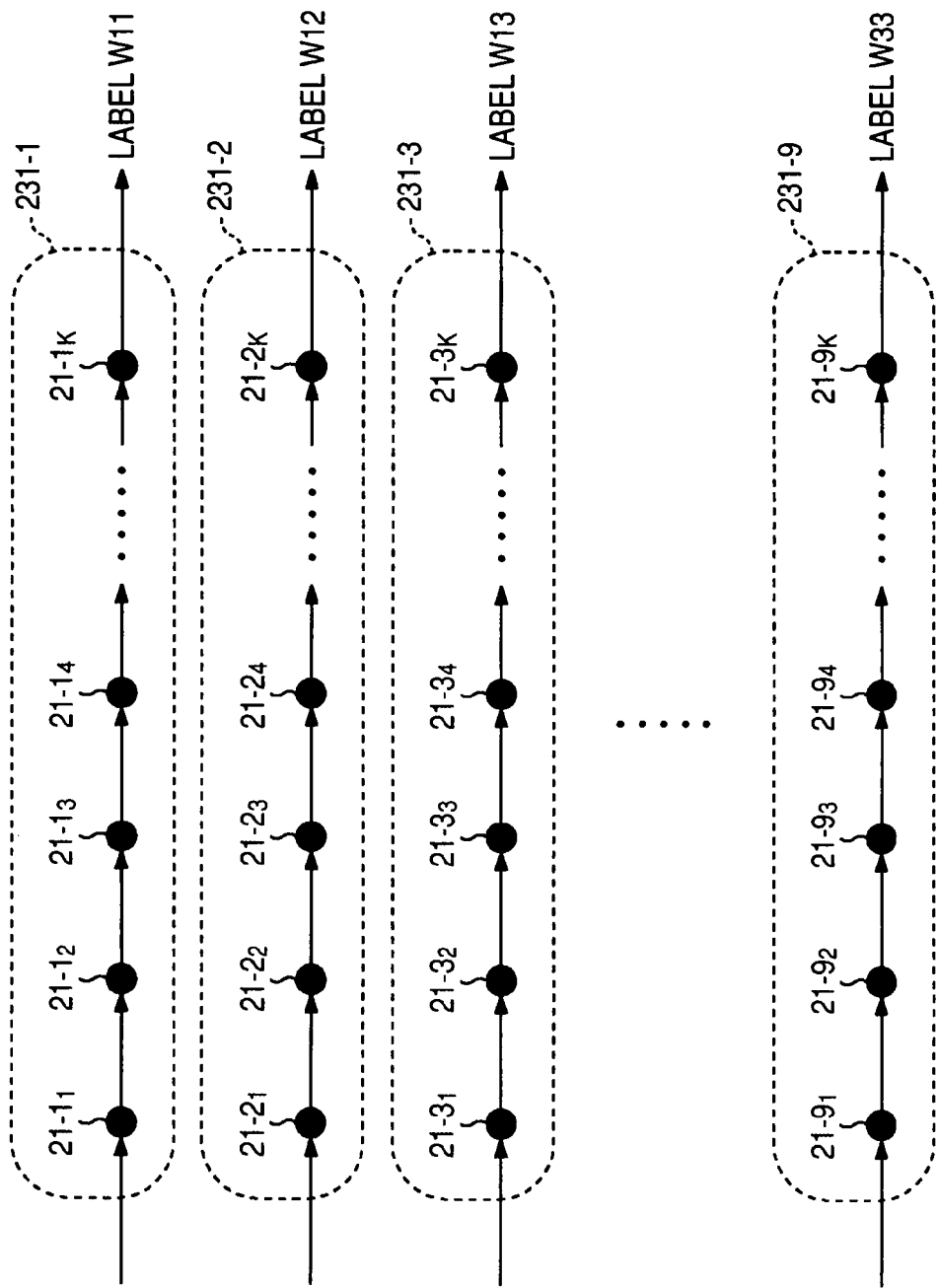
FIG. 9 is a view for explaining how typical AdaBoost identifies labels.
Figure 10:
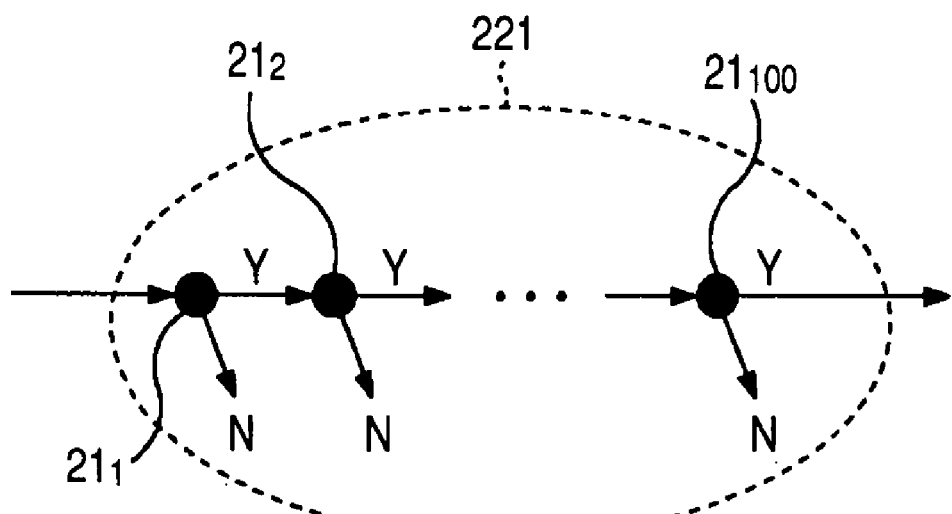
FIG. 10 shows the configuration of a node formed of weak discriminators having a reject judgment capability.
Figure 11:
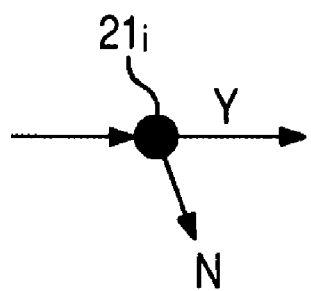
FIG. 11 shows the configuration of a weak discriminator having a reject judgment capability.

That is, the human face in this example is determined by the yaw angle and the rolling angle (FIGS. 7A and 7B), and images of the human faces having predetermined yaw angles and rolling angles are learned.

In this embodiment, a node is basically formed of a fixed number (100, for example) of weak discriminators, and each node is placed in a tree structure. Learning and hence identification is carried out such that each label image can be identified. A weak discriminator at a higher level of hierarchy learns all labels handled in the learning carried out in weak discriminators at lower levels of hierarchy.

Figure 20:
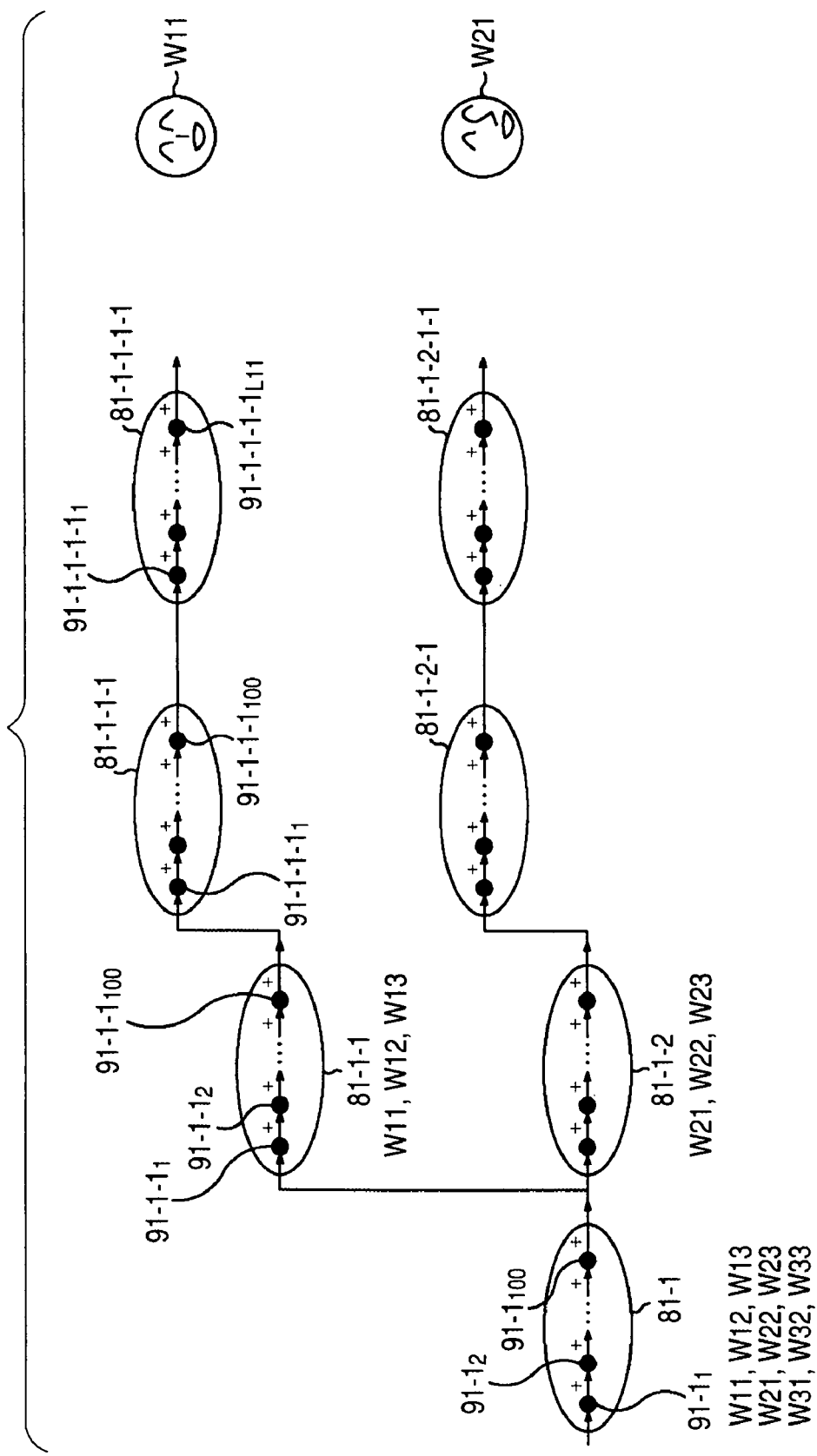
FIG. 20 is a view for explaining a tree structure of nodes in a learning process.

For example, to learn the images classified into the nine labels, that is, the labels W11 to W13, the labels W21 to W23 and the labels W31 to W33, the tree structure shown in FIG. 20 is formed.

The highest node 81-1 is formed of 100 weak discriminators $91\text{-}1_1$ to $91\text{-}1_{100}$. The node 81-1 learns the learning samples classified into the nine labels (all labels), that is, the labels W11 to W13, the labels W21 to W23 and the labels W31 to W33.

Two nodes 81-1-1 and 81-1-2 are formed as lower nodes of the node 81-1.

The node 81-1-1 is formed of 100 weak discriminators 91-1-1$_1$ to 91-1-1$_{100}$, and the node 81-1-2 is formed of 100 weak discriminators 91-1-2$_1$ to 91-1-2$_{100}$, although the reference characters thereof are not shown.

The nodes 81-1-1 and 81-1-2 are child nodes of the higher node 81-1, and the node 81-1 is the parent node relative to the nodes 81-1-1 and 81-1-2. The nodes 81-1-1 and 81-1-2 are brother nodes with respect to the parent node 81-1. The terms of a parent node and a child node are used in a relative sense, that is, a parent node that is placed under a node at an even higher level of hierarchy becomes a child node relative to that node.

The node 81-1-1 learns the label W11 to W13 images that relate to the frontward image among the learning samples classified into the nine labels that the parent node 81-1 learns, that is, the labels W11 to W13, the labels W21 to W23 and the labels W31 to W33.

The node 81-1-2 learns the label W21 to W23 images that relate to the leftward image among the labels that the parent node 81-1 learns.

A node 81-1-1-1 is provided as a lower node (child node) of the node 81-1-1. The node 81-1-1-1 is formed of 100 weak discriminators 91-1-1-1$_1$ to 91-1-1-1$_{100}$ and learns the label W11 learning sample.

A node 81-1-1-1-1 is provided as a lower node (child node) of the node 81-1-1-1. The node 81-1-1-1-1 is a terminal node that has no further lower node. The node 81-1-1-1-1 is formed of L11 weak discriminators 91-1-1-1-1$_1$ to 91-1-1-1-1$_{L11}$ and learns the label W11 learning sample.

A node 81-1-2-1 is provided as a lower node (child node) of the node 81-1-2. The node 81-1-2-1 is formed of 100 weak discriminators 91-1-2-1$_1$ to 91-1-2-1$_{100}$, although the reference characters thereof are not shown, and learns the label W21 learning sample.

A node 81-1-2-1-1 is provided as a lower node (child node) of the node 81-1-2-1. The node 81-1-2-1-1 is a terminal node that has no further lower node. The node 81-2-1-1-1 is formed of L21 weak discriminators 91-1-2-1-1$_1$ to 91-1-2-1-1$_{L21}$, although the reference characters thereof are not shown, and learns the label W21 learning sample.

The number of weak discriminators in the terminal node 81-1-1-1-1, L11, and the number of weak discriminators in the terminal node 81-1-2-1-1, L12, are set such that when each of the nodes learns the corresponding label learning sample, the weighted error rate $e_t$ becomes zero (sufficiently small value).

In this way, the number of weak discriminators can be reduced.

That is, when such a tree structure is not used, a large number of weak discriminators may be required as described with reference to FIGS. 8 to 11.

Figure 6:
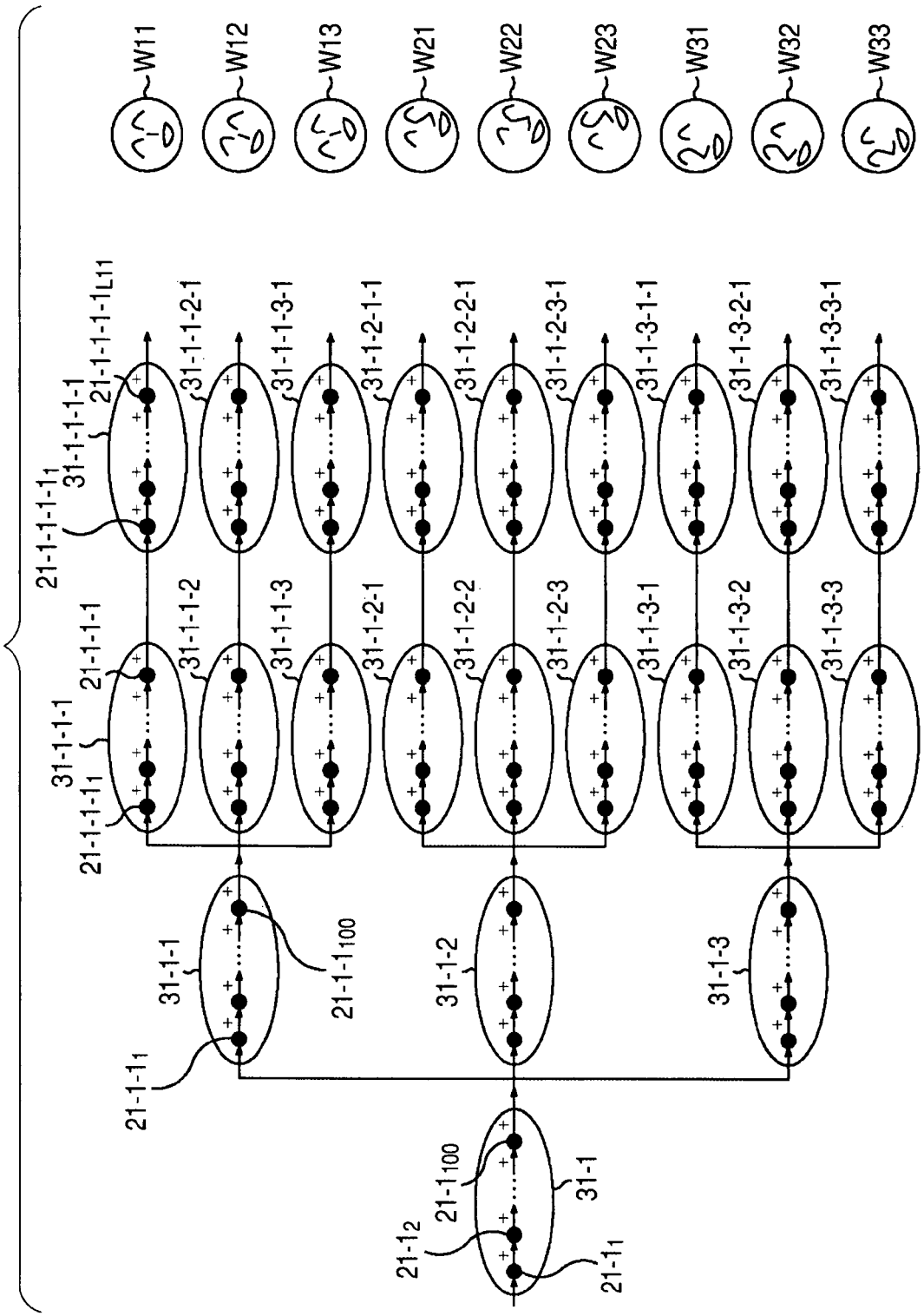
FIG. 6 is a view for explaining a tree structure of nodes in related art.

The tree structure shown in FIG. 20 differs from the tree structure shown in FIG. 6 although both tree structures learn the same learning samples. The tree structure shown in FIG. 20 does not have a node that learns the label W31 to W33 images (the node corresponding to the node 31-1-3) or nodes that learn the label W12, the label W13, the label W22, the label W23, the label W31, the label W32 and the label W33, respectively, (the nodes corresponding to the nodes 31-1-1-2; 31-1-1-2-1, 31-1-1-3, 31-1-1-3-1, 31-1-2-2, 31-1-2-2-1, 31-1-2-3, 31-1-2-3-1, 31-1-3-1, 31-1-3-1-1, 31-1-3-2, 31-1-3-2-1, 31-1-3-3 and 31-1-3-3-1). The reason for this will be described later.

As shown in FIG. 21, a data structure is defined for each of the nodes.

The node ID is the number for identifying each node. For example, the node ID of the node 81-1-1 is set to be the node ID in the data structure of the node 81-1-1.

The parent node ID represents the node ID of the parent node viewed from the node in question. The parent node of the node 81-1-1 is the node 81-1, and in this case the node ID of the node 81-1 is set. When there is no parent node (in the case of the highest node 81-1, for example), the parent node ID is set to −1.

As the child node ID, the ID of the child node is set. However, for example, the node 81-1-1-1-1 is a terminal node and has no child node, so that the node ID is set to −1.

The label represents the label of the sample that will be processed by the node in question. The label of the node 81-1-1-1-1 is set to be the label W11.

The number of weak discriminators represents the number of weak discriminators that the node in question has. In the case of the node 81-1-1-1-1, the number of weak discriminators is set to L11.

(4) Learning Method

The learning method for the group learner 56 will be described below.

As a prerequisite of a pattern recognition problem to find out whether or not given data is a face, and when it is a face, which direction the face is oriented, an image (training data) manually labeled (provided with the correct answer) in advance, which is a learning sample, is prepared.

Learning samples include a group of images obtained by cutting out the area of an object of interest to be detected (positive samples) and a group of random images cut out from an image that has nothing to do with the object of interest, such as a landscape image (negative samples).

A learning algorithm is applied based on these learning samples to generate learning data to be used during discrimination. The learning data used during discrimination are the following four learning data including the learning data described above:

(A) Pairs of positions of two pixels (K pairs)

(B) Threshold values of the weak discriminators (K values)

(C) Weights for the weighted majority decision (reliability of the weak discriminator) (K weights)

(D) Abort threshold values (K values)

The above information is set as the data structure (FIG. 21) for each weak discriminator in each node.

(4-1) Generation of Weak Discriminator

A description will be made of an algorithm for learning four types of learning data (A) to (D) listed above from learning samples classified into the labels W11 to W13, the labels W21 to W23 and the labels W31 to W33 described above.

Figure 22:
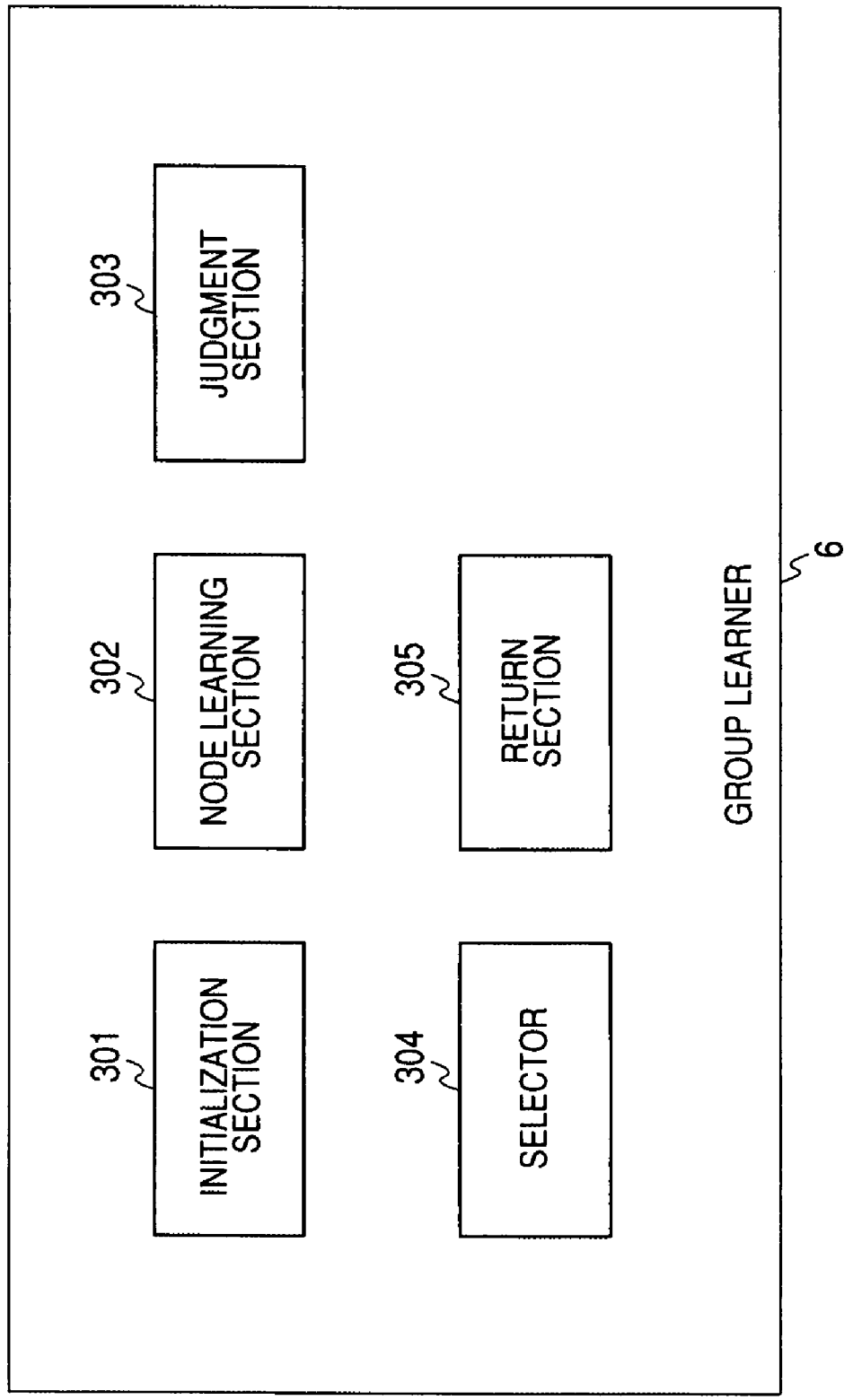
FIG. 22 is a block diagram showing an exemplary functional configuration of a group learner.

To carry out the learning process, the group learner 56 has the functional configuration shown in FIG. 22.

That is, the group learner 56 includes an initialization section 301, a node learning section 302, a judgment section 303, a selector 304 and a return section 305. These sections can send and receive necessary data with respect to each other.

The initialization section 301 sets various initial values.

The node learning section 302 performs a learning process on the weak discriminators in each node.

The judgment section 303, for example, compares the number of child nodes (size(numChild)) with a branch count (branch_count[i]), which will be described later, and judges whether or not the node ID is positive.

The selector 304 selects the next node to be processed.

The return section 305, for example, returns a processed node to a parent node.

Figure 23:
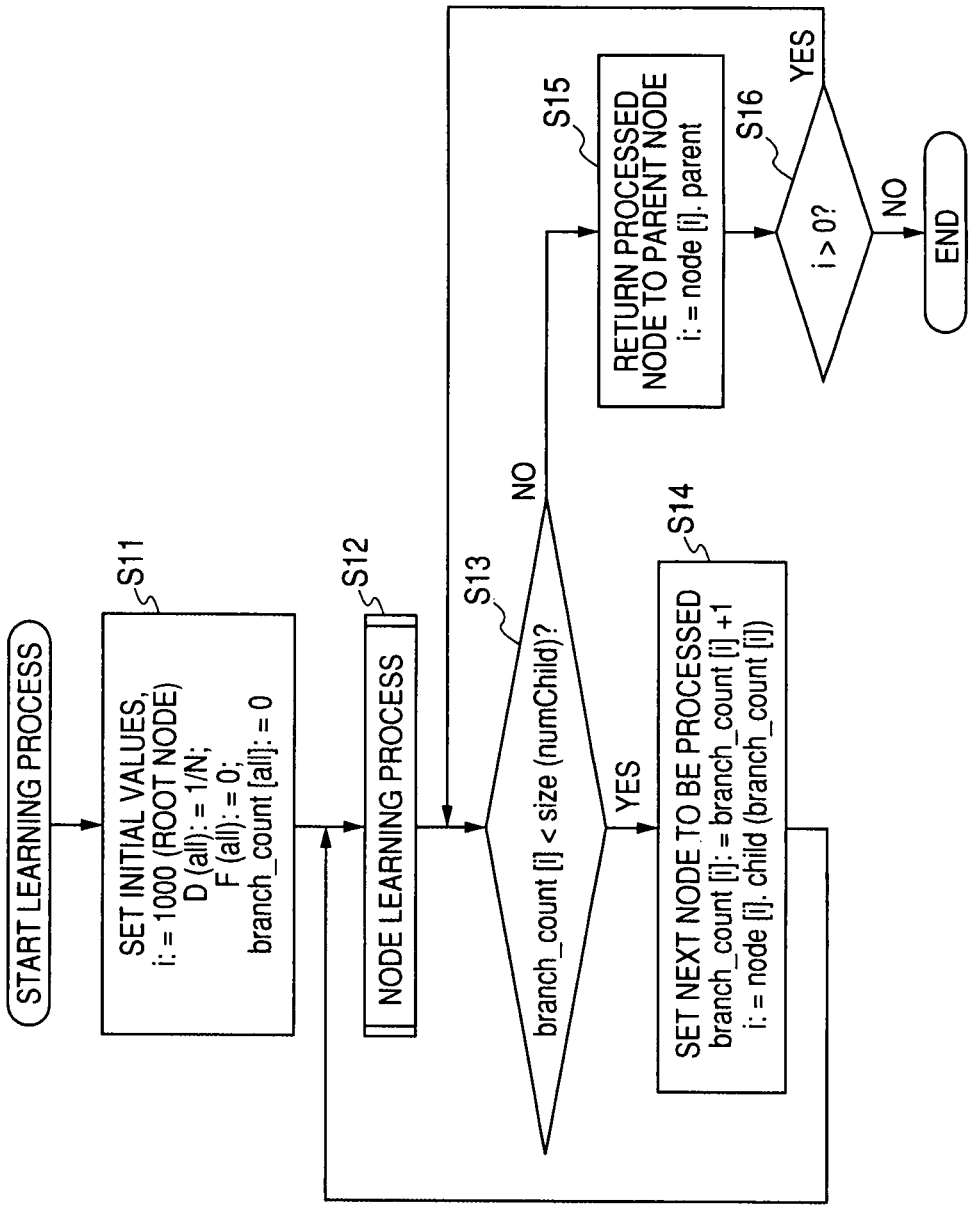
FIG. 23 is a flowchart for explaining a learning process.

FIG. 23 is a flowchart showing the learning method for the group learner 56. In this example, although a description will be made of the learning according to an algorithm that uses a fixed value as the threshold value for weak discrimination (AdaBoost) as the learning algorithm, the learning algorithm is not limited to AdaBoost, but may be other learning algorithms as far as they perform group learning in order to combine a plurality of weak discriminators, such as Real-AdaBoost that uses, as the threshold value, a continuous value indicative of likelihood (probability) of the correct answer.

As described above, firstly, N learning samples labeled as the object of interest or an object of no interest in advance are prepared.

The learning samples are, for example, N images, and each image is formed of a 24 by 24 image. Each learning sample is a human face image and labeled as one of the labels W11 to W13, the labels W21 to W23 and the labels W31 to W33.

At the step S11, the initialization section 301 sets initial values.

Specifically, the variable i indicative of the ID of the node to be processed is set to be the ID of the highest node (root node) (the ID of the node 81-1 in the example shown in FIG. 20). Data weights Dt are set to 1/N for all data, where N represents the number of samples. Furthermore, majority decision weights F(x) at all nodes are initialized to zero, and the variable branch_count[i] indicative of the number of visits from each node to its lower nodes (child nodes) is initialized to zero.

At the step S12, the node learning section 302 performs the learning process on the node being processed and having the ID currently set in the variable i.

The node learning process, the detail of which will be described with reference to the flowchart of FIG. 25, performs the learning on the weak discriminators in the node being processed. The result of the process at the node is stored in order to be taken over by the child node.

At this point, since the variable i has been set to be the ID of the node 81-1 shown in FIG. 20, the learning process is performed on the node 81-1.

Then, at the step S13, the judgment section 303 compares the value of the variable branch_count[i] of the node being processed with the variable size (numChild) in which the number of child nodes in the data structure (FIG. 21) of the node being processed has been set. When the value of branch_count[i] is smaller than the number of child nodes, the learning process has not been completed on all child nodes, so that the process proceeds to the step S14.

At this point, the value of branch_count[i] of the node 81-1 is zero (the process at the step S11) and the node 81-1 has two child nodes (81-1-1 and 81-1-2). Therefore, the judgment at the step S13 is YES and the process proceeds to the step S14.

At the step S14, the selector 304 selects the next node to be processed.

Specifically, the value of the variable branch_count[i] of the node 81-1 being processed is incremented by one (becomes 1 at this point), and the variable i indicative of the node being processed is set to be the node ID of the child node specified by the variable branch_count[i].

In the example shown in FIG. 20, for example, the ID of the node 81-1-1 that is the child node of the node 81-1 currently being processed is set in the variable i.

Then, the process returns to the step S12, and the node learning process is performed on the node that has been set in the variable i.

At this point, the learning process is performed on the node 81-1-1.

Then, at the step S13, the judgment section 303 judges whether or not the value of the variable branch_count[i] corresponding to the node being processed is smaller than the number of child nodes of the node being processed. At this point, the node being processed is the node 81-1-1 and the node 81-1-1 has one child node, which is the node 81-1-1-1.

Since the variable branch_count[i] of the node 81-1-1 currently being processed has been set to zero in the initialization setting at the step S11, the variable branch_count[i] is judged to be smaller than the number of child nodes (=1) and the process proceeds to the step S14. Then, at the step S14, the variable branch_count[i] of the node 81-1-1 being processed is incremented by one (becomes one), and the variable i is set to be the ID of the child node 81-1-1-1 that is the child node of the node 81-1-1 and specified by branch_count[i] of the node 81-1-1.

Then, the process returns to the step S12, and the learning process is performed on the node 81-1-1-1 that is the node having the ID set in the variable i.

Then, at the step S13, the judgment section 303 judges whether or not the value of the variable branch_count[i] of the node 81-1-1-1 that becomes the node being processed is smaller than the number of child nodes. The node 81-1-1-1 has one child node, which is the node 81-1-1-1-1.

Since the variable branch_count[i] of the node 81-1-1-1 has also been set to zero in the initialization setting at the step S11, the variable branch_count[i] is judged to be smaller than the number of child nodes (=1) and the process proceeds to the step S14. Then, at the step S14, the variable branch_count[i] of the node 81-1-1-1 is incremented by one (becomes one), and the variable i is set to be the ID of the child node 81-1-1-1-1 that is the child node of the node 81-1-1-1 and specified by branch_count[i] of the node 8-1-1-1.

Then, the process returns to the step S12, and the learning process is performed on the node 81-1-1-1-1 that is the node having the ID set in the variable i.

Then, at the step S13, the judgment section 303 judges whether or not the value of the variable branch_count[i] of the node 81-1-1-1-1 being processed is smaller than the number of child nodes. Since the node 81-1-1-1-1 is a terminal node, the node 81-1-1-1-1 has no child node.

Although the variable branch_count[i] of the node 81-1-1-1-1 has been set to zero in the initialization setting at the step S11, the number of child nodes is zero (the variable branch_count[i] (=0) is equal to the number of child nodes (=0)), so that the variable branch_count[i] is judged not to be smaller than the number of child nodes. Therefore, the process proceeds to the step S15.

At the step S15, the return section 305 returns the processed node to the parent node.

Specifically, the variable i is set to be the ID of the node 81-1-1-1 that is the parent node of the node 81-1-1-1-1 that is the node currently being processed.

Then, as the step S16, the return section 305 judges whether or not the variable i set at the step S15 is larger than zero.

Since the nodes other than the highest parent node (root node) 81-1 are set to have positive ID values, the judgment at the step S16 is YES at this point. Then, the return section 305 returns the process to the step S13.

At the step S13, the judgment section 303 judges whether or not the variable branch_count[i] of the node having the ID set in the variable i (the node 81-1-1-1 at this point) is smaller than the number of child nodes of that node. Since the variable branch_count[i] of the node 81-1-1-1 has been set to one at this point and the number of child nodes of that node is one (the variable branch_count[i] (=1) is equal to the number of child nodes (=1)), the variable branch_count[i] is judged not to be smaller than the number of child nodes. Therefore, the process proceeds to the step S15.

At the step S15, the variable i is set to be the ID of the node 81-1-1 at this point that is the parent node of the node 81-1-1-1 that is the node currently being processed.

At the step S16, since the variable i in which the ID of the node 81-1-1 has been set is larger than zero, the judgment is YES and the process returns to the step S13.

At the step S13, the judgment section 303 judges whether or not the variable branch_count[i] of the node 81-1-1 having the ID set in the variable i is smaller than the number of child nodes of that node. Since the variable branch_count[i] of the node 81-1-1 has been set to one at this point and the number of child nodes of that node is one (the variable branch_count [i] (=1) is equal to the number of child nodes (=1)), the variable branch_count[i] is judged not to be smaller than the number of child nodes. Therefore, the process proceeds to the step S15.

At the step S15, the variable i is set to be the node 81-1 at this point that is the parent node of the node 81-1-1 that is the node currently being processed.

At the step S16, since the variable i in which the ID of the node 81-1 has been set is larger than zero, the judgment is YES and the process returns to the step S13.

At the step S13, the judgment section 303 judges whether or not the variable branch_count[i] of the node 81-1 having the ID set in the variable i is smaller than the number of child nodes of that node. Since the variable branch_count[i] of the node 81-1 has been set to one at this point and the number of child nodes of that node is two, the variable branch_count[i] is judged to be smaller than the number of child nodes. Therefore, the process proceeds to the step S14.

At the step S14, the variable branch_count[i] of the node 81-1 being processed is incremented by one (becomes two), and the variable i is set to be the node ID of the child node that is the child node of the node 81-1 and specified by branch_count[i] of the node 81-1. In the example shown in FIG. 20, the ID of the node 81-1-2 that is another child node of the node 81-1 is set in the variable i.

Then, the learning is performed on the node 81-1-2 and its lower nodes in a similar manner.

In the example shown in FIG. 20, when the process returns bask to the highest node 81-1 (root node), and at the step S15, the variable i is set to −1 as the parent node ID thereof, the variable i (=−1) is judged not to be larger than zero at the step S16. Therefore, the process is terminated.

In this way, the learning is performed on the weak discriminators in each node disposed in the tree structure.

The node learning process at the step S12 in FIG. 23 will be described below in detail.

Figure 24:
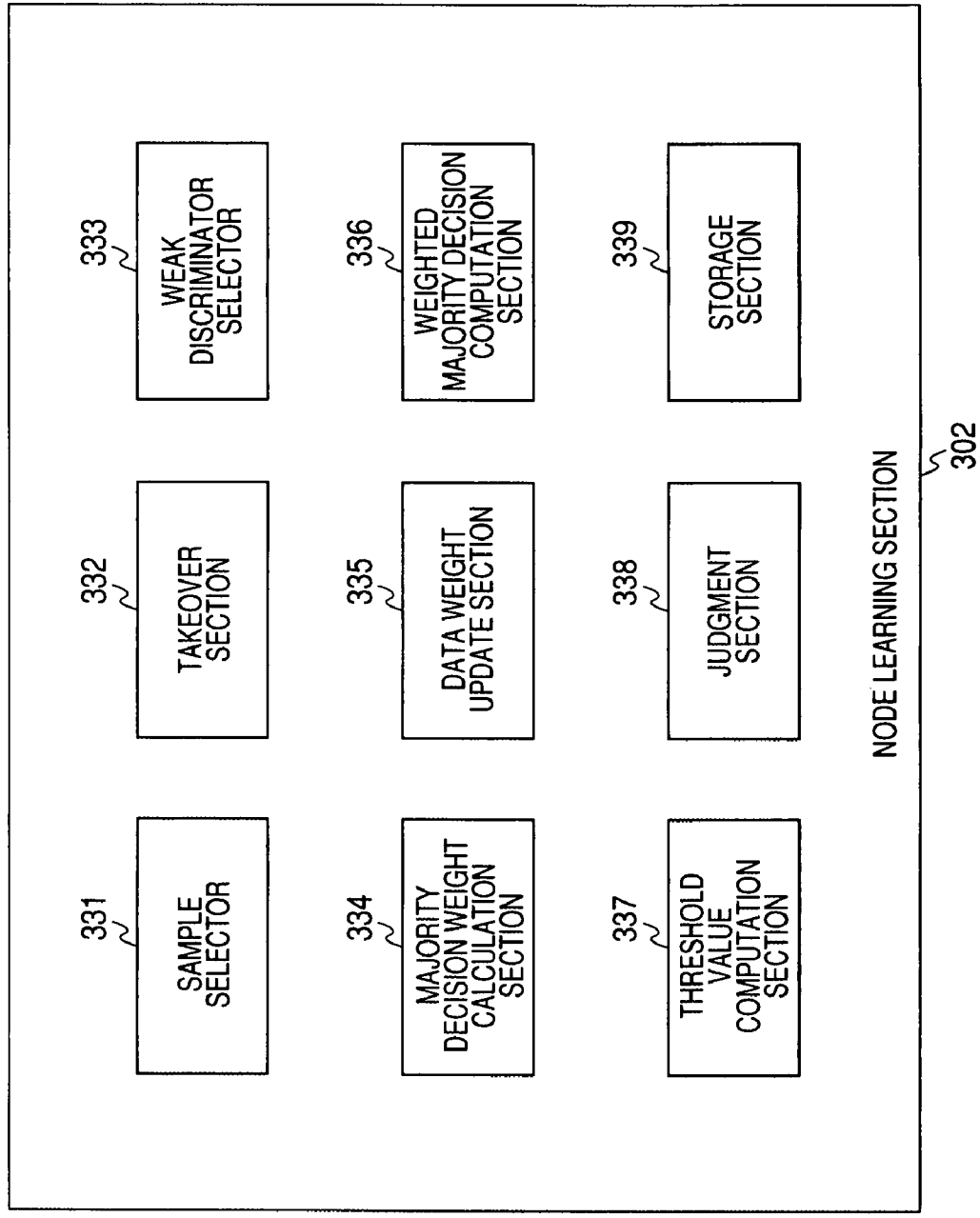
FIG. 24 is a block diagram showing an exemplary functional configuration of a node learning section.

To perform this process, the node learning section 302 in FIG. 22 is configured as shown in FIG. 24.

That is, the node learning section 302 includes a sample selector 331, a takeover section 332, a weak discriminator selector 333, a majority decision weight calculation section 334, a data weight update section 335, a weighted majority decision computation section 336, a threshold value computation section 337, a judgment section 338 and a storage section 339.

The sample selector 331 selects a positive sample and a negative sample necessary for node learning.

The takeover section 332 takes over the value stored at the preceding node as the initial value for the process at the subsequent node.

The weak discriminator selector 333 selects a weak discriminator based on the data weight $D_t$.

The majority decision weight calculation section 334 calculates the majority decision weight $\alpha_t$.

The data weight update section 335 updates the data weight $D_t$.

The weighted majority decision computation section 336 computes the weighted majority decision by weighting the output of each weak discriminator by the majority decision weight $\alpha_t$ and summing the weighted outputs. Specifically, the weighted majority decision computation section 336 performs computation of the above equation (6).

The threshold value computation section 337 calculates the abort threshold value (reference value $R_M$) expressed by the equation (7).

The judgment section 338 judges, for example, whether or not the value of the weighted majority decision becomes smaller than the abort threshold value $R_M$ computed in the threshold value computation section 337, or whether or not the learning process on all weak discriminators in the node is completed.

The storage section 339 stores the weighted majority decision $F(x)$ and the data weight $D_t$ as the discrimination result (output of the node) of the last weak discriminator in the node.

The node learning process will be described below with reference to the flowchart of FIG. 25.

Firstly, at the step S41, the sample selector 331 selects a labeled positive sample to be learned at the node.

For example, in the learning process of the node 81-1 in FIG. 20, positive samples of all labels, that is, the labels W11 to W13, the labels W21 to W23 and the labels W31 to W33, are selected. On the other hand, in the learning process of the node 81-1-1-1-1, only a positive sample of the label W11 is selected. In both learning processes, all negative samples are used.

At the step S42, the takeover section 332 takes over the output of the parent node.

Since the node 81-1, which is the highest parent node, has no parent node, the value of the weighted majority decision $F(x)$ is initialized to zero and the value of the data weight $D_t$ is set to 1/N (the value N represents the number of learning samples).

For a node having a parent node, in the process at the step S49, which will be described later, the weighted majority decision $F(x)$ and the data weight $D_t$ of the parent node stored in the storage section 339 are read out and set as initial values.

In this process of taking over the output of the parent node, the data weights $D_t$ are normalized such that the sum of the data weights $D_t$ is one.

Then, at the step S43, the weak discriminator selector 333 selects a weak discriminator.

In this selection process, the detail of which will be described with reference to the flowchart of FIG. 27, a weak discriminator having a lowest weighted error rate $e_t$ is selected (generated) from K (the number of inter-pixel difference features d) weak discriminators.

At the step S44, the majority decision weight calculation section 334 calculates the majority decision weight $\alpha_t$.

The majority decision weight (reliability) $\alpha_t$ is calculated based on the equation (8).

$$\alpha_t = \frac{1}{2} \ln\left(\frac{1-e_t}{e_t}\right) \qquad (8)$$

As apparent from the above equation (8), the smaller the weighted error rate $e_t$, the larger the reliability $\alpha_t$ of the weak discriminator.

At the step S45, the data weight update section 335 updates the data weights $D_{t,i}$ for the learning sample.

That is, the reliability $\alpha t$ obtained from the equation (8) is used to update the data weights $D_{t,i}$ for the learning sample by using the following equation (9). It is necessary to normalize the data weights $D_{t,i}$ such that the sum of all data weights $D_{t,i}$ normally becomes one. Then, the data weights $D_{t,i}$ are normalized as expressed by the equation (10).

$$D_{t+1,i} = D_{t,i}\exp(-\alpha_i y_i f_i(x_i)) \quad (9)$$

$$D_{t+1,i} = \frac{D_{t+1,i}}{\sum_i D_{t+1}} \quad (10)$$

At the step S46, the weighted majority decision computation section 336 updates the weighted majority decision F(x).

This process is carried out based on the equation (6). The majority decision weight $\alpha_t$ is the value calculated at the step S44, and $f_t(x)$ is the value calculated at the step S43.

Then, at the step S47, the threshold value computation section 337 calculates the abort threshold value $R_M$. This computation is carried out based on the equation (7). The abort threshold value $R_M$ will be used in the process at the step S175 in FIG. 34 or the step S195 in FIG. 35, which will be described later.

At the step S48, the judgment section 338 judges, when the node being processed has a child node, whether or not the learning of all weak discriminators has been completed, while the judgment section 338 judges, when the node being processed has no child node, whether or not the value of the weighted error rate $e_t$ computed in the process at the step S43 has been sufficiently small.

When the node being processed has a child node, the number of weak discriminators is 100 in this embodiment as described above. Therefore, when the learning of 100 weak discriminators has not been completed, the process returns to the step S43 and the following processes are repeatedly carried out. When the node being processed is a terminal node, the process is repeated until the weighted error rate $e_t$ becomes sufficiently small.

Specifically, when the value of the weighted error rate $e_t$ is zero or smaller, the weighted error rate $e_t$ is judged to be sufficiently small, while when the value of the weighted error rate $e_t$ is not sufficiently small, the process returns to the step S43 and the following processes are repeatedly carried out. That is, the processes from the steps S43 to S48 are carried out multiple times corresponding to the number of weak discriminators in the node.

At the step S48, when it is judged that the learning of all weak discriminators has been completed, the process proceeds to the step S49, and the storage section 339 stores, as the output, the value of the weighted majority decision F(x) and the value of the data weight $D_t$ as the discrimination result of the last weak discriminator. The stored output is taken over by the lower child node as initial values at the step S42.

Figure 25:
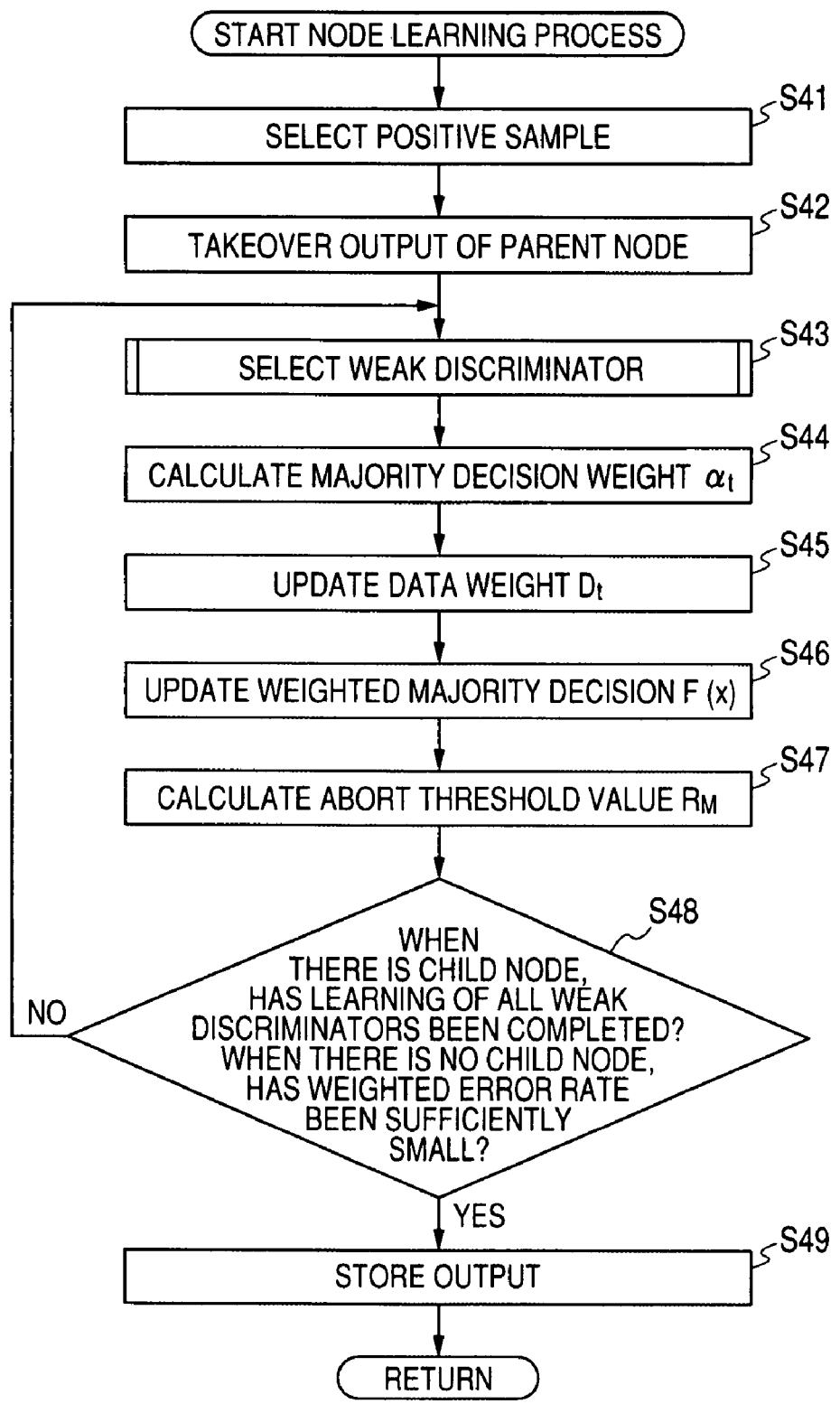
FIG. 25 is a flowchart for explaining the node learning process at the step S12 in FIG. 23.

In this way, the processes shown in FIG. 25 are carried out for each node at the step S12 in FIG. 23.

(4-2) Generation Of Weak Discriminator

A description will be made of the selection process (generation method) of a weak discriminator at the step S43 in the flowchart of FIG. 25 described above.

Generation of a weak discriminator that outputs a binary value differs from generation of a weak discriminator that outputs a continuous value as the function f(x) expressed by the above equation (5). In the case of the binary output, the process performed when one threshold value $Th_1$ is used to make discrimination as expressed by the above equation (2) slightly differs from the process performed when two threshold values $Th_{11}$ and $Th_{12}$ or $Th_{21}$ and $Th_{22}$ are used to make discrimination as expressed by the equation (3) or (4). In the following description, a learning method (generation method) for a weak discriminator that uses one threshold value $Th_1$ to output a binary value will be explained.

Figure 26:
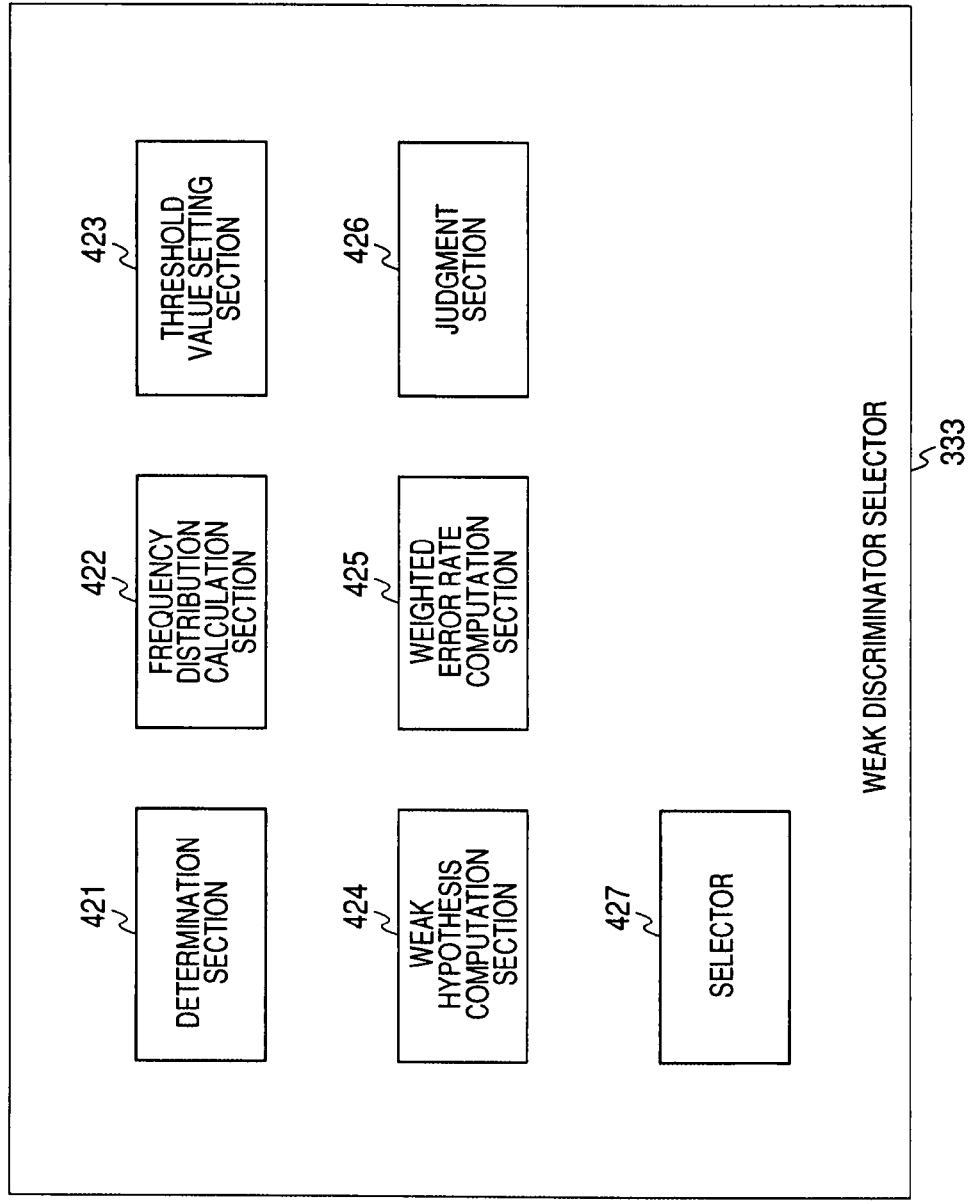
FIG. 26 is a block diagram showing an exemplary functional configuration of a weak discriminator selector.

Thus, the weak discriminator selector 333 includes a determination section 421, a frequency distribution calculation section 422, a threshold value setting section 423, a weak hypothesis computation section 424, a weighted error rate computation section 425, a judgment section 426 and a selector 427, as shown in FIG. 26.

The determination section 421 determines two pixels at random from the input learning sample.

The frequency distribution calculation section 422 collects the inter-pixel difference features d associated with the pixels determined in the determination section 421 and calculates the frequency distribution of the inter-pixel difference features d.

The threshold value setting section 423 sets the threshold value for the weak discriminator.

The weak hypothesis computation section 424 computes the weak hypothesis of the weak discriminator and outputs the discrimination result f(x).

The weighted error rate computation section 425 computes the weighted error rate $e_t$ expressed by the equation (11).

$$e_t = \sum_{i: f_t(x_i) \neq y_i} D_{t,i} \quad (11)$$

As expressed by the above equation (11), the weighted error rate $e_t$ is the sum of data weights of only learning samples, among all learning samples, that cause the weak discriminator to provide a wrong discrimination result ($f_t(x_i) \neq y_i$) (the learning samples labeled as $y_i=1$ but judged to be $f(x_i)=-1$ and the learning samples labeled as $y_i=-1$ but judged to be $f(x_i)=1$). As described above, wrong discrimination of the learning sample having a large data weight $D_{t,i}$ (hard to discriminate) increases the weighted error rate $e_t$.

The judgment section 426 judges whether or not the threshold value Th for the weak discriminator is larger (or smaller) than the maximum inter-pixel difference feature d.

The selector 427 selects the weak discriminator that corresponds to the threshold value Th corresponding to the minimum weighted error rate $e_t$.

Figure 27:
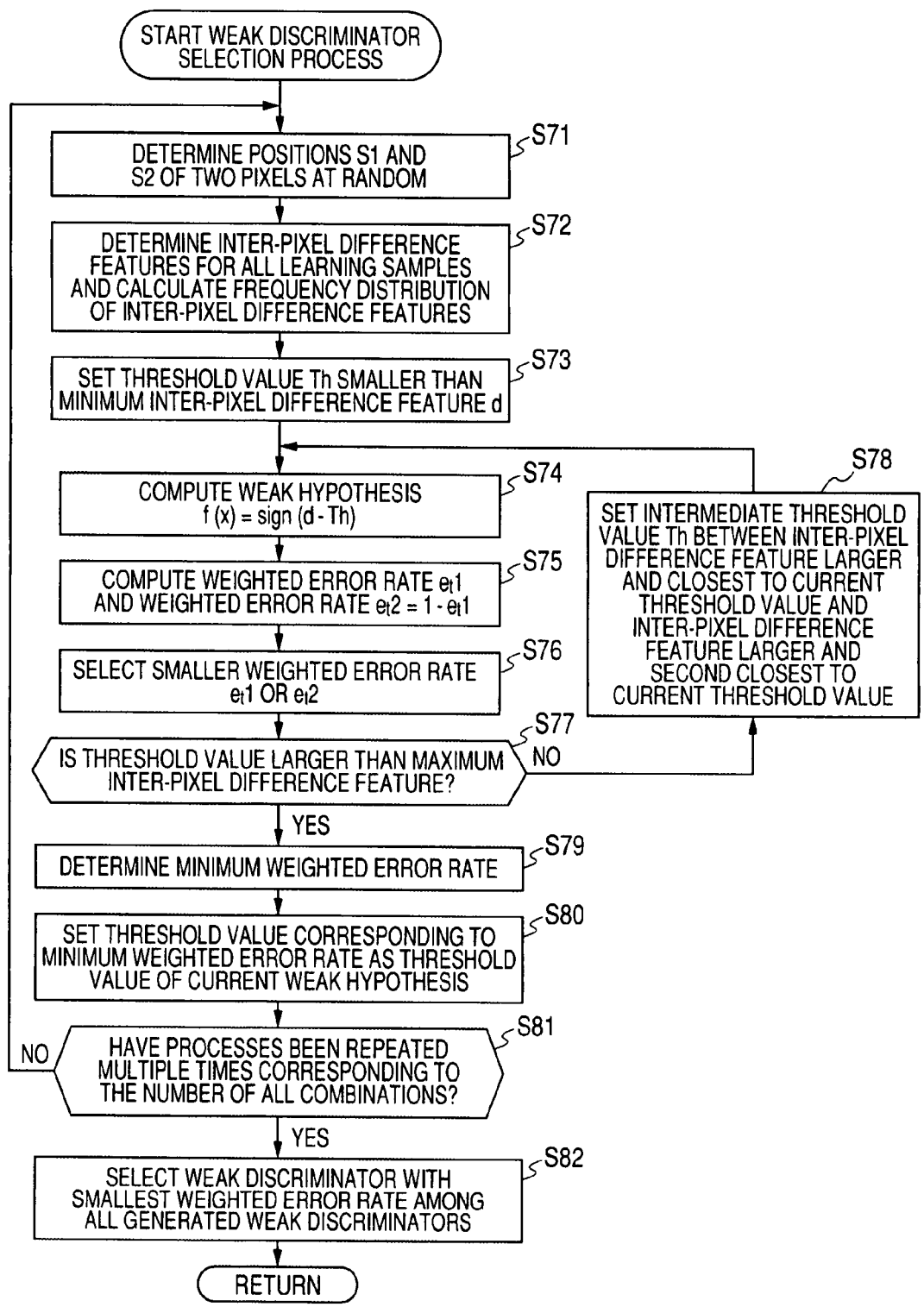
FIG. 27 is a flowchart for explaining the weak discriminator selection process at the step 43 in FIG. 25.

FIG. 27 is a flowchart of the learning method (generation method) at the step S43 for the weak discriminator that uses one threshold value $Th_1$ to output a binary value.

At the step S71, the determination section 421 determines the positions $S_1$ and $S_2$ of two pixels at random in one learning sample (24 by 24 pixels).

When a learning sample of 24 by 24 pixels is used, one of 576 by 575 possible ways for selecting two pixels is selected. In the following description, let $S_1$ and $S_2$ be the positions of the two pixels and $I_1$ and $I_2$ be brightness values of the two pixels.

At the step S72, the frequency distribution calculation section 422 determines the inter-pixel difference features for all learning samples and calculates the frequency distribution of the inter-pixel difference features d. That is, the inter-pixel difference feature d, which is the difference in brightness values $I_1$ and $I_2$, $(I_1-I_2)$, between the pixels at the two positions $S_1$ and $S_2$ selected at the step S71 is determined for all (N) learning samples, and then the histogram (frequency distribution), such as shown in FIG. 15A, is calculated.

At the step S73, the threshold value setting section 423 sets the threshold value Th smaller than the minimum inter-pixel difference feature d.

Figure 28:
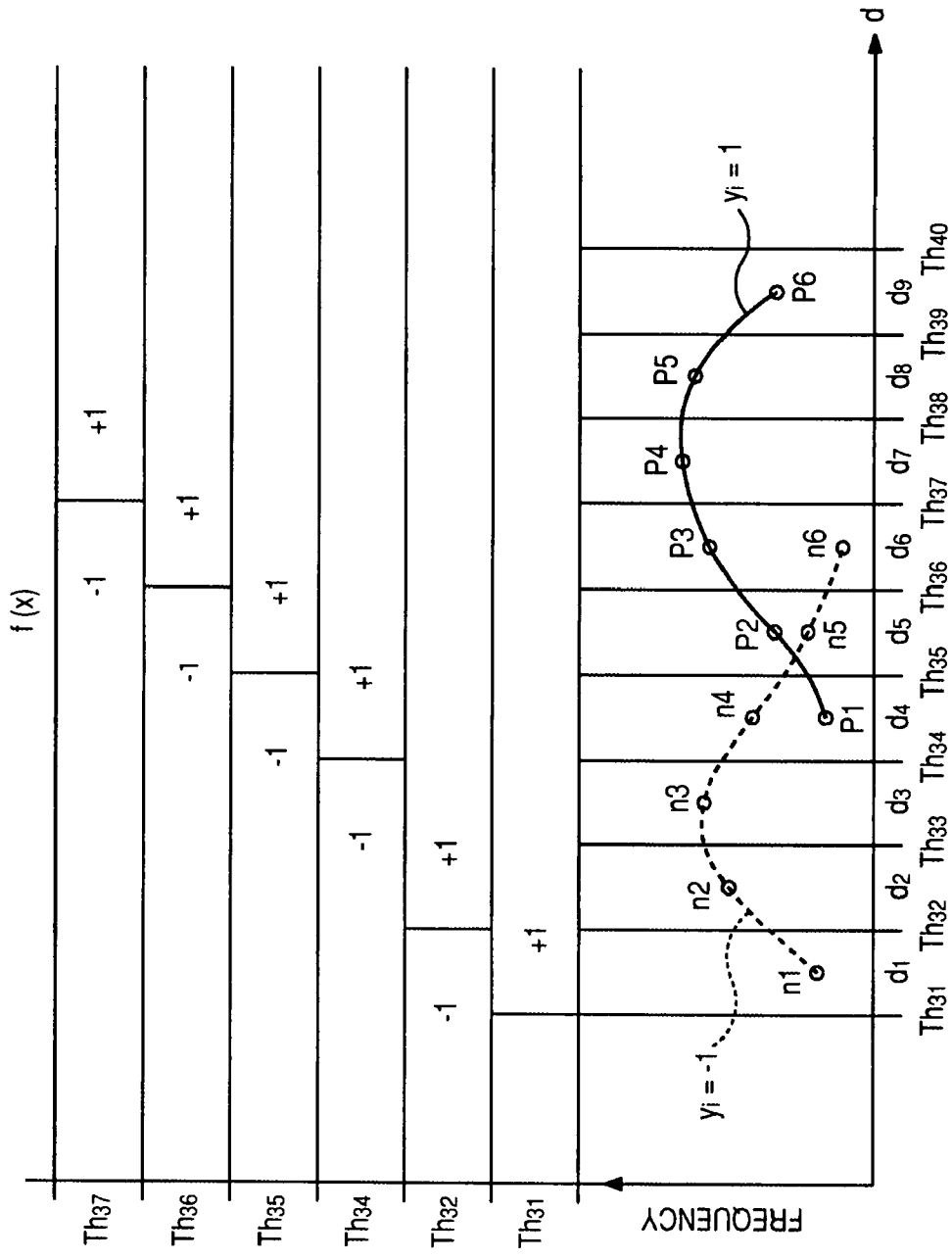
FIG. 28 is view for explaining the shift of the threshold value.

For example, as shown in FIG. 28, when the values of the inter-pixel difference features d are distributed between d1 and d9, the minimum inter-pixel difference feature d is $d_1$. Therefore, a threshold value $Th_{31}$ smaller than the inter-pixel difference feature $d_1$ is set as the threshold value Th at this point.

Then, at the step S74, the weak hypothesis computation section 424 performs computation of the equation (12) as a weak hypothesis, where the function sign(A) outputs +1 when the value A is positive, while outputting −1 when the value A is negative.

$$f(x)=\text{sign}(d-Th) \quad (12)$$

At this point, since $Th=Th_{31}$, for any value of the inter-pixel difference feature d between $d_1$ and $d_9$, the value of d−Th is positive. Therefore, the discrimination result f(x) of the weak hypothesis expressed by the equation (12) is +1.

At the step S75, the weighted error rate computation section 425 computes the weighted error rates $e_t1$ and $e_t2$. The weighted error rates $e_t1$ and $e_t2$ have the relationship expressed by the equation (13).

$$e_t2=1-e_t1 \quad (13)$$

The weighted error rate $e_t1$ is the value determined by the equation (11). The weighted error rate $e_t1$ is the weighted error rate when the pixel values at the positions $S_1$ and $S_2$ are $I_1$ and $I_2$, respectively. On the other hand, the weighted error rate $e_t2$ is the weighted error rate when the pixel value at the position $S_1$ is $I_2$ and the pixel value at the position $S_2$ is $I_1$.

That is, the combination obtained when the first position is the position $S_1$ and the second position is the position $S_2$ is different from the combination obtained when the first position is the position $S_2$ and the second position is the position $S_1$. However, the values of the weighted error rates $e_t$ of the two combinations have the relationship expressed by the above equation (13). Thus, in the process at the step S75, the weighted error rates $e_t$ of the two combinations are simultaneously computed. If the two weighted error rates $e_t1$ and $e_t2$ are not simultaneously computed at the step S75, it is necessary to repeat the processes from the steps S71 to S81 until it is judged at the step S81 that the processes have been repeated K times corresponding to the number of all combinations of two pixels extracted from the pixels in the learning sample. However, by computing the two weighted error rates $e_t1$ and $e_t2$ at the step S75, the number of the repetition can be reduced to one-half of K, which is the number of all combinations.

Then, at the step S76, the weighted error rate computation section 425 selects the smaller weighted error rate $e_t1$ or $e_t2$ computed in the process at the step S75.

At the step S77, the judgment section 426 judges whether or not the threshold value is larger than the maximum inter-pixel difference feature. That is, the judgment section 426 judges whether or not the threshold value Th currently set is larger than the maximum inter-pixel difference feature d ($d_9$ in the case shown in FIG. 28, for example). At this point, since the threshold value Th is the threshold value $Th_{31}$ in FIG. 28, the threshold value Th is judged to be smaller than the maximum inter-pixel difference feature $d_9$. Therefore, the process proceeds to the step S78.

At the step S78, the threshold value setting section 423 sets an intermediate threshold value Th between the inter-pixel difference feature larger and closest to the current threshold value and the inter-pixel difference feature larger and second closest to the current threshold value. At this point in the example in FIG. 28, the threshold value setting section 423 sets an intermediate threshold value $Th_{32}$ between the inter-pixel difference feature $d_1$ that is larger and closest to the current threshold value $Th_{31}$ and the inter-pixel difference feature $d_2$ that is larger and second closest to the current threshold value $Th_{31}$.

Then, the process returns to the step S74, and the weak hypothesis computation section 424 computes the weak hypothesis judgment result f(x) according to the above equation (12). In this case, as shown in FIG. 28, the value of f(x) is +1 when the value of the inter-pixel difference feature d is any one of $d_2$ to $d_9$, while the value of f(x) is −1 when the value of the inter-pixel difference feature d is $d_1$.

At the step S75, the weighted error rate $e_t1$ is computed according to the equation (11), and the weighted error rate $e_t2$ is computed according to the equation (13). Then, at the step S76, the smaller weighted error rate $e_t1$ or $e_t2$ is selected.

At the step S77, it is judged again whether or not the threshold value is larger than the maximum inter-pixel difference feature. At this point, since the threshold value $Th_{32}$ is smaller than the maximum inter-pixel difference feature $d_9$, the process proceeds to the step S78, and the threshold value Th is set to a threshold value $Th_{33}$ between the inter-pixel difference features $d_2$ and $d_3$.

In this way, the threshold value Th is sequentially updated to larger values. At the step S74, for example, when the threshold value Th is $Th_{34}$ between the inter-pixel difference features $d_3$ and $d_4$, the weak hypothesis discrimination result f(x) becomes +1 for the values of the inter-pixel difference feature $d_4$ or larger, while the weak hypothesis discrimination result f(x) becomes −1 for the values of the inter-pixel difference feature $d_3$ or smaller. Likewise, when the value of the inter-pixel difference feature d is larger than or equal to the threshold value $Th_i$, the value of the weak hypothesis discrimination result f(x) becomes +1, while when the value of the inter-pixel difference feature d is smaller than or equal to the threshold value $Th_i$, the value of the weak hypothesis discrimination result f(x) becomes −1.

The above processes are repeatedly carried out until the threshold value Th is judged to be larger than the maximum inter-pixel difference feature at the step S77. In the example in FIG. 28, the processes are repeated until the threshold value becomes the value $Th_{40}$ that is larger than the maximum inter-pixel difference feature $d_9$. That is, by repeating the processes from the steps S74 to S78, the weighted error rate $e_t$ for each set threshold value Th is determined for the selected one combination of pixels. Then, at the step S79, the selector 427 determines the minimum weighted error rate from the thus determined weighted error rates $e_t$.

Then, at the step S80, the selector 427 sets the threshold value corresponding to the minimum weighted error rate as the threshold value of the current weak hypothesis. That is, the threshold value Thi from which the minimum weighted error rate $e_t$ selected at the step S79 is obtained is set as the threshold value for the weak discriminator (weak discriminator generated from the combination of a pair of pixels).

At the step S81, the judgment section 426 judges whether or not the process has been repeated multiple times corresponding to the number of all combinations. When the process has not been carried out for all combinations, the process returns to the step S71, and the following processes are repeatedly carried out. That is, the positions $S_1$ and $S_2$ (different from the previous positions) of two pixels are determined again from the 24 by 24 pixels at random, and the similar processes are carried out for the pixel values $I_1$ and $I_2$ at the positions $S_1$ and $S_2$.

The above processes are repeatedly carried out until it is judged at the step S81 that the processes are repeated K times corresponding to the number of all extractable combinations of two pixels from the learning sample. However, as described above, in this embodiment, since the process performed when the positions $S_1$ and $S_2$ are reversed are effectively carried out at the step S75, the number of processes judged at the step S81 is only one-half of K, which is the number of all combinations.

At the step S81, when it is judged that the process has been completed for all combinations, the selector 427 selects the weak discriminator with the minimum weighted error rate from the generated weak discriminators at the step S82. That is, one weak discriminator among the K weak discriminators (weak discriminator 61 in FIG. 13, for example) is thus learned and generated.

Then, the process returns to the step S43 in FIG. 25, and the step S44 and the following steps will be carried out. Thereafter, the processes in FIG. 25 will be repeatedly carried out until, at the step S48, it is judged, when there is a child node, that the learning of all weak discriminators has been completed, or when there is no child node, it is judged that the weighted error rate is sufficiently small. That is, in the second round of the processes in FIG. 25, the weak discriminator $61_2$ in FIG. 13 undergoes generation and learning operations, and in the third round of the processes, the weak discriminator $61_3$ undergoes generation and learning operations. Then, the generation and learning of the weak discriminator $61_i$ will be performed multiple times corresponding to the number of weak discriminators in the node.

(5) Object Detection Method

The object detection method used in the object detection apparatus 51 shown in FIG. 12 will be described below.

To perform this process, the discriminator 55 includes an initialization section 471, a judgment section 472, a selector 473, a return section 474, a takeover section 475, a weak hypothesis calculation section 476, an evaluation value calculation section 477, a setting section 478 and an output section 479, as shown in FIG. 29.

The initialization section 471 initializes the weak discriminators in the highest node.

The judgment section 472 performs the following judgment operations: whether or not there is a next scaled image, whether or not areas of the object of interest overlap each other, whether or not the window image is a face, whether or not there is a child node, whether or not the variable branch_count[i] is larger (or smaller) than the number of child nodes, whether or not the variable i is positive and the like.

The selector 473 extracts two overlapping areas, selects an area and so on.

The return section 474 returns the processed node to a parent node.

The takeover section 475 takes over the output of a parent node.

The weak hypothesis calculation section 476 calculates the weak hypothesis based on the equation (12). The evaluation value calculation section 477 calculates the evaluation value s based on the equation (6).

The setting section 478 sets a maximum value to the evaluation value s. The output section 479 outputs the evaluation value s.

These components, the initialization section 471 through the output section 479, can send and receive necessary data with respect to each other.

Figure 30:
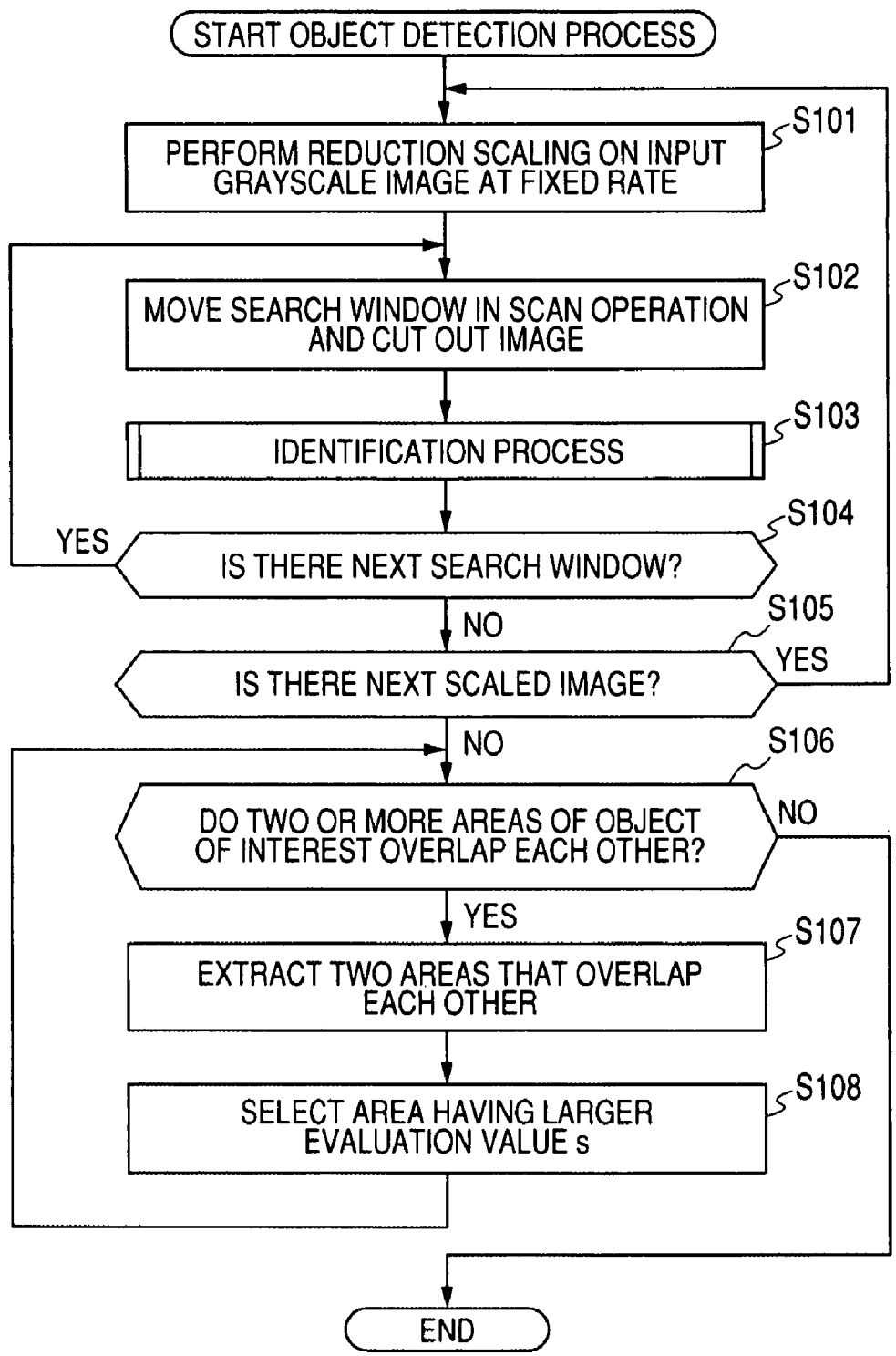
FIG. 30 is a flowchart for explaining an object detection process.

During the detection process (discrimination process), the discriminator 55 using weak discriminators thus generated in the learning process is used to detect the object of interest (human face) from an image according to a predetermined algorithm. The flowchart of FIG. 30 shows this process.

At the step S101, the scaling section 53 performs predetermined rate reduction scaling on a grayscale image inputted from the image output section 52.

The image output section 52 may directly receive a grayscale image as an input image, or may convert a color input image into a grayscale image.

Although the scaling section 53 initially does not perform scale conversion on an image provided from the image output section 52 but outputs the image as it is and at the next timing and later, outputs a scaled image that has undergone reduction scaling, all images outputted from the scaling section 53 are referred to as scaled images for convenience. The timing when a scaled image is generated is when the face detection across the previously outputted scaled image has been completed, and the process on the input image of the next frame is initiated when the scaled image becomes smaller than the window image.

At the step S102, the scanner 54 moves the search window in the scan operation and cut out an image. That is, the scanner 54 places the search window at a predetermined position on the scaled image, cuts out the image in the window as the window image and outputs it to the discriminator 55.

At the step S103, the discriminator 55 performs an identification process. The identification process, the detail of which will be described later with reference to the flowchart in FIG. 31, judges whether or not the image in the search window is a human face image, and when the image is a human face image, judges which direction the human face in the image is oriented (into which labels W11 to W13, labels W21 to W23 or labels W31 to W33 the image is classified).

Then, at the step S104, the judgment section 472 in the discriminator 55 judges whether or not there is a next search window. When there is a next search window, the process returns to the step S102, and the scanner 54 moves the search window on the current scaled image rightward by one pixel, cuts out the image in the search window and outputs it to the discriminator 55. Thereafter, the discriminator 55 performs the process at the step S103 to judge what label human face image the window image is.

In this way, the search window is sequentially shifted in the lower right direction by one pixel as shown in FIG. 4, and it is judged what label human face image the image in each search window is. When the position of the search window moves to the lower right position of the scaled image, it is judged at the step S104 that there is no next search window, and the process proceeds to the step S105.

At the step S105, the scaling section 53 judges whether or not there is a next scaled image. When there is a next scaled image, at the step S101, the scaling section 53 generates an image scaled at a higher reduction rate (further reduced) and outputs it to the scanner 54. Then, the same process as described above is performed on the scaled image.

The above processes are repeatedly carried out until it is judged at the step S105 that there is no next scaled image. That is, the above processes are repeatedly carried out until the scaled image becomes smaller than the window image.

As described above, the search window is sequentially moved in the lower right direction by one pixel. Therefore, for example, when the image in one search window is judged to be a human face, the image in the window shifted rightward or downward by one pixel is also, in most cases, judged to be a human face image. Thus, a plurality of window images will be detected as the same human face images. When all scaled images have been processed, a process for removing the overlap of the search windows is carried out.

Thus, at the step S106, the judgment section 472 judges whether or not two or more areas of the object of interest overlap each other. When two or more areas of the object of interest overlap each other, at the step S107, the selector 473 extracts the two areas that overlap each other. For example, when it is judged that the image in one search window is obtained in the area of the object of interest, the search window shifted rightward by one pixel will also be judged to be a human face image, so that these two window areas are extracted. At the step S108, the selector 473 selects one area having a larger evaluation value s (which will be described at the step S174 in FIG. 34 or the step S194 in FIG. 35) from the two areas extracted at the step S107.

Then, the process returns to the step S106, and the following processes are repeatedly carried out.

In this way, areas having small evaluation values s are considered to be less reliable and hence ignored, and the area having the highest evaluation value s is selected. The above processes are repeated until it is judged at the step S106 that two or more areas of the object of interest do not overlap each other. When it is judged that there is no overlap, the process for that frame is terminated. Then, the process for the next frame is further carried out as necessary.

The identification process at the step S103 in FIG. 30 will be described below with reference to the flowchart of FIG. 31.

At the step S131, the initialization section 471 in the discriminator 55 sets initial values. Specifically, the initialization section 471 sets the ID of the highest node (root node) in the variable i indicative of the ID of the node being processed.

According to the learning process described with reference to FIG. 20, by learning the nodes shown in FIG. 20, there has been provided the learning result, such as the positions of two pixels (FIG. 21) associated with the weak discriminators that form each node. That is, while the nodes indicated by the solid lines in FIG. 32 (hereinafter referred to as learned nodes as appropriate) are formed in the discriminator 55, the nodes indicated by the broken lines in FIG. 32 (hereinafter referred to as unlearned nodes) are also formed in the discriminator 55 according to an embodiment of the invention. Since the unlearned nodes have not undergone the learning process, they are not associated with any learning results, such as the positions of two pixels. An unlearned node has the corresponding node ID, parent node ID, child node ID, label, the number of weak discriminators and the like (FIG. 21).

The highest learned node 81-1 is formed of 100 weak discriminators $91\text{-}1_1$ to $91\text{-}1_{100}$. The learned node 81-1 identifies the images of the labels W11 to W13, the labels W21 to W23 and the labels W31 to W33.

Learned nodes 81-1-1 and 81-1-2 as well as one unlearned node 81-1-3 are formed as lower nodes of the learned node 81-1.

The learned node 81-1-1 is formed of 100 weak discriminators $91\text{-}1\text{-}1_1$ to $91\text{-}1\text{-}1_{100}$, although the reference characters thereof are not shown, and the node 81-1-2 is formed of 100 weak discriminators $91\text{-}1\text{-}2_1$ to $91\text{-}1\text{-}2_{100}$, although the reference characters thereof are not shown. The unlearned node 81-1-3 has no weak discriminator.

The learned node 81-1-1 uses the weak discriminators 91-1-1 to identify the label W11 to W13 images.

The learned node 81-1-2 uses the weak discriminators 91-1-2 to identify the label W21 to W23 images.

The unlearned node 81-1-3 uses the weak discriminators 91-1-2 in the learned node 81-1-2, as will be described later, to identify the label W31 to W33 images.

A learned node 81-1-1-1 as well as unlearned nodes 81-1-1-2 and 81-1-1-3 are formed as lower nodes (child nodes) of the learned node 81-1-1.

The learned node 81-1-1-1 is formed of 100 weak discriminators $91\text{-}1\text{-}1\text{-}1_1$ to $91\text{-}1\text{-}1\text{-}1_{100}$, although the reference characters thereof are not shown, and identifies the label W11 image.

Although the unlearned nodes 81-1-1-2 and 81-1-1-3 have no weak discriminator, they use the weak discriminators 91-1-1-1 in the learned node 81-1-1-1, as will be described later, to identify the label W12 and W13 images, respectively.

A learned node 81-1-1-1-1 is provided as a lower node (child node) of the learned node 81-1-1-1. The learned node 81-1-1-1-1 is a terminal node that has no further lower node. The learned node 81-1-1-1-1 is formed of L11 weak discriminators $91\text{-}1\text{-}1\text{-}1\text{-}1_1$ to $91\text{-}1\text{-}1\text{-}1\text{-}1_{L11}$, although the reference characters thereof are not shown, and identifies the label W11 image.

An unlearned node 81-1-1-2-1 is provided as a lower node (child node) of the unlearned node 81-1-1-2. The unlearned node 81-1-1-2-1 is a terminal node having no further lower node and has no weak discriminator, but uses the weak discriminators 91-1-1-1-1 in the learned node 81-1-1-1-1, as will be described later, to identify the label W12 image.

An unlearned node 81-1-1-3-1 is provided as a lower node (child node) of the unlearned node 81-1-1-3. The unlearned node 81-1-1-3-1 is a terminal node having no further lower node and has no weak discriminator, but uses the weak discriminators 91-1-1-1-1 in the learned node 81-1-1-1-1, as will be described later, to identify the label W13 image.

A learned node 81-1-2-1 as well as unlearned nodes 81-1-2-2 and 81-1-2-3 are formed as child nodes of the learned node 81-1-2.

The learned node 81-1-2-1 is formed of 100 weak discriminators $91\text{-}1\text{-}2\text{-}1_1$ to $91\text{-}1\text{-}2\text{-}1_{100}$, although the reference characters thereof are not shown, and identifies the label W21 image.

Although the unlearned nodes 81-1-2-2 and 81-1-2-3 have no weak discriminator, they use the weak discriminators 91-1-2-1 in the learned node 81-1-2-1, as will be described later, to identify the label W22 and W23 images, respectively.

A learned node 81-1-2-1-1 is provided as a child node of the learned node 81-1-2-1. The learned node 81-1-2-1-1 is a terminal node that has no further lower node. The learned node 81-1-2-1-1 is formed of L21 weak discriminators $91\text{-}1\text{-}2\text{-}1\text{-}1_1$ to $91\text{-}1\text{-}2\text{-}1\text{-}1_{L21}$, although the reference characters thereof are not shown, and identifies the label W21 image.

An unlearned node 81-1-2-2-1 is provided as a child node of the unlearned node 81-1-2-2. The unlearned node 81-1-2-2-1 is a terminal node having no further lower node and has no weak discriminator, but uses the weak discriminators 91-1-2-1-1 in the learned node 81-1-2-1-1, as will be described later, to identify the label W22 image.

An unlearned node 81-1-2-3-1 is provided as a child node of the unlearned node 81-1-2-3. The unlearned node 81-1-2-3-1 is a terminal node having no further lower node and has no weak discriminators 91-1-2-1-1 in the learned node 81-1-2-1-1, as will be described later, to identify the label W23 image.

Unlearned nodes 81-1-3-1, 81-1-3-2 and 81-1-3-3 are formed as child nodes of the unlearned node 81-1-3.

Although the unlearned nodes 81-1-3-1, 81-1-3-2 and 81-1-3-3 have no weak discriminator, they use the weak discriminators 91-1-2-1 in the learned node 81-1-2-1, as will be described later, to identify the label W31, W32 and W33 images, respectively.

An unlearned node 81-1-3-1-1 is provided as a child node of the unlearned node 81-1-3-1. The unlearned node 81-1-3-1-1 is a terminal node having no further lower node and has no weak discriminator, but uses the weak discriminators 91-1-2-1-1 in the learned node 81-1-2-1-1, as will be described later, to identify the label W31 image.

An unlearned node 81-1-3-2-1 is provided as a child node of the unlearned node 81-1-3-2. The unlearned node 81-1-3-2-1 is a terminal node having no further lower node and has no weak discriminator, but uses the weak discriminators 91-1-2-1-1 in the learned node 81-1-2-1-1, as will be described later, to identify the label W32 image.

An unlearned node 81-1-3-3-1 is provided as a child node of the unlearned node 81-1-3-3. The unlearned node 81-1-3-3-1 is a terminal node having no further lower node and has no weak discriminator, but uses the weak discriminators 91-1-2-1-1 in the learned node 81-1-2-1-1, as will be described later, to identify the label W33 image.

Figure 31:
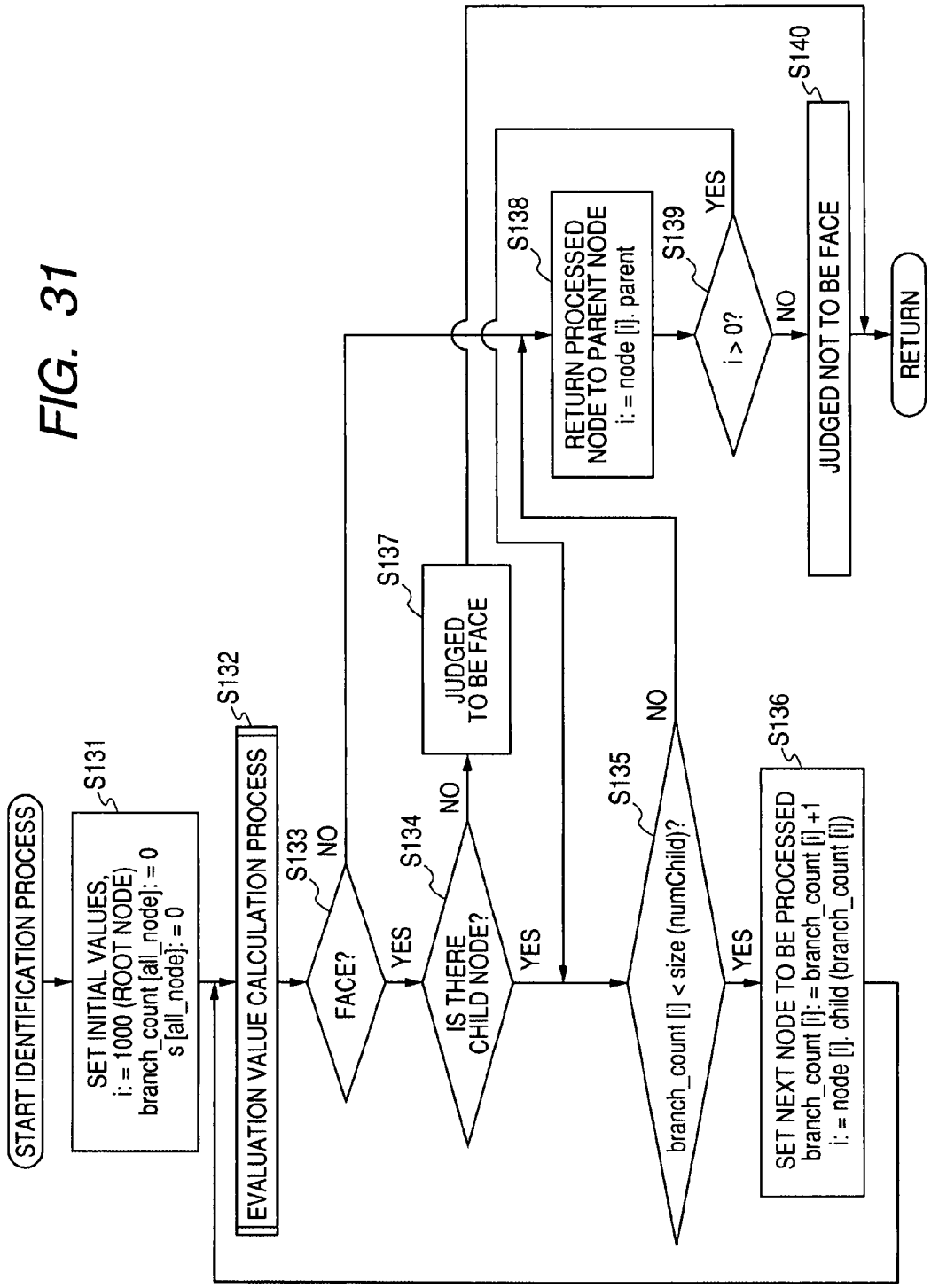
FIG. 31 is a flowchart for explaining the identification process at the step S103 in FIG. 30.
Figure 32:
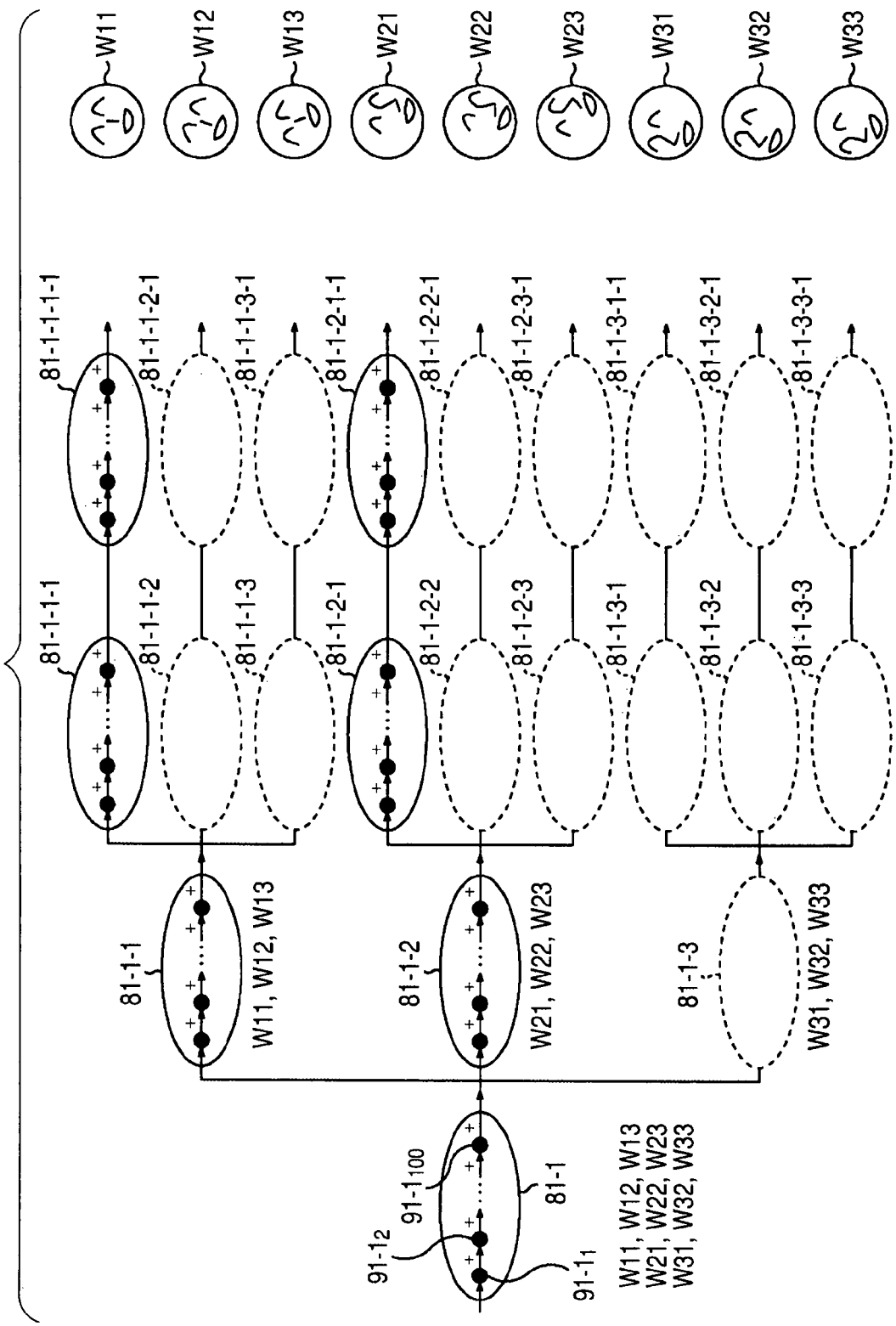
FIG. 32 is a view for explaining the tree structure of nodes in the discrimination process.

Returning to FIG. 31, at the step S131, in the example in FIG. 32, the highest learned node 81-1 is set at this point. The value of the variable branch_count[i] that is a variable set for each node and indicative of the number of child nodes that each node have visited is initialized to zero for all nodes. The evaluation value s that is the weighted majority decision computed based on the equation (6) is initialized to zero for all nodes.

Then, at the step S132, the evaluation value calculation section 477 and the like perform an evaluation value calculation process. The evaluation value calculation process, the detail of which will be described with reference to the flowcharts of FIG. 33 and FIG. 34 or 35, computes the evaluation value s of a learned or unlearned node being processed.

At the step S133, the judgment section 472 judges whether or not the window image currently being identified is a face. This judgment is carried out based on the evaluation value s calculated at the step S132.

Figure 35:
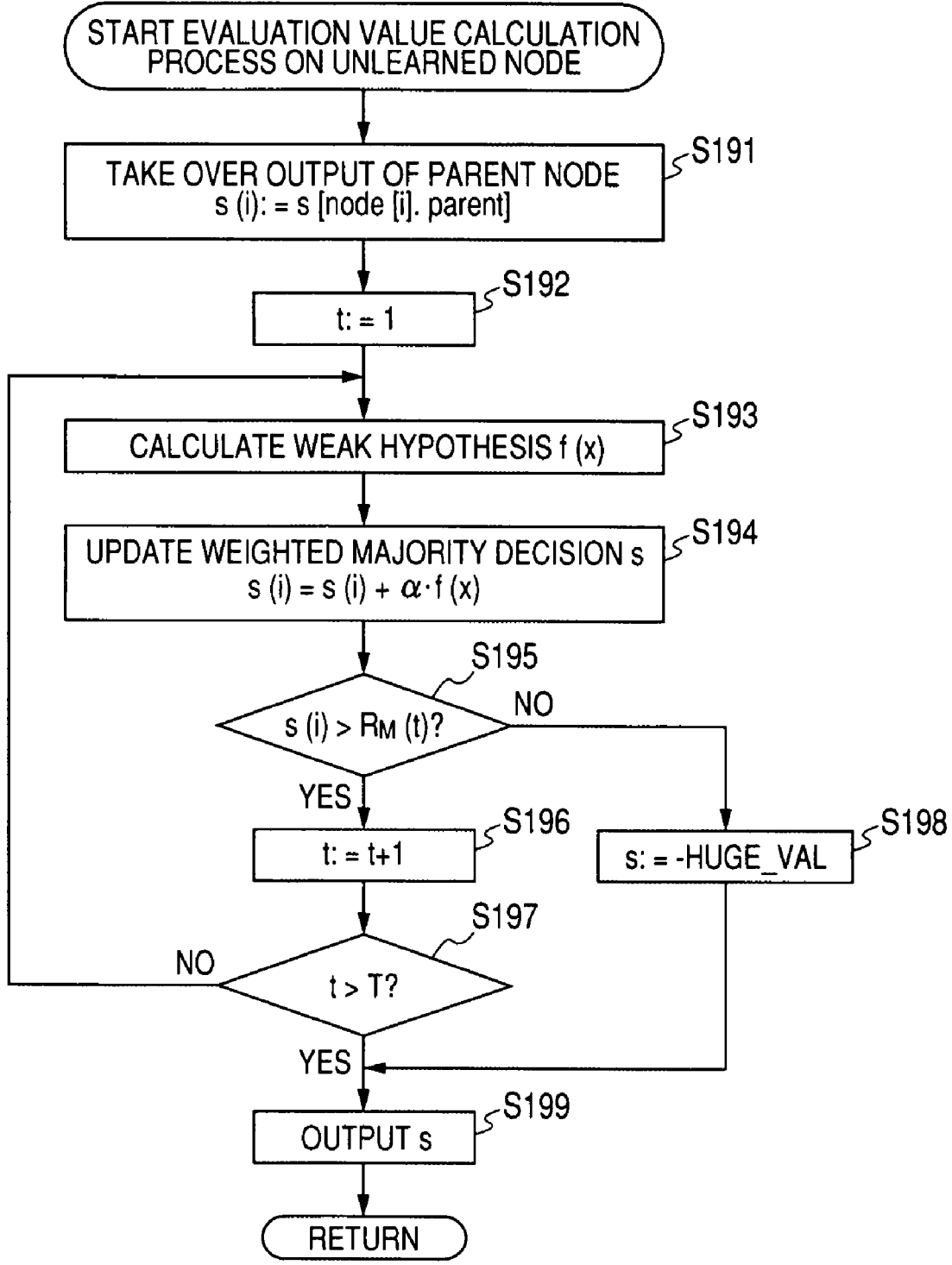
FIG. 35 is a flowchart for explaining the evaluation value calculation process to be performed on an unlearned node at the step S163 in FIG. 33.

When the evaluation value s is positive (more specifically, when the evaluation value s is larger than the reference value (−HUGE_VAL) set at the step S178 in FIG. 34 or the step S198 in FIG. 35, which will be described later), the window image is judged to be a face, while when the evaluation value s is equal to or less than zero (when the evaluation value s is smaller than the reference value), the window image is judged not to be a face.

When the window image being identified is judged not to be a face image, at the step S138, the return section 474 returns the processed node to the parent node.

Specifically, the ID of the parent node is set in the variable i. Since the node being processed at this point is the learned node 81-1, which is the highest node, there is no higher parent node. Therefore, the variable i is set to −1, as described above.

At the step S139, the judgment section 472 judges whether or not the value of the variable i set at the step S138 is larger than zero. When the value of the variable i is judged not larger than zero, the process proceeds to the step S140.

At this point, since the value of the variable i is −1, which is not larger than zero, the process proceeds to the step S140.

At the step S140, the judgment section 472 judges that the window image currently being processed is not a face.

That is, in this case, it has been judged that the window image is not a human face image only by the process performed on the highest learned node 81-1.

When the window image is judged to be a human face image at the step S133 (when the evaluation value s is judged to be positive), the process proceeds to the step S134 and the judgment section 472 judges whether or not the node currently being processed has a child node. When it is judged that there is a child node, the process proceeds to the step S135.

Since the learned node 81-1 being processed at this point has three child nodes, that is, the learned nodes 81-1-1 and 81-1-2 and the unlearned node 81-1-3, the process proceeds to the step S135.

At the step S135, the judgment section 472 judges whether or not the variable branch_count[i] of the node 81-1 being processed is smaller than the number of child nodes (size (numChild)) of the node 81-1. When the variable branch_count[i] is judged to be smaller than the size (numChild), the process proceeds to the step S136.

At this point, since the value of the variable branch_count[i] of the learned node 81-1 is zero (at this point, the variable branch_count[i] has been initialized to zero at the step S131) and the number of child nodes is three, the value of the variable is judged to be smaller than the number of child nodes, and the process proceeds to the step S136.

At the step S136, the selector 473 selects the next node to be processed.

Specifically, the value of the variable branch_count[i] of the node being processed is incremented by one, and the ID of the child node corresponding to the value of the thus set variable branch_count[i] is set in the variable i.

At this point, the variable branch_count[i] of the learned node 81-1 is set to one. Then, the ID of the child node corresponding to the value of the thus set variable branch_count[i], for example, the ID of the learned node 81-1-1, which is the child node of the learned node 81-1, is set in the variable i.

Then, the process returns to the step S132, and the evaluation value calculation process is performed on the node having the ID set in the variable i (the learned node 81-1-1 at this point). That is, the learned node 81-1-1 is used to calculate the evaluation value s (it is judged what label human face image the window image is).

At the step S133, the judgment section 472 judges whether or not the window image is a face (whether or not the evaluation value s is positive). When the window image is a face image, the process proceeds to the step S134, and it is judged whether or not the learned node 81-1-1, which is the node currently being processed, has a child node.

Since the learned node 81-1-1 has three child nodes in total, that is, the learned node 81-1-1-1 and the unlearned nodes 81-1-1-2 and 81-1-1-3, the process proceeds to the step S135.

At the step S135, the judgment section 472 compares the value of the variable branch_count[i] of the learned node 81-1-1 with the number of child nodes thereof (three in this case).

At this point, since the variable branch_count[i] has been initialized to zero in the process at the step S131 and the number of child nodes of the learned node 81-1-1 is three, the value of branch_count[i] is smaller than the number of child nodes. Therefore, the process proceeds to the step 5136.

At the step S136, the selector 473 increments the value of the variable branch_count[i] of the learned node 81-1-1 by one such that the variable branch_count[i] is set to one, and then sets the learned node 81-1-1-1, which is the child node of the learned node 81-1-1 and the child node corresponding to the incremented variable branch_count[i], in the variable i.

Then, at the step S132, the evaluation value calculation section 477 calculates the evaluation value s of the node 81-1-1-1, which is the node having the ID set in the variable i.

At the step S133, the judgment section 472 judges whether or not the evaluation value s of the learned node 81-1-1-1 indicates that the window image is a face. When the window image is a face, the process proceeds to the step S134 and it is judged whether or not the learned node 81-1-1-1 currently being processed has a child node.

Since the learned node 81-1-1-1 has one child node, which is the learned node 81-1-1-1-1, the process proceeds to the step S135.

At the step S135, it is judged whether or not the value of the variable branch_count[i] of the learned node 81-1-1-1 is smaller than the number of child nodes thereof.

At this point, since the variable branch_count[i] has been initialized to zero in the process at the step S131 and the number of child nodes of the learned node 81-1-1-1 is one, the value of variable branch_count[i] is smaller than the number of child nodes. Therefore, the process proceeds to the step S136.

At the step S136, the selector 473 increments the value of the variable branch_count[i] of the learned node 81-1-1-1 by one such that the variable branch_count[i] is set to one, and then sets the ID of the learned node 81-1-1-1-1, which is the child node of the learned node 81-1-1-1 and the child node corresponding to the incremented variable branch_count[i], in the variable i.

Then, at the step S132, the evaluation value calculation section 477 uses the learned node 81-1-1-1-1 to calculate the evaluation value.

At the step S133, the judgment section 472 judges whether or not the evaluation value s of the learned node 81-1-1-1-1 is positive (whether or not the window image is a face image). When the evaluation value s is positive, the process proceeds to the step S134 and it is judged whether or not the learned node 81-1-1-1-1 currently being processed has a child node.

The learned node 81-1-1-1-1 is a terminal node and has no child node. Therefore, in this case, as the step S137, the judgment section 472 judges that the window image is the label W11 face that is associated with to the learned node 81-1-1-1-1.

On the other hand, as the step S133, when the evaluation value s is negative (when the window image is judged not to be a face), at the step S138, the return section 474 sets the ID of the parent node in the variable i.

At this point, the ID of the learned node 81-1-1-1, which is the parent node of the learned node 81-1-1-1-1, is set in the variable i.

At the step S139, the variable i is judged to be positive, and at the step S135, the judgment section 472 judges whether or not the variable branch_count[i] of the node 81-1-1-1 is smaller than the number of child nodes thereof.

At this point, since the value of the variable branch_count[i] is one and the number of child nodes is one, which means that they are equal, the variable branch_count[i] is judged not to be smaller than the number of child nodes. Therefore, at the step S138, the ID of the parent node is set in the variable i.

At this point, the ID of the learned node 81-1-1, which is the parent node of the learned node 81-1-1-1, is set in the variable i.

At the step S139, the variable i is judged to be positive, and at the step S135, the judgment section 472 judges whether or not the variable branch_count[i] of the learned node 81-1-1 is smaller than the number of child nodes thereof.

At this point, since the value of the variable branch_count[i] is one and the number of child nodes of the learned node 81-1-1 is three, the value of the variable branch_count[i] is judged to be smaller than the number of child nodes. At the step S136, the selector 473 increments the value of the variable branch_count[i] by one such that the variable branch_count[i] is set to two. Furthermore, the ID of the child node corresponding to the thus incremented variable branch_count[i] is set in the variable i.

Specifically, the ID of the unlearned node 81-1-1-2 is set in the variable i. At the step S132, the evaluation value calculation section 477 computes the evaluation value s of the unlearned node 81-1-1-2.

At the step S133, the judgment section 472 judges whether or not the evaluation value s of the unlearned node 81-1-1-2 indicates that the window image is a face. When the window image is a face, the process proceeds to the step S134 and it is judged whether or not the unlearned node 81-1-1-2 currently being processed has a child node.

Since the unlearned node 81-1-1-2 has one child node, which is the unlearned node 81-1-1-2-1, the process proceeds to the step S135.

At the step S135, it is judged whether or not the value of the variable branch_count[i] of the unlearned node 81-1-1-2 is smaller than the number of child nodes thereof.

At this point, since the variable branch_count[i] has been initialized to zero in the process at the step S131 and the number of child nodes of the unlearned node 81-1-1-2 is one, the value of branch_count[i] is smaller than the number of child nodes. Therefore, the process proceeds to the step S136.

At the step S136, the selector 473 increments the value of the variable branch_count[i] of the unlearned node 81-1-1-2 by one such that the variable branch_count[i] is set to one, and then sets the ID of the unlearned node 81-1-1-2-1, which is the child node of the unlearned node 81-1-1-2 and the child node corresponding to the incremented variable branch_count[i], in the variable i.

Then, at the step S132, the evaluation value calculation section 477 uses the unlearned node 81-1-1-2-1 to calculate the evaluation value.

At the step S133, the judgment section 472 judges whether or not the evaluation value s of the unlearned node 81-1-1-2-1 is positive (whether or not the window image is a face image). When the evaluation value s is positive, the process proceeds to the step S134 and it is judged whether or not the unlearned node 81-1-1-2-1 currently being processed has a child node.

The unlearned node 81-1-1-2-1 is a terminal node and has no child node. Therefore, in this case, as the step S137, the judgment section 472 judges that the window image is the label W12 face that is associated with the unlearned node 81-1-1-2-1.

On the other hand, at the step S133, when the evaluation value s is negative (when the window image is judged not to be a face), at the step S138, the return section 474 sets the ID of the parent node in the variable i.

Specifically, at this point, the ID of the unlearned node 81-1-1-2, which is the parent node of the unlearned node 81-1-1-2-1, is set in the variable i.

At the step S139, the variable i is judged to be positive, and at the step S135, the judgment section 472 judges whether or not the variable branch_count[i] of the unlearned node 81-1-1-2 is smaller than the number of child nodes thereof.

At this point, since the value of the variable branch_count[i] is one and the number of child nodes is one, which means that they are equal, the value of the variable branch_count[i] is judged not to be smaller than the number of child nodes. At the step S138, the ID of the learned node 81-1-1, which is the parent node of the unlearned node 81-1-1-2, is set in the variable i.

At the step S139, the variable i is judged to be positive, and at the step S135, the judgment section 472 judges whether or not the variable branch_count[i] of the learned node 81-1-1 is smaller than the number of child nodes thereof.

At this point, since the value of the variable branch_count [i] is two and the number of child nodes of the learned node 81-1-1 is three, the value of the variable branch_count[i] is judged to be smaller than the number of child nodes. At the step S136, the selector 473 increments the value of the variable branch_count[i] by one such that the variable branch_count[i] is set to three. Furthermore, the ID of the unlearned node 81-1-1-3, which is the child node corresponding to the thus incremented variable branch_count[i], is set in the variable i. At the step S132, the evaluation value calculation section 477 computes the evaluation value s of the unlearned node 81-1-1-3.

The evaluation value calculation process at the step S132 in FIG. 31 will be described below with reference to the flowchart of FIG. 33.

At the step S161, it is judged whether or not the node on which the evaluation value calculation is performed is a learned node. When the node being processed is judged to be a learned node, the process proceeds to the step S162.

At the step S162, the evaluation value calculation process is performed on the learned node, which will be described later.

On the other hand, when the node being processed is judged not to be a learned node at the step S161, the evaluation value calculation process is performed on an unlearned node at the step S163, which will be described later.

At the step S162 or S163, after the evaluation value calculation process is performed on a learned node or an unlearned node, the process proceeds to the step S133 in FIG. 31, and it is judged whether or not the window image is a face based on the evaluation value s obtained in the evaluation value calculation process.

The evaluation value calculation process to be performed on a learned node at the step S162 in FIG. 33 will be described below with reference to the flowchart of FIG. 34.

At the step S171, the takeover section 475 takes over the output of the parent node. Specifically, the evaluation value s (i) of the current node is initialized to the evaluation value s expressed by the weighted majority decision computed at the parent node. When there is no parent node, that is, in the case of the highest node 81-1, the evaluation value s(i) is initialized to zero.

At the step S172, the variable t indicative of the number (order) of processed weak discriminators is initialized to one in the weak hypothesis calculation section 476.

Then, at the step S173, the weak hypothesis calculation section 476 uses the weak discriminator specified by the variable t to calculate the weak hypothesis f(x). This calculation is carried out based on the above equation (12). This weak discriminator corresponds to the inter-pixel difference feature d defined by a pair of pixels $I_1$ and $I_2$ as described above, and the pair of pixels and the threshold value Th are set in advance in the learning process described above (FIG. 21).

At the step S174, the evaluation value calculation section 477 multiplies the weak hypothesis (estimated value) of the current weak discriminator by reliability (majority decision weight) $\alpha_t$, adds it to the previous evaluation value s to update the evaluation value s based on the equation (14).

That is, the estimated value f(x) computed based on the equation (12) as the discrimination result of the weak discriminator is weighted by the majority decision weight $\alpha_t$ expressed by the equation (8), and the value of the weighted majority decision F(x) is computed to provide the evaluation value s.

$$s(i)=s(i)+\alpha \times f(x) \tag{14}$$

At this point, how the evaluation value s reflects the estimated value when the weak discriminator outputs a binary estimated value according to the equations (2) to (4) differs from how the evaluation value s reflects the estimated value when the weak discriminator outputs the function f(x) expressed by the equation (5) as the estimated value.

Firstly, when the equation (2) is used for the weak discriminator to output a binary value as the estimated value, the evaluation value s is expressed by the following equation (15).

$$S \leftarrow S + \begin{cases} \alpha_t & \wedge \quad Th_t < d_t \\ -\alpha_t & \wedge \quad \text{in other cases} \end{cases} \tag{15}$$

That is, the value of the discrimination result $f_t(x)$ of the weak discriminator is +1 when the value of the inter-pixel difference feature d is larger than the threshold value $Th_t$, otherwise −1. As a result, the value obtained by multiplying the estimated value $f_t(x)$ by the weight $\alpha_t$ is $\alpha_t$ when the value of the inter-pixel difference feature d is larger than the threshold value, otherwise $-\alpha_t$. Then, the either of the resultant values is added to the previous evaluation value s according to the equation (6). The evaluation value s, which is the value of the weighted majority decision F(x) according to the equation (6), is thus updated.

When the equation (3) is used for the weak discriminator to output a binary value as the estimated value, the evaluation value s is expressed by the following equation (16).

$$S \leftarrow S + \begin{cases} \alpha_t & \wedge \quad Th_{t,1} < d_t < Th_{t,2} \\ -\alpha_t & \wedge \quad \text{in other cases} \end{cases} \tag{16}$$

When the equation (4) is used for the weak discriminator to output a binary value as the estimated value, the evaluation value s is expressed by the following equation (17).

$$S \leftarrow S + \begin{cases} \alpha_t & \wedge \quad d_t + Th_{t,1} \text{ or } Th_{t,2} < dt \\ -\alpha_t & \wedge \quad \text{in other cases} \end{cases} \tag{17}$$

When the equation (5) is used for the weak discriminator to output the function f(x) as the estimated value, the evaluation value s is expressed by the following equation (18)

$$s \leftarrow s+f(d) \tag{18}$$

Then, at the step S175, the judgment section 472 compares the evaluation value s(i) with the abort threshold value $R_M(t)$. That is, it is judged whether or not the evaluation value s(i) updated at the step S174 is larger than the abort threshold value $R_M(t)$ of the weak discriminator (t-th weak discriminator) which has been learned in the learning process (FIG. 21). When the evaluation value s(i) is larger than the abort threshold value $R_M(t)$, at the step S176, the judgment section 472 increments the variable t by one.

Then, at the step S177, the judgment section 472 judges whether or not the variable t incremented at the step S176 is larger than a constant value T set in advance. The constant value T represents the number of weak discriminators contained in the node. In this embodiment, the value of T is 100 unless the node is a terminal node, while the value of T is set individually when the node is a terminal node. When the variable t is equal to or smaller than the constant value T, the judgment process has not performed on all weak discriminators. Therefore, the process returns to the step S173.

Then, at the step S173, the weak hypothesis calculation section 476 performs weak hypothesis calculation on the next weak discriminator (weak discriminator corresponding to the incremented variable t). From then on, the same process is sequentially repeated.

Then, at the step S177, when the variable t is judged to be larger than the constant value T, at the step S179, the output section 479 outputs the evaluation value s(i) updated in the process at the step S174 as the evaluation value (discrimination result) of the node.

On the other hand, at the step S175, when the evaluation value s(i) is judged to be equal to or smaller than the abort threshold value $R_M(t)$, at the step S178, the evaluation value s(i) is set to a large negative value (–HUGE_VAL) in the setting section 478. Then, at the step S179, the output section 479 outputs the evaluation value s(i), which has been set to the large negative value at the step S178, as the discrimination result of the node.

That is, in this case, the evaluation value s (i) smaller than the abort threshold value $R_M(t)$ means that the window image is judged not to be the human face image of any one of the labels W11 to W13, the labels W21 to W23 and the labels W31 to W33. Therefore, the following identification process will not be carried out, thereby allowing quicker identification.

Then, the process returns to the step S133 in FIG. 31 via FIG. 33, and it is judged whether or not the window image is judged to be a face at the node based on the evaluation value s, as described above. When the evaluation value s has been set to the reference value at the step S178, the window image is judged not to be a human face image, while when the evaluation value s is larger than the reference value, the window image is judged to be a human face image, as described above.

The evaluation value calculation process to be performed on an unlearned node at the step S163 in FIG. 33 will be described below with reference to the flowchart of FIG. 35.

That is, at the step S191, in the takeover section 475, the evaluation value s(i) of the current node is initialized to the evaluation value s expressed by the weighted majority decision computed at the parent node, as in the step S171 in FIG. 34. Since an unlearned node has a parent node as shown in FIG. 32, the evaluation value s(i) will not be initialized to zero.

At the step S192, the variable t indicative of the number (order) of the weak discriminators in the learned node being used is initialized to one in the weak hypothesis calculation section 476.

Then, at the step S193, the weak hypothesis calculation section 476 uses the weak discriminator specified by the variable t to calculate the weak hypothesis f(x).

This calculation is carried out based on the above equation (12). However, an unlearned node is not associated with a pair of pixels or the threshold value Th used to calculate the inter-pixel difference feature d. Then, the image associated with the unlearned node and the weak discriminators in the learned node associated with the image having a predetermined coordinate relationship with the image associated with the unlearned node are used to determine a pair of pixels used to calculate the inter-pixel difference feature d.

Figure 37:
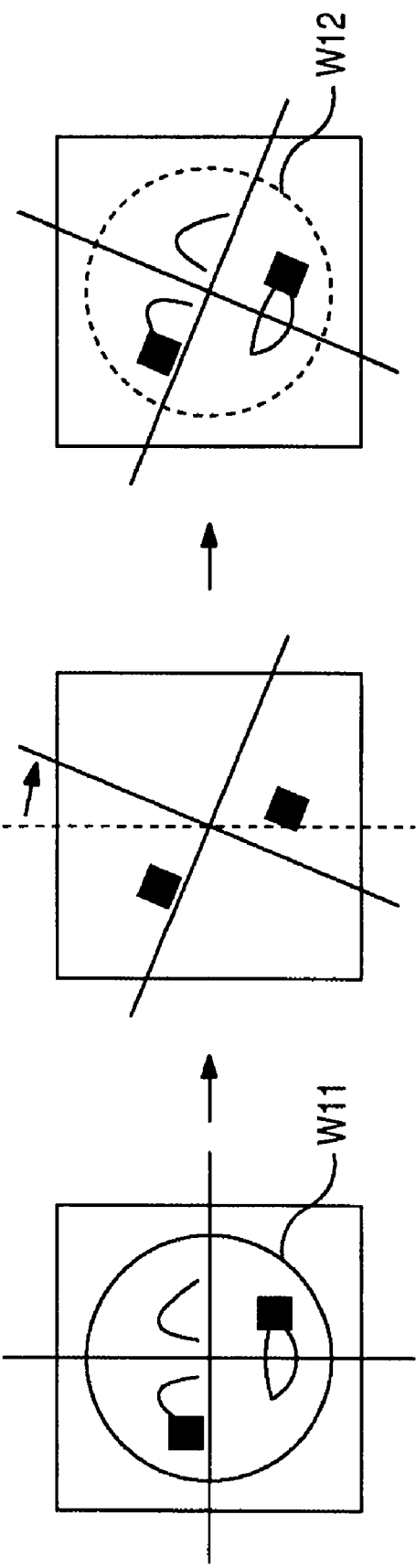
FIG. 37 is a view showing the relationship between the positions of a pair of two pixels obtained as a learning result and the positions of the pixels used when the amount of feature is calculated at an unlearned node.

As shown in FIG. 36, since rotating the label W11 image by +20 degrees in the rolling direction results in the image classified into the label W12, the positions of two pixels that will be obtained by learning the label W12 image can be obtained by rotating the positions of two pixels obtained by learning the label W11 image by +20 degrees in the rolling direction, as shown in FIG. 37.

This relationship can be expressed by the equation (19), where $x_k$ and $y_k$ (k=1, 2) are the coordinates of two pixels used in the evaluation value calculation process at the referenced learned node; $s_w$ is the lateral width of the window image; $s_h$ is the longitudinal width of the window image; and $x'_k$ and $y'_k$ are the coordinates of pixels used in the evaluation value calculation process at the unlearned node.

$$\begin{pmatrix} x'_k \\ y'_k \end{pmatrix} = \text{round}\left(\begin{pmatrix} \cos\theta & -\sin\theta \\ \sin\theta & \cos\theta \end{pmatrix}\begin{pmatrix} x_k - \frac{s_w}{2} \\ y_k - \frac{s_h}{2} \end{pmatrix} + \begin{pmatrix} \frac{s_w}{2} \\ \frac{s_h}{2} \end{pmatrix}\right) \quad (19)$$

That is, when the evaluation value calculation process is performed on the unlearned node 81-1-1-2 or the unlearned node 81-1-1-2-1, the equation (19) is used to rotate the positions of the two pixels on the window image by +20 degrees in the rolling direction that are used to calculate the weak hypothesis f(x) of the weak discriminator specified by the variable t of the learned node 81-1-1-1 or the learned node 81-1-1-1-1 that has learned the label W11. Then, the inter-pixel difference feature d of the pixels at the resultant rotated positions will be calculated.

As shown in FIG. 36, since rotating the label W11 image by –20 degrees in the rolling direction results in the image classified into the label W13, the positions of two pixels that will be obtained by learning the label W13 image can be obtained by rotating the positions of two pixels obtained by learning the label W11 image by –20 degrees in the rolling direction.

That is, when the evaluation value calculation process is performed on the unlearned node 81-1-1-3 or the unlearned node 81-1-1-3-1, the equation (19) is used to rotate the positions of the two pixels on the window image by –20 degrees in the rolling direction that are used to calculate the weak hypothesis f(x) of the weak discriminator specified by the variable t of the learned node 81-1-1-1 or the learned node 81-1-1-1-1. Then, the inter-pixel difference feature d of the pixels at the resultant rotated positions will be calculated.

As shown in FIG. 36, since rotating the label W21 image by +20 degrees in the rolling direction results in the image classified into the label W22, the positions of two pixels that will be obtained by learning the label W22 image can be obtained by rotating the positions of two pixels obtained by learning the label W21 image by +20 degrees in the rolling direction.

That is, when the evaluation value calculation process is performed on the unlearned node 81-1-2-2 or the unlearned node 81-1-2-2-1, the equation (19) is used to rotate the positions of the two pixels on the window image by +20 degrees in the rolling direction that are used to calculate the weak hypothesis f(x) of the weak discriminator specified by the variable t of the learned node 81-1-2-1 or the learned node 81-1-2-1-1 that has learned the label W21. Then, the inter-pixel difference feature d of the pixels at the resultant rotated positions will be calculated.

As shown in FIG. 36, since rotating the label W21 image by –20 degrees in the rolling direction results in the image classified into the label W23, the positions of two pixels that will be obtained by learning the label W23 image can be obtained by rotating the positions of two pixels obtained by learning the label W21 image by −20 degrees in the rolling direction.

That is, when the evaluation value calculation process is performed on the unlearned node 81-1-2-3 or the unlearned node 81-1-2-3-1, the equation (19) is used to rotate the positions of the two pixels on the window image by −20 degrees in the rolling direction that are used to calculate the weak hypothesis f(x) of the weak discriminator specified by the variable t of the learned node 81-1-2-1 or the learned node 81-1-2-1-1 that has learned the label W21. Then, the inter-pixel difference feature d of the pixels at the resultant rotated positions will be calculated.

As shown in FIG. 36, since flipping the label W21 image about the vertical axis passing the horizontal center of the image (flipping in the horizontal direction) results in the image classified into the label W31, the positions of two pixels that will be obtained by learning the label W31 image can be obtained by flipping the positions of two pixels obtained by learning the label W21 image in the horizontal direction, as shown in FIG. 38.

This relationship can be expressed by the equation (20).

$$x'_k = s_w - x_k, \ y'_k = y_k \qquad (20)$$

That is, when the evaluation value calculation process is performed on the unlearned node 81-1-3-1 or the unlearned node 81-1-3-1-1, the equation (20) is used to flip the positions of the two pixels on the window image in the horizontal direction that are used to calculate the weak hypothesis f(x) of the weak discriminator specified by the variable t of the learned node 81-1-2-1 or the learned node 81-1-2-1-1 that has learned the label W21. Then, the inter-pixel difference feature d of the pixels at the resultant flipped positions will be calculated.

As shown in FIG. 36, since rotating the label W21 image by −20 degrees in the rolling direction and flipping the resultant label W23 image in the horizontal direction results in the image classified into the label W32, the positions of two pixels that will be obtained by learning the label W32 image can be obtained by rotating the positions of two pixels obtained by learning the label W21 image by −20 degrees in the rolling direction and flipping the rotated positions in the horizontal direction.

That is, when the evaluation value calculation process is performed on the unlearned node 81-1-3-2 or the unlearned node 81-1-3-2-1, the equations (19) and (20) are used to rotate the positions of the two pixels on the window image by −20 degrees in the rolling direction that are used to calculate the weak hypothesis f(x) of the weak discriminator specified by the variable t of the learned node 81-1-2-1 or the learned node 81-1-2-1-1 that has learned the label W21 and flipping the rotated positions in the horizontal direction. Then, the inter-pixel difference feature d of the pixels at the resultant rotated and flipped positions will be calculated.

As shown in FIG. 36, since rotating the label W21 image by +20 degrees in the rolling direction and flipping the resultant label W22 image in the horizontal direction results in the image classified into the label W33, the positions of two pixels that will be obtained by learning the label W33 image can be obtained by rotating the positions of two pixels obtained by learning the label W21 image by +20 degrees in the rolling direction and flipping the rotated positions in the horizontal direction.

That is, when the evaluation value calculation process is performed on the unlearned node 81-1-3-3 or the unlearned node 81-1-3-3-1, the equations (19) and (20) are used to rotate the positions of the two pixels on the window image by +20 degrees in the rolling direction that are used to calculate the weak hypothesis f(x) of the weak discriminator specified by the variable t of the learned node 81-1-2-1 or the learned node 81-1-2-1-1 that has learned the label W21 and flipping the rotated positions in the horizontal direction. Then, the inter-pixel difference feature d of the pixels at the resultant rotated and flipped positions will be calculated.

Using a similar principle, when the evaluation value calculation process is performed on the unlearned node 81-1-3 that identifies the label W31 to W33 images, the equation (20) is used to flip the positions of the two pixels on the window image in the horizontal direction that are used to calculate the weak hypothesis f(x) of the weak discriminator specified by the variable t of the learned node 81-1-2 that has learned the labels W21 to W23. Then, the inter-pixel difference feature d of the pixels at the resultant flipped positions will be calculated.

Regarding the threshold value Th necessary for computing the equation (12), the threshold value for the weak discriminator specified by the variable t of the learned node 81-1-1-1 or 81-1-1-1-1 is used when the evaluation value calculation process is performed on the unlearned node 81-1-1-2 or 81-1-1-2-1, or the unlearned node 81-1-1-3 or 81-1-1-3-1.

When the evaluation value calculation process is performed on the unlearned node 81-1-2-2 or 81-1-2-2-1, the unlearned node 81-1-2-3 or 81-1-2-3-1, the unlearned node 81-1-3-1 or 81-1-3-1-1, the unlearned node 81-1-3-2 or 81-1-3-2-1, or the unlearned node 81-1-3-3 or 81-1-3-3-1, the threshold value for the weak discriminator specified by the variable t of the learned node 81-1-2-1 or 81-1-2-1-1 is used.

When the evaluation value calculation process is performed on the unlearned node 81-1-3, the threshold value for the weak discriminator specified by the variable t of the learned node 81-1-2 is used.

When the positions of two pixels used to calculate the inter-pixel difference feature d at a learned node are rotated to identify two pixels used to calculate the inter-pixel difference feature d at an unlearned node, it is conceivable that the rotated positions may go off the window image, as shown in FIG. 39A.

To address this problem, in this embodiment, the scanner 54 enlarges the window 11 such that it becomes slightly larger than the image used for pattern detection, and then the pattern detection is performed on the center area of the enlarged image, as shown in FIG. 39B.

Specifically, for example, firstly by learning a 20 by 20 learning sample and then adding two pixels to each coordinate to convert the learned coordinates into a 24 by 24 coordinate system, the 24 by 24 window is used for detection in the detection process.

In practice, when the rotation angle θ is +/−20 degrees, the four pixels at the four corners of the 20 by 20 square will go off the 24 by 24 window upon rotation. However, this problem can be handled by rotating the learning sample in the rolling direction with its center aligned with the center of the window image and excluding the pixels at the four corners that go off the image to be processed in the learning process.

Returning to FIG. 35, at the step S194, as in the step of S174 in FIG. 34, the evaluation value calculation section 477 multiplies the weak hypothesis (estimated value) of the current weak discriminator by reliability (majority decision weight) at, adds it to the previous evaluation value s to update the evaluation value s based on the equation (14).

However, an unlearned node is not associated with any reliability (majority decision weight) $\alpha_t$.

Therefore, in this case again, when the evaluation value calculation process is performed on the unlearned node 81-1-1-2 or 81-1-1-2-1, or the unlearned node 81-1-1-3 or **81-1-1-

3-1, the reliability of the weak discriminator specified by the variable t of the learned node 81-1-1-1 or 81-1-1-1-1 is used.

When the evaluation value calculation process is performed on the unlearned node 81-1-2-2 or 81-1-2-2-1, the unlearned node 81-1-2-3 or 81-1-2-3-1, the unlearned node 81-1-3-1 or 81-1-3-1-1, the unlearned node 81-1-3-2 or 81-1-3-2-1, or the unlearned node 81-1-3-3 or 81-1-3-3-1, the reliability of the weak discriminator specified by the variable t of the learned node 81-1-2-1 or 81-1-2-1-1 is used.

When the evaluation value calculation process is performed on the unlearned node 81-1-3, the reliability of the weak discriminator specified by the variable t of the learned node 81-1-2 is used.

Then, at the step S195, as in the step S175 in FIG. 34, the judgment section 472 compares the evaluation value s(i) with the abort threshold value $R_M(t)$.

However, an unlearned node is not associated with any threshold value $R_M$.

Therefore, in this case again, when the evaluation value calculation process is performed on the unlearned node 81-1-1-2 or 81-1-1-2-1, or the unlearned node 81-1-1-3 or 81-1-1-3-1, the threshold value $R_M$ of the weak discriminator specified by the variable t of the learned node 81-1-1-1 or 81-1-1-1-1 is used.

When the evaluation value calculation process is performed on the unlearned node 81-1-2-2 or 81-1-2-2-1, the unlearned node 81-1-2-3 or 81-1-2-3-1, the unlearned node 81-1-3-1 or 81-1-3-1-1, the unlearned node 81-1-3-2 or 81-1-3-2-1, or the unlearned node 81-1-3-3 or 81-1-3-3-1, the threshold value $R_M$ of the weak discriminator specified by the variable t of the learned node 81-1-2-1 or 81-1-2-1-1 is used.

When the evaluation value calculation process is performed on the unlearned node 81-1-3, the threshold value $R_M$ of the weak discriminator specified by the variable t of the learned node 81-1-2 is used.

At the step S195, when the evaluation value s(i) is larger than the abort threshold value $R_M(t)$, at the step S196, the judgment section 472 increments the variable t by one. Then, at the step S197, the judgment section 472 judges whether or not the variable t incremented at the step S196 is larger than the constant value T set in advance.

The constant value T represents the number of weak discriminators contained in the learned node to which an unlearned node makes reference. When the variable t is equal to or smaller than the constant value T, the judgment process has not performed on all weak discriminators. Therefore, the process returns to the step S193. Then, at the step S193, the weak hypothesis calculation section 476 performs weak hypothesis calculation on the next weak discriminator (weak discriminator corresponding to the incremented variable t). From then on, the same process is sequentially repeated.

Then, at the step S197, when the variable t is judged to be larger than the constant value T, at the step S199, the output section 479 outputs the evaluation value s(i) updated in the process at the step S194 as the evaluation value (discrimination result) of the node.

On the other hand, at the step S195, when the evaluation value s(i) is judged to be equal to or smaller than the abort threshold value $R_M(t)$, at the step S198, the evaluation value s(i) is set to a large negative value (−HUGE_VAL) in the setting section 478. Then, at the step S199, the output section 479 outputs the evaluation value s(i), which has been set to the large negative value at the step S198, as the discrimination result of the node.

That is, in this case, the evaluation value s(i) smaller than the abort threshold value $R_M(t)$ means that the window image is judged not to be the human face image of any one of the labels W12, W13, W22, W23, W31, W32 and W33. Therefore, the following identification process will not be carried out, thereby allowing quicker identification.

Then, the process proceeds to the step S133 in FIG. 31 via FIG. 33, and it is judged whether or not the window image is judged to be a face at the unlearned node based on the evaluation value s, as described above. When the evaluation value s has been set to the reference value at the step S198, the window image is judged not to be a human face image, while when the evaluation value s is larger than the reference value, the window image is judged to be a human face image, as described above.

As described above, according to the object detection method of this embodiment, in order to detect an object of interest by using the discriminator that uses group learning to learn weak discriminators that uses the inter-pixel difference feature to perform weak discrimination, the process of calculating the amount of feature of the object of interest at the step S173 or S193 is completed only by reading out the brightness values of the two corresponding pixels in the window image and calculating the difference in brightness. Thus, the face detection process can be carried out in a significantly quick manner, allowing realtime face detection.

Then, the evaluation value s is compared with the abort threshold value $R_M$ whenever the discrimination result (estimated value) obtained by the amount of feature is multiplied by the reliability for the weak discriminator used for the discrimination and the resultant value is added to successively update the evaluation value s, so as to judge whether or not to continue the computation of the estimated value of the weak discriminator. When the evaluation values becomes smaller than the abort threshold value $R_M$, the computation of the estimated value of the weak discriminator is aborted and the process proceeds to the next window, allowing drastic reduction in unnecessary computation and even higher-speed face detection.

That is, when all areas of the input image and the scaled images obtained by performing reduction scaling on the input image are scanned and window images are cut out from those images, most of these window images are not likely the object of interest but are objects of no interest. By aborting the discrimination of the window images that are objects of no interest in the course of the discrimination process, it is possible to perform the discrimination process in a significantly efficient manner. In contrast, when a large number of objects to be detected are contained in those images, a similar approach using the above abort threshold value may be used to provide a threshold value by which the computation of window images that are apparently the object of interest is aborted. Furthermore, by scaling the input image in the scaling section, a search window of an arbitrary size can be set to detect an object of an arbitrary size.

Moreover, as described above, no learning is carried out on images that can be obtained by performing coordinate conversion on predetermined label images (FIG. 20) but the learning results of learned label images are used. Therefore, although in related art, for example, it is necessary at each node to generate and retain weak discriminators forming the node, for example, as shown in FIG. 6, it is possible to omit the generation and retention of weak discriminators in part of the nodes, as shown in FIG. 32. That is, it is not necessary to store corresponding pairs of the positions of two pixels, the threshold values for weak discriminators, weights of the weighted majority decision (each corresponding to reliability of the weak discriminator) and abort threshold values, allowing reduction in dictionary data of the discriminator 55.

For example, in the case shown in FIG. 6, provided that the number of weak discriminators in a terminal node is 3000, 28300 (=100+300+900+27000) weak discriminators in total may be required.

That is, when the learning result includes the following amount of data, about 228-KB memory capacity may be required.

Weighting coefficient: 16 bits
Pixel difference threshold value: 9 bits
Abort threshold value: 21 bits
Coordinate x1: 5 bits
Coordinate y1: 5 bits
Coordinate x2: 5 bits
Coordinate y2: 5 bits
Total: 66 bits On the other hand, by applying the invention, the number of weak discriminators is reduced to 6400 (=100+100+200+6000), as shown in FIG. 32, so that the memory capacity can be reduced to 37.3 KB accordingly.

In the above description, although it is judged whether or not to abort the estimated value calculation whenever the value of the weighted majority decision is updated, reducing the frequency of the judgment to once every N times can reduce the number of abort threshold values to be retained, allowing further reduction in the dictionary data.

Since the value of the weighted majority decision in general modestly changes as shown in FIG. 18, even when the frequency of the judgment of whether or not to abort the estimated value calculation is reduced, the following threshold value will eventually abort the estimated value calculation. Therefore, although the reduction in frequency of the judgment results in slight reduction in speed (increase in frequency of the estimated value calculation before the calculation is aborted), the abort judgment can be appropriately carried out.

For example, when it is judged whether or not to abort the estimated value calculation at a frequency of once every 10 times, the amount of data of a weak discriminator can be reduced from 66 bits to 47.1 bits, that is, to the memory capacity of 36.8 KB.

The invention is not limited only to the above embodiment, but various changes can of course be made as far as these changes do not depart from the spirit of the invention. The invention can be applied to information processing apparatus including various image processing apparatus, such as a robot that receives and displays moving images as well as still images.

The series of processes described above may be carried out using either hardware or software. In this case, for example, the object detection apparatus includes a computer shown in FIG. 40.

In FIG. 40, a CPU (Central Processing Unit) 621 executes various processes according to a program stored in a ROM (Read Only Memory) 622 or a program loaded from a storage section 628 to a RAM (Random Access Memory) 623. The RAM 623 also stores data and the like necessary for the CPU 621 to execute the various processes as appropriate.

The CPU 621, the ROM 622 and the RAM 623 are connected to each other via a bus 624. An input/output interface 625 is also connected to the bus 624.

The input/output interface 625 is connected to an input section 626 including a keyboard and a mouse, an output section 627 including a display, such as a CRT (Cathode Ray Tube) and a LCD (Liquid Crystal Display), as well as a speaker, the storage section 628 including a hard disk, and a communication section 629 including a modem. The communication section 629 performs a communication process via a network including the Internet.

The input/output interface 625 is also connected to a drive 630 as necessary, into which a removable medium 631, such as a magnetic disk, an optical disk, a magneto-optical disk and a semiconductor memory, is loaded as appropriate. A computer program read out from the removable medium is installed in the storage section 628 as necessary.

When the series of processes is to be carried out by using software, programs that form the software are installed from the network or the recording medium into a computer incorporated in dedicated hardware or, for example, a general-purpose personal computer capable of installing various programs to execute various functions.

As shown in FIG. 40, the recording medium includes not only the removable medium 631 including a magnetic disk (including a floppy disc), an optical disk (including a CD-ROM (Compact Disk-Read Only Memory) and a DVD (Digital Versatile Disk)), an magneto-optical disk (including MD (Mini-Disk)) and a semiconductor memory, on which a program is recorded and which is separate from the apparatus body and distributed to provide the program to a user, but also the ROM 622 and the hard disk incorporated in the storage section 628, on which programs are recorded and which are provided to a user as incorporated in the apparatus body in advance.

In this text, steps that describe a program recorded on the recording medium include not only processes that are executed in a specified order in a time-series manner but also processes that are not necessarily executed in a time-series manner but executed in parallel or individually.

In this text, a system refers to the entire apparatus formed of a plurality of apparatuses.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus comprising:
    a scaling section that enlarges or reduces an input image provided to the information processing apparatus;
    a scanner that uses a window of a predetermined size to sequentially scan the input image; and
    a discriminator that discriminates whether the image received from the scanner is an object of interest, the discriminator comprising:
        a higher node having a plurality of weak discriminators that have learned a first learning sample of a first label and a second learning sample of a second label that has a predetermined coordinate relationship with the first learning sample of the first label;
        a first lower node having a plurality of weak discriminators that have learned the first learning sample of the first label based on the discrimination result of the higher node; and
        a second lower node that has no weak discriminator,
        wherein the first lower node performs an identification process on the input image in order to recognize an image of the first label based on the discrimination result of the higher node, and
        the second lower node performs an identification process on the input image in order to identify an image of the second label based on the discrimination result of the higher node by utilizing the weak discriminators in the first lower node according to the coordinate relationship.

2. The information processing apparatus according to claim 1, wherein the weak discriminators in the higher node and the first lower node perform the identification process based on how much the difference between the values of two pixels in the image data of the learning sample differs from a threshold value, and the second lower node performs the identification process based on how much the difference between the values of two pixels on the image according to the input signal at the positions obtained by performing coordinate conversion on the positions of the two pixels used in the identification process on the first node based on the coordinate relationship differs from the threshold value used in the identification process on the first node.

3. The information processing apparatus according to claim 2, wherein the learning sample of the second label corresponds to the image obtained by rotating the learning sample of the first label by a predetermined angle in the rolling direction or flipping the learning sample of the first label in the horizontal direction, and the second lower node performs the identification process based on how much the difference between the values of two pixels on the image according to the input signal at the positions obtained by rotating the positions of the two pixels used in the identification process on the first node by the predetermined angle in the rolling direction or flipping the positions of the two pixels in the horizontal direction differs from the threshold value used in the identification process on the first node.

4. The information processing apparatus according to claim 3, further comprising output means that acquires a signal that undergoes the identification process and outputs it to the higher node, the first lower node or the second lower node, wherein the output means outputs an image signal of an image larger than the learning sample to the second lower node when the second lower node performs the identification process based on how much the difference between the values of two pixels on the image according to the input signal at the positions obtained by rotating the positions of the two pixels used in the identification process on the first node by the predetermined angle in the rolling direction differs from the threshold value used in the identification process on the first node.

5. The information processing apparatus according to claim 4, wherein the weak discriminators that form the higher node and the first lower node rotate the learning sample by the predetermined angle in the rolling direction with its center aligned with the center of the image according to the image signal outputted from the output means and do not perform the learning on the areas that go off the image according to the image signal.

6. The information processing apparatus according to claim 1, wherein the higher node and the first and second lower nodes include abort means for weighting each discrimination result with reliability, accumulating the weighted discrimination results and aborting the identification process based on the accumulated sum.

7. The information processing apparatus according to claim 6, wherein the abort means judges whether or not to abort the identification process whenever the discrimination result is weighted and accumulated or whenever a predetermined number of discrimination results are weighted and accumulated.

8. A method for processing information using an information processing apparatus, wherein the information processing apparatus includes a higher node having a plurality of weak discriminators that have learned a first learning sample of a first label and a second learning sample of a second label that has a predetermined coordinate relationship with the first learning sample of the first label, a first lower node having a plurality of weak discriminators that have learned the first learning sample of the first label based on the discrimination result of the higher node, and a second lower node that has no weak discriminator, the method for processing information comprising the steps of:

using the first lower node to perform an identification process on an input signal in order to recognize an image of the first label based on the discrimination result of the higher node, and using the second lower node to perform an identification process on the input signal in order to identify an image of the second label based on the discrimination result of the higher node by utilizing the weak discriminators in the first lower node according to the coordinate relationship.

9. A non-transitory computer readable medium on which a computer readable program is recorded for an information processing apparatus that includes a higher node having a plurality of weak discriminators that have learned a first learning sample of a first label and a second learning sample of a second label that has a predetermined coordinate relationship with the first learning sample of the first label, a first lower node having a plurality of weak discriminators that have learned the first learning sample of the first label based on the discrimination result of the higher node, and a second lower node that has no weak discriminator, the program comprising the steps of:

using the first lower node to perform an identification process on an input signal in order to recognize an image of the first label based on the discrimination result of the higher node, and using the second lower node to perform an identification process on the input signal in order to identify an image of the second label based on the discrimination result of the higher node by utilizing the weak discriminators in the first lower node according to the coordinate relationship.

10. A non-transitory computer readable storage medium storing a program for an information processing apparatus that includes a higher node having a plurality of weak discriminators that have learned a first learning sample of a first label and a second learning sample of a second label that has a predetermined coordinate relationship with the first learning sample of the first label, a first lower node having a plurality of weak discriminators that have learned the first learning sample of the first label based on the discrimination result of the higher node, and a second lower node that has no weak discriminator, the program causing a computer to execute the steps of:

using the first lower node to perform an identification process on an input signal in order to recognize an image of the first label based on the discrimination result of the higher node, and using the second lower node to perform an identification process on the input signal in order to identify an image of the second label based on the discrimination result of the higher node by utilizing the weak discriminators in the first lower node according to the coordinate relationship.

* * * * *